United States Patent
Watanabe et al.

(10) Patent No.: US 7,637,836 B2
(45) Date of Patent: Dec. 29, 2009

(54) POWER TRANSMISSION SYSTEM

(75) Inventors: Takao Watanabe, Aichi-gun (JP);
Hiroyuki Nishizawa, Tajimi (JP);
Masataka Osawa, Nagoya (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 269 days.

(21) Appl. No.: 11/411,123

(22) Filed: Apr. 26, 2006

(65) Prior Publication Data
US 2006/0247086 A1    Nov. 2, 2006

(30) Foreign Application Priority Data

| Apr. 28, 2005 | (JP) | ............................. 2005-132880 |
| Mar. 30, 2006 | (JP) | ............................. 2006-095776 |

(51) Int. Cl.
*F16H 37/02* (2006.01)
*F16H 3/72* (2006.01)
*B60K 1/02* (2006.01)
*B60W 10/04* (2006.01)

(52) U.S. Cl. ........................... 475/210; 475/209; 475/5; 477/3; 477/41

(58) Field of Classification Search ...................... 477/3, 477/5, 6, 41; 475/5, 207, 209–219
See application file for complete search history.

(56) References Cited

U.S. PATENT DOCUMENTS

| 3,340,749 | A  | * | 9/1967  | Magg et al. ................. 475/211 |
| 4,599,916 | A  | * | 7/1986  | Hirosawa .................... 475/210 |
| 4,624,153 | A  | * | 11/1986 | Itoh et al. .................... 475/66 |
| 4,864,889 | A  | * | 9/1989  | Sakakibara et al. ......... 475/211 |
| 5,971,887 | A  | * | 10/1999 | Hattori et al. ................ 477/41 |
| 6,379,282 | B1 | * | 4/2002  | Aoki .......................... 477/109 |
| 6,524,217 | B1 | * | 2/2003  | Murakami et al. ............. 477/5 |
| 6,736,753 | B2 | * | 5/2004  | Endo et al. ..................... 477/3 |
| 6,902,512 | B2 | * | 6/2005  | Kamichi et al. ............. 477/108 |
| 6,979,276 | B2 | * | 12/2005 | Murray ....................... 475/216 |

(Continued)

FOREIGN PATENT DOCUMENTS

JP    11-504415    4/1999

(Continued)

OTHER PUBLICATIONS

Shuiwen Shen, et al., Coordinated control of a mechanical hybrid driveline with a continuously variable transmission, JSAE Review 22 (2001), Apr. 6, 2001, pp. 453-461.

*Primary Examiner*—Roger Pang
(74) *Attorney, Agent, or Firm*—Oblon, Spivak, McClelland, Maier & Neustadt, L.L.P.

(57) ABSTRACT

In a power transmission system for transmitting power of an engine to a load, a planetary gear mechanism provided in parallel to a speed variator combines torque conveyed from the engine with torque conveyed from a motor generator in a state such that their torque ratio equals a predetermined ratio, and transmits the combined torque to a driven wheel. When performing power transmission between the engine and the driven wheel via both the speed variator and the planetary gear mechanism, power distribution between the power conveyed to the speed variator and the power conveyed to the planetary gear mechanism can be actively controlled by adjusting the torque of the motor generator. As a result, the speed variator capacity can be reduced while enhancing power transmission efficiency.

39 Claims, 67 Drawing Sheets

U.S. PATENT DOCUMENTS

| | | | |
|---|---|---|---|
| 7,246,672 B2 * | 7/2007 | Shirai et al. | 180/65.2 |
| 2002/0111244 A1 * | 8/2002 | Miyata et al. | 475/214 |

FOREIGN PATENT DOCUMENTS

| | | |
|---|---|---|
| JP | 2002-48213 | 2/2002 |
| JP | 2002-139136 | 5/2002 |
| JP | 2002-513118 | 5/2002 |
| JP | 2002-543340 | 12/2002 |
| JP | 2003-247623 | 9/2003 |
| JP | 2004-122878 | 4/2004 |
| JP | 2004-175320 | 6/2004 |
| WO | WO9221896 A1 * | 10/1992 |

* cited by examiner

POWER TRANSMISSION SYSTEM

PRIORITY INFORMATION

This application claims priority to Japanese Patent Applications No. 2005-132880 filed on Apr. 28, 2005 and No. 2006-095776 filed on Mar. 30, 2006, which are incorporated herein by reference in their entireties.

BACKGROUND OF THE INVENTION

1. Field of the Invention

The present invention relates to a power transmission system for transmitting power between an engine and a load.

2. Description of the Related Art

Power transmission systems of this type are disclosed in Japanese Translated Publications for PCT No. 2002-513118 (hereinafter referred to as patent document 1) and No. 2002-543340 (patent document 2), and Shuiwen Shen, Alex Serrarens, Maarten Steinbuch, Frans Veldpaus, "Coordinated Control of a Mechanical Hybrid Driveline with a Continuously Variable Transmission", JSAE Review 22, 2001, pp. 453-461 (non-patent document 1). According to these documents, a planetary gear mechanism is provided in parallel to a continuously variable speed variator which transmits power of an engine to a load while changing speed, and the input/output shaft of the continuously variable speed variator and a flywheel are coupled to separate rotating elements of the planetary gear mechanism. When a speed changing operation is performed by the speed variator, power is transmitted between the engine and the flywheel. For example, when downshifting, rotational energy of the flywheel is discharged for use in increasing rotation of the engine. On the other hand, when upshifting, power of the engine is absorbed by the flywheel. As such, according to the above-noted documents, rotational energy of the flywheel is used to assist the speed changing operations of the continuously variable speed variator.

Furthermore, power transmission systems are disclosed in Japanese Translated Publication for PCT No. Hei 11-504415 (patent document 3) and Japanese Patent Laid-Open Publications No. 2002-48213 (patent document 4), and No. 2003-247623 (patent document 5).

According to the above-referenced patent documents 1 and 2 and non-patent document 1, discharge or absorption of rotational energy by the flywheel is passively carried out when the gear ratio of the speed variator is changed, while power transmission to the planetary gear mechanism is also performed passively. For this reason, it is not possible to actively control the power transmitted to the planetary gear mechanism in a manner independent from the speed changing control of the speed variator. Further, patent documents 1 and 2 and non-patent document 1 make absolutely no reference to the concept of actively controlling distribution of power transmitted to the speed variator and power transmitted to the planetary gear mechanism. As such, according to systems described in patent documents 1 and 2 and non-patent document 1, it is difficult to appropriately control distribution of power transmitted to the speed variator and power transmitted to the planetary gear mechanism, making it difficult to achieve reduction of speed variator capacity and enhancement of power transmission efficiency.

SUMMARY OF THE INVENTION

An advantage of the present invention is that, in a power transmission system which can transmit power of an engine to a load via both of a speed variator and a gearing mechanism provided in parallel to one another, distribution of power transmitted to the speed variator and power transmitted to the gearing mechanism can be actively controlled, such that the speed variator capacity can be reduced while also enhancing power transmission efficiency.

A power transmission system according to the present invention comprises a first power transmitting section capable of transmitting power from an engine to a load via a speed variator while changing speed, a second power transmitting section capable of transmitting power from the engine to the load via a gearing mechanism provided in parallel to the speed variator, a prime mover that generates torque which can be controlled, and a control unit that controls torque of the prime mover. The gearing mechanism is a mechanism capable of performing a torque combining operation in which torque from the engine and torque from the prime mover are combined in a state such that their torque ratio equals a first predetermined ratio, and the combined torque is transmitted to the load. When power transmission between the engine and the load is performed via both the speed variator and the gearing mechanism, the control unit performs power distribution control for controlling distribution of power conveyed to the speed variator and power conveyed to the gearing mechanism by adjusting torque of the prime mover.

According to another aspect, the present invention provides a power transmission system comprising a first power transmitting section capable of transmitting power from an engine to a load via a speed variator while changing speed, a second power transmitting section capable of transmitting power from the engine to the load via a gearing mechanism provided in parallel to the speed variator, a driven machinery that generates torque which can be controlled, and a control unit that controls torque of the driven machinery. The gearing mechanism is a mechanism capable of performing a torque distributing operation in which torque from the engine is divided and transmitted to the load and the driven machinery in a state such that their torque ratio equals a second predetermined ratio. When power transmission between the engine and the load is performed via both the speed variator and the gearing mechanism, the control unit performs power distribution control for controlling distribution of power conveyed to the speed variator and power conveyed to the gearing mechanism by adjusting torque of the driven machinery.

According to a further aspect, the present invention provides a power transmission system comprising a first power transmitting section capable of transmitting power from an engine to a load via a speed variator while changing speed. The speed variator has a torque transmission capacity which can be controlled. The power transmission system further comprises a second power transmitting section capable of transmitting power from the engine to the load via a gearing mechanism provided in parallel to the speed variator, and a control unit that controls the torque transmission capacity of the speed variator. When power transmission between the engine and the load is performed via both the speed variator and the gearing mechanism, the control unit performs power distribution control for controlling distribution of power conveyed to the speed variator and power conveyed to the gearing mechanism by adjusting torque transmission capacity of the speed variator.

According to the present invention, in a power transmission system in which power of an engine can be transmitted to a load via both a speed variator and a gearing mechanism provided in parallel to one another, distribution of power conveyed to the speed variator and power conveyed to the gearing mechanism can be actively controlled. As a result, it is possible to reduce capacity of the speed variator while also enhancing power transmission efficiency.

BRIEF DESCRIPTION OF THE DRAWINGS

Preferred embodiments of the present invention will be described in detail based on the following figures wherein.

PREFERRED EMBODIMENTS OF THE INVENTION

Figure 1:
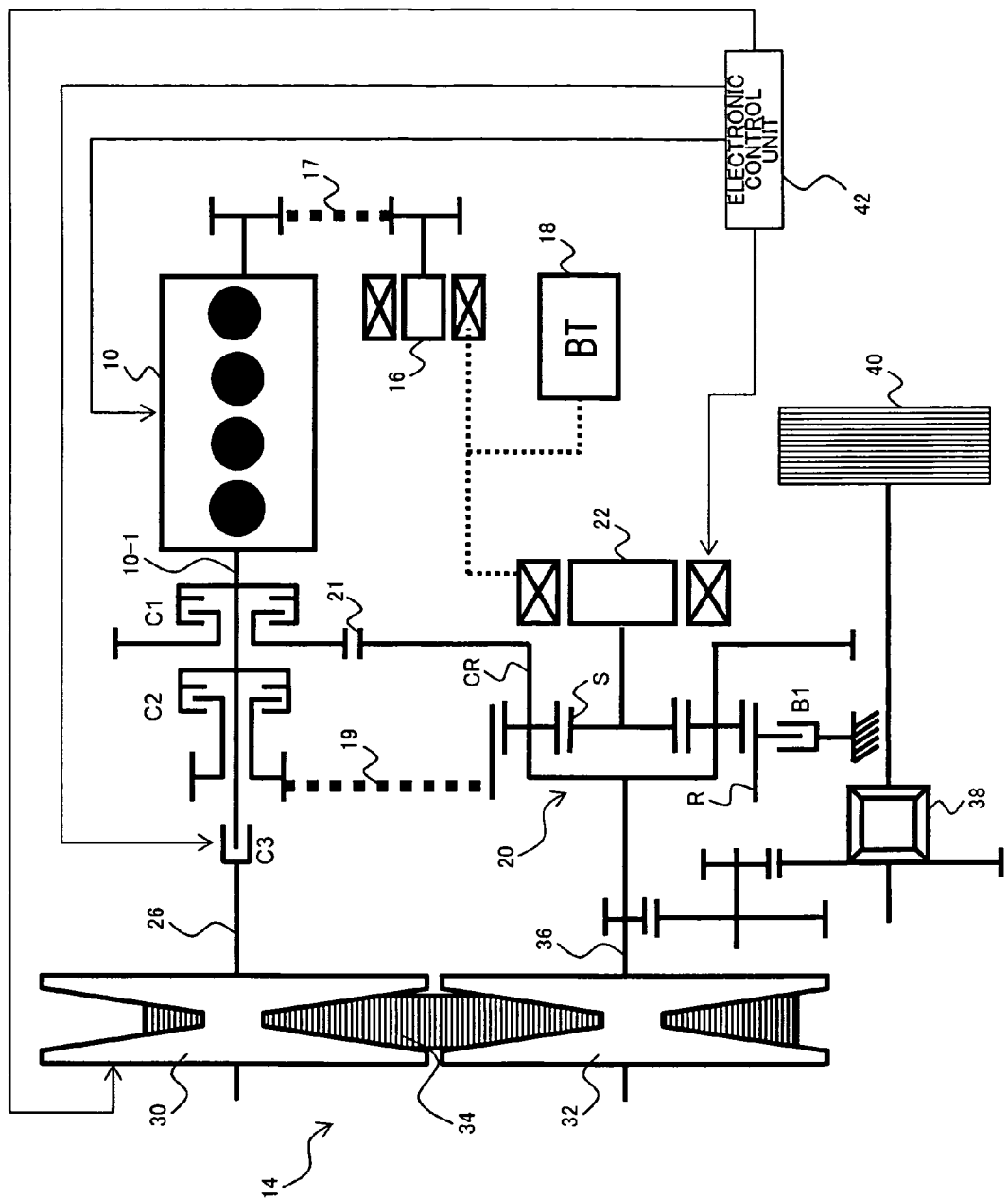
FIG. 1 is a diagram showing a general configuration of a power output system according to a first embodiment of the present invention.

Embodiments for implementing the present invention (hereinafter simply referred to as "embodiments") are described below referring to the drawings.

First Embodiment

FIG. 1 is a diagram showing a general configuration of a power output system including a power transmission system according to a first embodiment of the present invention. The power output system according to the present embodiment is a hybrid-type power output system, and comprises an engine 10, speed variator 14, starter generator 16, battery 18, planetary gear mechanism 20, motor generator 22, electronic control unit 42, clutches C1, C2, C3, and brake B1, which are described below. In the power output system according to the present embodiment, while power from the engine 10 can be transmitted to a load via the speed variator 14 which changes speed, power from the engine 10 can also be transmitted to the load via the planetary gear mechanism 20. The power output system according to the present embodiment is used in a drive system of a vehicle, for example.

Power generated by the engine 10 can be transmitted to an input shaft 26 of the speed variator 14 via the clutch C3. The speed variator 14 transmits the power conveyed to the input shaft 26 to an output shaft 36 while changing speed. The power conveyed to the output shaft 36 of the speed variator 14 is transmitted to a driven wheel 40 of a vehicle via a differential gear 38 so as to be used for driving a load such as a vehicle.

In FIG. 1, a belt-type continuously variable transmission (CVT) is shown as one example of the speed variator 14. The belt-type CVT 14 comprises a primary pulley 30 coupled to the input shaft 26, secondary pulley 32 coupled to the output shaft 36, and endless belt 34 entrained around the primary pulley 30 and the secondary pulley 32. The gear ratio γ (=rotational speed of the input shaft 26/rotational speed of the output shaft 36) is varied by changing the engaging radii engaged by the endless belt 34 around the primary pulley 30 and the secondary pulley 32 by means of hydraulic force, for example. It should be noted that the type of the speed variator 14 is not particularly limited, and the speed variator 14 may alternatively be a toroidal CVT or a multistep automatic transmission (AT).

The starter generator 16 is coupled to an output shaft 10-1 of the engine 10 via a transmission device 17 such as a chain. The starter generator 16 can generate power from electric energy accumulated in an energy accumulation device such as the battery 18, and use this energy to start the engine 10 in a stopped state. In addition, the starter generator 16 can perform regenerating operation (electricity generating operation), in which the starter generator 16 generates electric energy using a portion of power generated by the engine 10. The electric energy generated by the regenerating operation of the starter generator 16 is accumulated in the battery 18.

The planetary gear mechanism 20 is provided in parallel to the speed variator 14, and is configured with a single-pinion type planetary gearset including, as rotating elements, a sun gear S, carrier CR, and ring gear R. The sun gear S is coupled to the motor generator 22, and is capable of transmitting torque from the motor generator 22. The ring gear R is capable of coupling to the output shaft 10-1 of the engine 10 via a transmission device 19 such as a chain and via the clutch C2, and can transmit torque from the engine 10. The carrier CR is coupled to the output shaft 36 of the speed variator 14, and is further capable of coupling to the output shaft 10-1 of the engine 10 via counter gears 21 provided in parallel to the speed variator 14 and via the clutch C1. It should be noted that FIG. 1 shows an example in which the planetary gear mechanism 20 is arranged such that the central axis of the planetary gear mechanism 20 is placed in a position matching the output shaft 36 of the speed variator 14.

The motor generator 22 can perform powering operation, in which the motor generator 22 generates power from electric energy accumulated in the battery 18 and outputs this power to the sun gear S. In addition, the motor generator 22 can also perform regenerating operation (electricity generating operation), in which the motor generator 22 generates electric energy from power conveyed to the sun gear S. In this manner, the motor generator 22 has both functions of an electrically-driven motor (prime mover) and an electric generator (driven machinery). The electric energy generated by the regenerating operation of the motor generator 22 is accumulated in the battery 18. It should be noted that torque generated by the motor generator 22 can be controlled by the electronic control unit 42.

Figure 2:
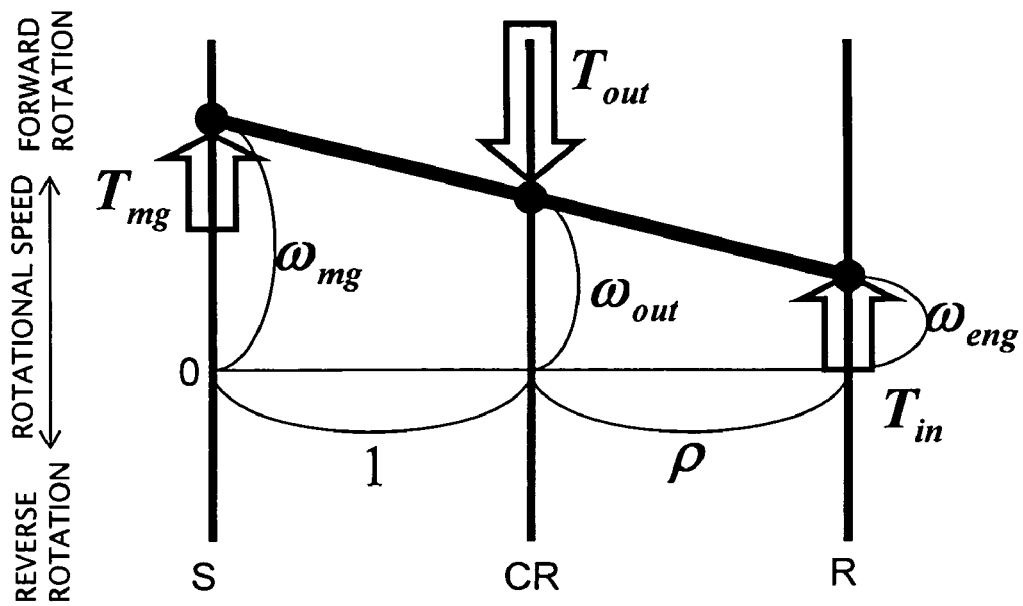
FIG. 2 is a lever diagram showing rotational speeds of respective rotational elements of a planetary gear mechanism in the first embodiment.

In the planetary gear mechanism 20, rotational speeds of the three rotating elements (sun gear S, carrier CR, and ring gear R) have the lever relationship shown in the lever diagram of FIG. 2. In the lever diagram of FIG. 2, p denotes the ratio (constant value) of number of teeth between the sun gear S and the ring gear R. In the lever diagram of FIG. 2, the carrier CR coupled to the output shaft 36 of the speed variator 14 is placed between the sun gear S coupled to the motor generator 22 and the ring gear R couplable to the engine 10. The planetary gear mechanism 20 is a mechanism having two rotational degrees of freedom, and, when rotational speeds of two rotating elements among the three rotating elements (sun gear S, carrier CR, and ring gear R) are decided, the rotational speed of the remaining one element is also decided. Accordingly, by selecting an amount of power of the motor generator 22 (power conveyed to the sun gear S), power conveyed from the engine 10 to the ring gear R via the clutch C2 can be output from the carrier CR and transmitted to the driven wheel 40.

By engaging or releasing (disengaging) the clutch C1, it is possible to couple or decouple between the output shaft 10-1 of the engine and the carrier CR. By means of this clutch C1, coupling of the engine 10 and the driven wheel 40 via the counter gears 21 can be effected or released. By engaging or releasing (disengaging) the clutch C2, it is possible to couple or decouple between the output shaft 10-1 of the engine and the ring gear R. By means of this clutch C2, coupling of the engine 10 and the driven wheel 40 via the planetary gear mechanism 20 can be effected or released. By engaging or releasing (disengaging) the clutch C3, it is possible to couple or decouple between the output shaft 10-1 of the engine and the input shaft 26 of the speed variator 14. By means of this clutch C3, coupling of the engine 10 and the driven wheel 40 via the speed variator 14 can be effected or released. By engaging or releasing (disengaging) the brake B1, it is possible to constrain or allow rotation of the ring gear R. In each of the above-described clutches C1, C2, C3, and brake B1 which function as coupling switch mechanisms for effecting or disallowing power transmission, the switching between the engaged state and the released (disengaged) state can be achieved by employing hydraulic or electromagnetic force, for example. Furthermore, the locking (engaging) force of each of the clutches C1, C2, C3, and brake B1 can be controlled by adjusting the hydraulic or electromagnetic force supplied to each of the clutches C1, C2, C3, and brake B1.

The electronic control unit 42 is configured as a microprocessor having a CPU serving as the main component, and includes a ROM having a processing program stored therein, RAM for temporarily storing data, and input/output (I/O) port. The electronic control unit 42 receives input, via the I/O port, of signals such as a signal denoting throttle position A, a signal denoting rotational speed $\omega_{eng}$ of the engine 10, a signal denoting output shaft rotational speed $\omega_{out}$ of the speed variator 14, and a signal denoting rotational speed $\omega_{mg}$ of the motor generator 22, which are detected by sensors not shown. In turn, the electronic control unit 42 outputs, via the I/O port, signals such as a speed change signal CS_γ for controlling the gear ratio γ of the speed variator 14, an engine control signal CS_ENG for controlling the operation state of the engine 10, a starter control signal CS_SG for controlling the operation state of the starter generator 16, a motor control signal CS_MG for controlling the operation state of the motor generator 22, and locking force control signals CS_C1, CS_C2, CS_C3, CS_B1 for controlling the locking forces of the clutches C1, C2, C3, and brake B1, respectively.

The power output system according to the present embodiment configured as described above includes a first power transmission path by which power from the engine 10 can be transmitted to the driven wheel 40 via the clutch C3 and the speed variator 14, a second power transmission path by which power from the engine 10 can be transmitted to the driven wheel 40 via the clutch C2 and the planetary gear mechanism 20, and a third power transmission path by which power from the engine 10 can be transmitted to the driven wheel 40 via the clutch C1 and the counter gears 21 at a predetermined gear ratio. In a state in which both of the clutches C2 and C3 are engaged, power transmission between the engine 10 and the driven wheel 40 can be performed via both the speed variator 14 and the planetary gear mechanism 20 (via both the first and second power transmission paths).

Next described are operations, particularly for driving a load (vehicle), performed by the power output system according to the present embodiment. In the following description, concerning the rotational directions of the sun gear S, carrier CR, and ring gear R of the planetary gear mechanism, the direction in which the carrier CR rotates when the vehicle travels forward (upper direction in the lever diagram of FIG. 2) is referred to as the forward rotational direction, while the direction in which the carrier CR rotates when the vehicle travels backward (lower direction in the lever diagram of FIG. 2) is referred to as the reverse rotational direction.

Figure 3:
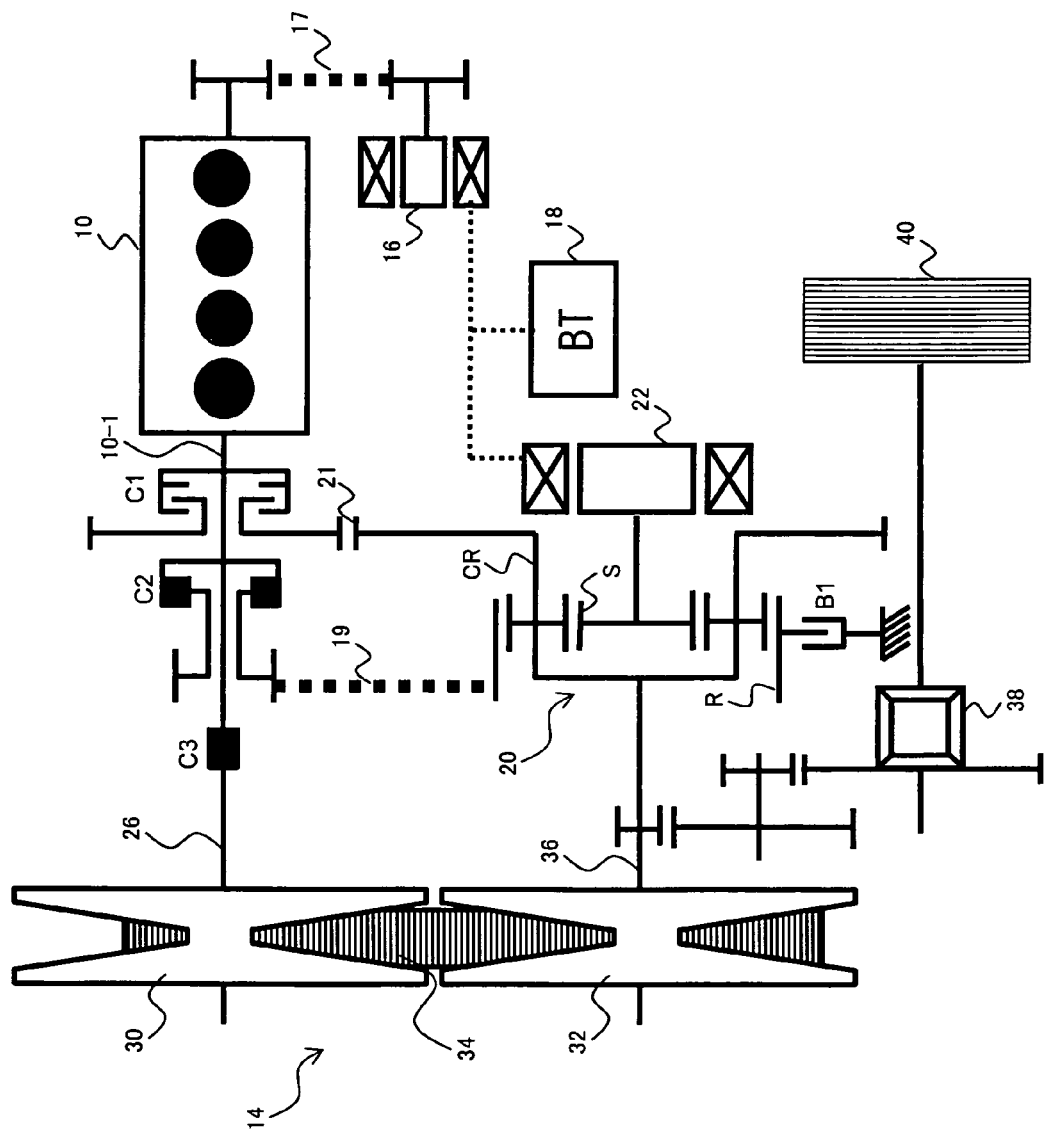
FIG. 3 is a diagram explaining a power distribution control according to the first embodiment.

The operation performed when transmitting power between the engine 10 and the driven wheel 40 via both the speed variator 14 and the planetary gear mechanism 20 is first explained. In this case, the electronic control unit 42 performs control so as to release (disengage) the clutch C1 and the brake B1 and engage the clutches C2 and C3, as shown in FIG. 3. More specifically, control is performed such that the clutch C3 couples the engine 10 and the driven wheel 40 via the speed variator 14, and the clutch C2 couples the engine 10 and the driven wheel 40 via the planetary gear mechanism 20. While in this state, the electronic control unit 42 controls the torque of the motor generator 22.

Assuming that $T_{mg}$ denotes torque of the motor generator 22 (torque of the sun gear S), $T_{in}$ denotes torque of the ring gear R, $T_{out}$ denotes torque of the carrier CR, $\omega_{mg}$ denotes rotational speed of the motor generator 22 (rotational speed of the sun gear S), $\omega_{eng}$ denotes rotational speed of the engine 10 (rotational speed of the ring gear R), $\omega_{out}$ denotes rotational speed of the output shaft 36 (rotational speed of the carrier CR), $P_{mg}$ denotes power of the motor generator 22 (power of the sun gear S), $P_{in}$ denotes power of the ring gear R, and $P_{out}$ denotes power of the carrier CR, equations (1) to (4) below can be obtained from the lever diagram of FIG. 2.

$$T_{in} = \frac{1}{\rho} T_{mg} \qquad (1)$$

-continued $$P_{in} = T_{in} \cdot \omega_{eng} = \frac{1}{\rho} T_{mg} \cdot \omega_{eng} \quad (2)$$

$$T_{out} = T_{mg} + T_{in} = \left(1 + \frac{1}{\rho}\right) T_{mg} \quad (3)$$

$$P_{out} = P_{mg} + P_{in} = \left(1 + \frac{1}{\rho}\right) T_{mg} \cdot \omega_{out} \quad (4)$$

According to equations (1) and (2), the torque $T_{in}$ of the ring gear R is determined by the torque $T_{mg}$ of the motor generator 22, and the power $P_{in}$ of the ring gear R is varied depending on the torque $T_{mg}$ of the motor generator 22. Accordingly, the electronic control unit 42 can adjust the power $P_{in}$ of the ring gear R by changing the torque $T_{mg}$ of the motor generator 22.

Further, according to equation (3), the torque $T_{out}$ of the carrier CR is the torque obtained by combining the torque $T_{in}$ of the ring gear R and the torque $T_{mg}$ of the motor generator 22 (torque of the sun gear S) in a state such that their torque ratio $T_{in}/T_{mg}$ equals the predetermined ratio $1/\rho$. Moreover, according to equation (4), the power $P_{out}$ of the carrier CR is the power obtained by combining the power $P_{in}$ of the ring gear R and the power $P_{mg}$ of the motor generator 22 (power of the sun gear S).

Figure 4:
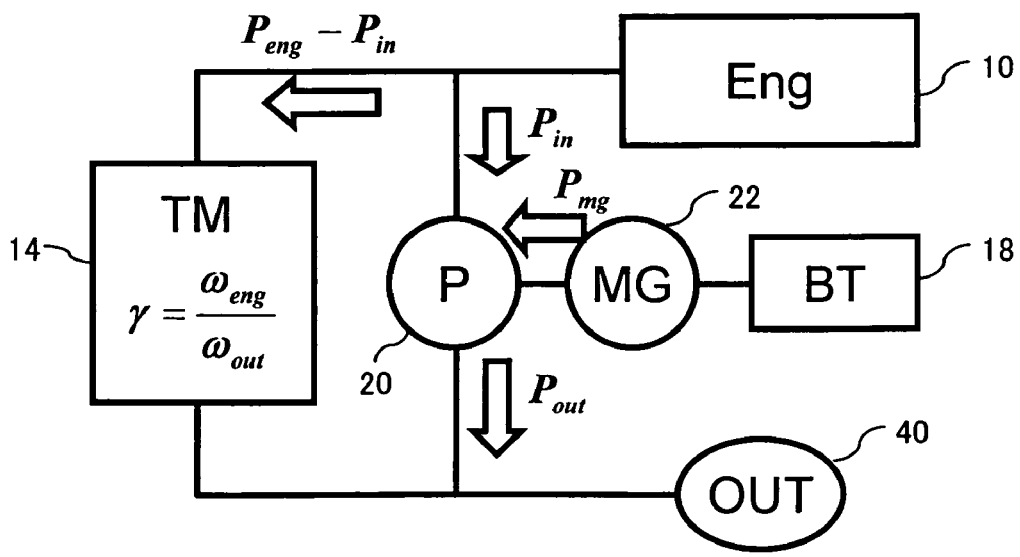
FIG. 4 is a diagram explaining a flow of power in the power output system according to the first embodiment.

When driving the vehicle in the forward direction (driving the driven wheel 40 in the forward rotational direction) by means of power $P_{eng}$ of the engine 10, the electronic control unit 42 performs torque control of the motor generator 22 so as to apply the torque $T_{mg}$ in the forward rotational direction (upper direction in FIG. 2) to the sun gear S. As a result, the power $P_{eng}$ of the engine 10 is transmitted by being distributed to both the speed variator 14 and the planetary gear mechanism 20, as shown in FIG. 4. The power $P_{in}$ conveyed from the engine 10 to the planetary gear mechanism 20 is combined with the power $P_{mg}$ of the motor generator 22, and this combined power $P_{out}$ is transmitted to the driven wheel 40. In achieving this, the planetary gear mechanism 20 performs a torque combining operation in which the torque $T_{in}$ conveyed from the engine 10 to the ring gear R is combined with the torque $T_{mg}$ conveyed from the motor generator 22 to the sun gear S in a state such that their torque ratio $T_{in}/T_{mg}$ equals the predetermined ratio $1/\rho$, and the resulting torque is transmitted from the carrier CR to the driven wheel 40. Furthermore, the power $P_{eng}-P_{in}$ conveyed from the engine 10 to the speed variator 14 is transmitted to the driven wheel 40 while the speed variator 14 changes speed.

As explained above, the power $P_{in}$ conveyed to the planetary gear mechanism 20 can be varied by changing the torque of the motor generator 22. Accordingly, when the electronic control unit 42 controls the torque $T_{mg}$ of the motor generator 22, the electronic control unit 42 can execute power distribution control for controlling distribution of power between the power $P_{eng}-P_{in}$ conveyed to the speed variator 14 and the power $P_{in}$ conveyed to the planetary gear mechanism 20. When executing this control, distribution of the power $P_{eng}-P_{in}$ conveyed to the speed variator 14 and the power $P_{in}$ conveyed to the planetary gear mechanism 20 can be actively controlled without depending on the gear ratio $\gamma$ of the speed variator 14. Further, the power transmitted to the driven wheel 40 can be controlled by adjusting the power $P_{mg}$ of the motor generator 22.

Figure 5:
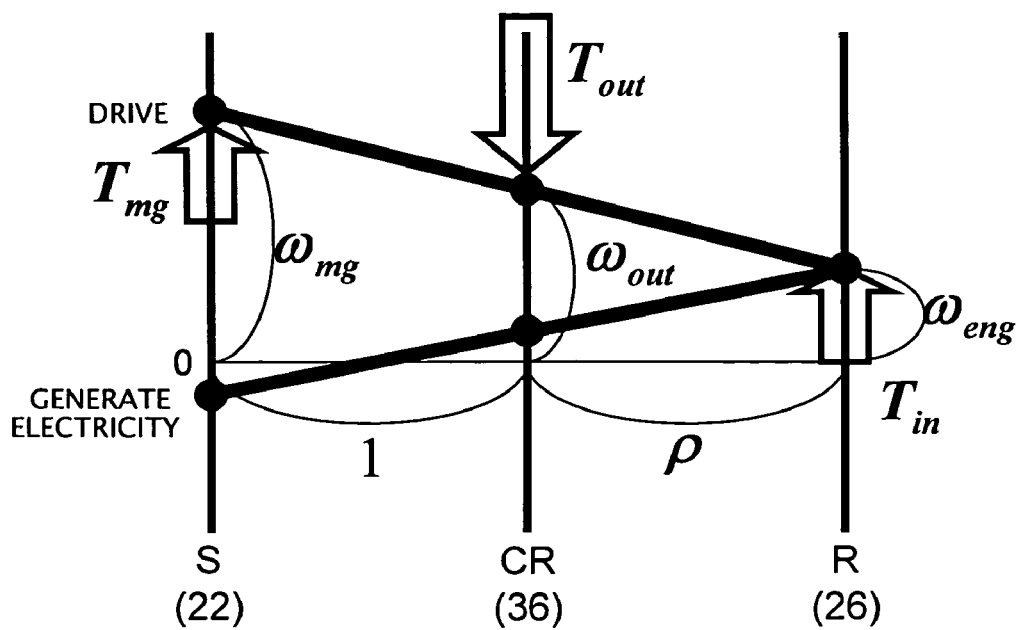
FIG. 5 is a lever diagram showing a power distribution control according to the first embodiment.

It should be note that, as shown by the upper nomograph line in the lever diagram of FIG. 5, when the rotation of the sun gear S is in the same direction as the rotation of the ring gear R (mainly when the vehicle is traveling at high speeds), the motor generator 22 performs powering operation (functions as an electric motor), such that energy flows from the battery 18 toward the planetary gear mechanism 20. In that state, when the electronic control unit 42 causes the starter generator 16 to perform regenerating operation, a portion of the power of the engine 10 can be converted into electric power generated by the starter generator 16. This generated electric power can then be used in carrying out the powering operation by the motor generator 22. On the other hand, as shown by the lower nomograph line in the lever diagram of FIG. 5, when the rotation of the sun gear S is in a direction reverse to the rotation of the ring gear R (mainly when the vehicle is traveling at low speeds), the motor generator 22 performs regenerating operation (functions as an electricity generator), such that energy flows from the planetary gear mechanism 20 toward the battery 18.

Figure 6:
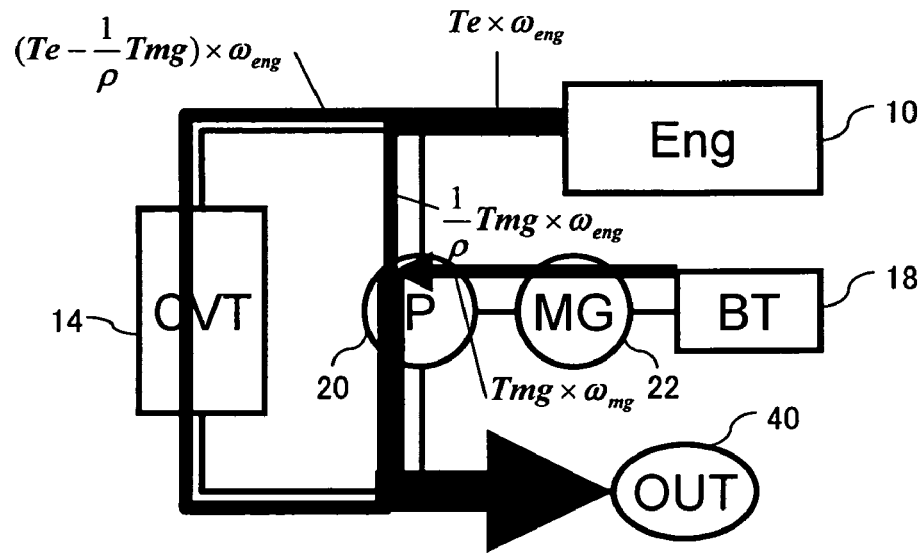
FIG. 6 is a diagram explaining a power distribution control according to the first embodiment.

FIG. 6 shows the flow of power resulting in the respective power transmission paths when the motor generator 22 performs powering operation. Te denotes the torque of the engine 10.

Figure 7:
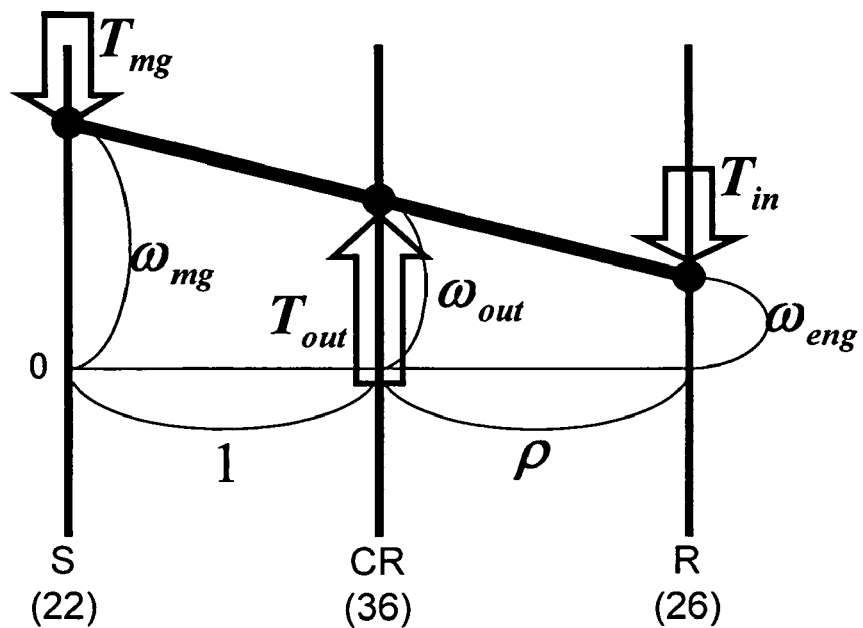
FIG. 7 is a lever diagram showing a power distribution control according to the first embodiment.
Figure 8:
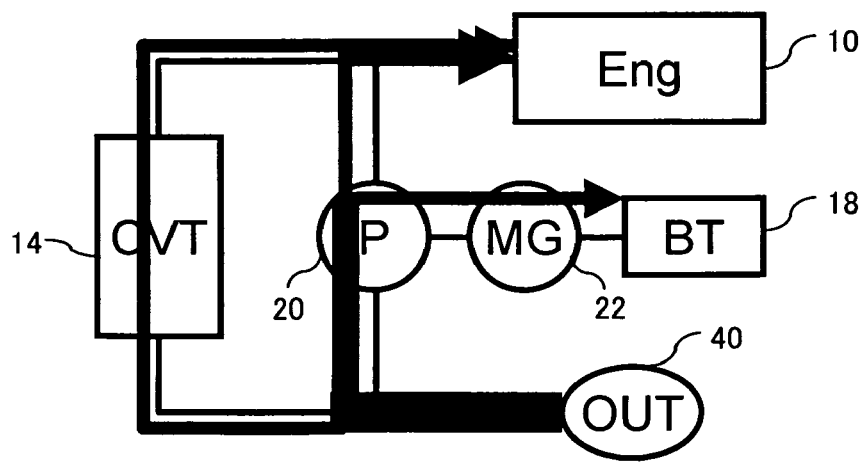
FIG. 8 is a diagram explaining a power distribution control according to the first embodiment.

When kinetic energy of the vehicle is to be regenerated (when the vehicle is decelerating), the electronic control unit 42 performs torque control of the motor generator 22 as shown by an arrow in the lever diagram of FIG. 7, so as to apply the torque $T_{mg}$ in the reverse rotational direction (lower direction in FIG. 7) to the sun gear S. As a result, the power of the driven wheel 40 is transmitted by being distributed to both the speed variator 14 and the planetary gear mechanism 20, as shown in FIG. 8. The power conveyed from the driven wheel 40 to the planetary gear mechanism 20 is further transmitted by being distributed to both the engine 10 and the motor generator 22. In achieving this, the planetary gear mechanism 20 performs a torque distributing operation in which the torque $T_{out}$ conveyed from the driven wheel 40 to the carrier CR is distributed to the ring gear R and the sun gear S in a state such that their torque ratio $T_{in}/T_{mg}$ equals the predetermined ratio $1/\rho$, and the distributed torques are transmitted to the engine 10 and the motor generator 22, respectively. The power conveyed from the driven wheel 40 to the speed variator 14 is transmitted to the engine 10. The power transmitted to the motor generator 22 is converted into electric power generated by the regenerating operation of the motor generator 22.

When regenerating kinetic energy of the vehicle as described above, power conveyed to the planetary gear mechanism 20 can similarly be actively controlled by performing torque control of the motor generator 22. Accordingly, when the electronic control unit 42 controls the torque $T_{mg}$ of the motor generator 22, the electronic control unit 42 can execute power distribution control for controlling distribution of power between the power conveyed to the speed variator 14 and the power conveyed to the planetary gear mechanism 20. Further, by the regenerating operation of the motor generator 22, power of the driven wheel 40 can be converted into electric power generated by the motor generator 22. It should be noted that the electronic control unit 42 may determine whether or not kinetic energy of the vehicle should be regenerated (whether or not the vehicle is now decelerating) based on an amount by which the accelerator pedal of the vehicle is operated and an amount by which the brake pedal is operated, which may be detected by sensors not shown, for example.

Specific preferred details according to which the electronic control unit 42 executes the power distribution control are next described.

It should be noted that power transmission efficiency can be increased by transmitting power via the planetary gear mechanism 20 as compared to by transmitting power via the speed variator (CVT) 14. Further, power transmission efficiency of the speed variator 14 decreases when torque transmitted to the speed variator 14 is small. Accordingly, when the electronic control unit 42 executes the power distribution control, the electronic control unit 42 preferably controls the torque $T_{mg}$ of the motor generator 22 (i.e., controls distribution of power transmitted to the speed variator 14 and power transmitted to the planetary gear mechanism 20) in accordance with the torque Te of the engine 10. More specifically, the electronic control unit 42 preferably increases the torque $T_{mg}$ of the motor generator 22 as the torque Te of the engine 10 decreases, so as to increase power distribution to the planetary gear mechanism 20. The torque Te of the engine 10 may be estimated from throttle position A and rotational speed $\omega_{eng}$ of the engine 10 detected by sensors not shown.

In the CVT 14 in which the gear ratio γ is varied by changing the ratio r1/r2 of contacting radii of the endless belt 34 with respect to the primary pulley 30 and the secondary pulley 32, power transmission efficiency decreases as the value of the contacting radius ratio r1/r2 further deviates from one. Accordingly, when the electronic control unit 42 executes the power distribution control, the electronic control unit 42 preferably adjusts the torque $T_{mg}$ of the motor generator 22 in accordance with the contacting radius ratio r1/r2 to thereby control distribution of power transmitted to the speed variator 14 and power transmitted to the planetary gear mechanism 20. More specifically, the electronic control unit 42 preferably increases the torque $T_{mg}$ of the motor generator 22 as the contacting radius ratio r1/r2 further deviates from one, so as to increase power distribution to the planetary gear mechanism 20. The contacting radius ratio r1/r2 can be calculated from the gear ratio γ (=rotational speed $\omega_{eng}$ of the engine 10/rotational speed $\omega_{out}$ of the output shaft 36), for example. Accordingly, the electronic control unit 42 can control the torque $T_{mg}$ of the motor generator 22 (i.e., the distribution of power transmitted to the speed variator 14 and power transmitted to the planetary gear mechanism 20) based on the gear ratio γ. It should be noted that, when the speed variator 14 is a toroidal CVT in which the gear ratio γ is varied by changing the ratio r1/r2 of contacting radii of a roller with respect to the input and output disks, it is similarly preferable that the electronic control unit 42 adjusts the torque $T_{mg}$ of the motor generator 22 in accordance with the contacting radius ratio r1/r2. In this case, the contacting radius ratio r1/r2 may be obtained based on the gear ratio γ and the roller rotation tilt angle.

Further, in a case in which the maximum torque transmission capacity of the speed variator 14 is set by reducing to a value smaller than the maximum torque of the engine 10, skidding occurs in the speed variator 14 when torque transmitted from the engine 10 to the speed variator 14 exceeds the maximum torque transmission capacity of the speed variator 14. Accordingly, when the electronic control unit 42 executes the power distribution control in this case, the electronic control unit 42 preferably adjusts the torque $T_{mg}$ of the motor generator 22 such that the torque transmitted from the engine 10 to the speed variator 14 does not exceed the maximum torque transmission capacity of the speed variator 14, to thereby control distribution of power transmitted to the speed variator 14 and power transmitted to the planetary gear mechanism 20. More specifically, when the electronic control unit 42 determines that the torque Te of the engine 10 is greater than the maximum torque transmission capacity of the speed variator 14, the electronic control unit 42 preferably controls the torque $T_{mg}$ ($=\rho \times T_{in}$) of the motor generator 22 such that the torque Te-$T_{in}$ transmitted from the engine 10 to the speed variator 14 becomes less than the maximum torque transmission capacity of the speed variator 14.

Figure 9:
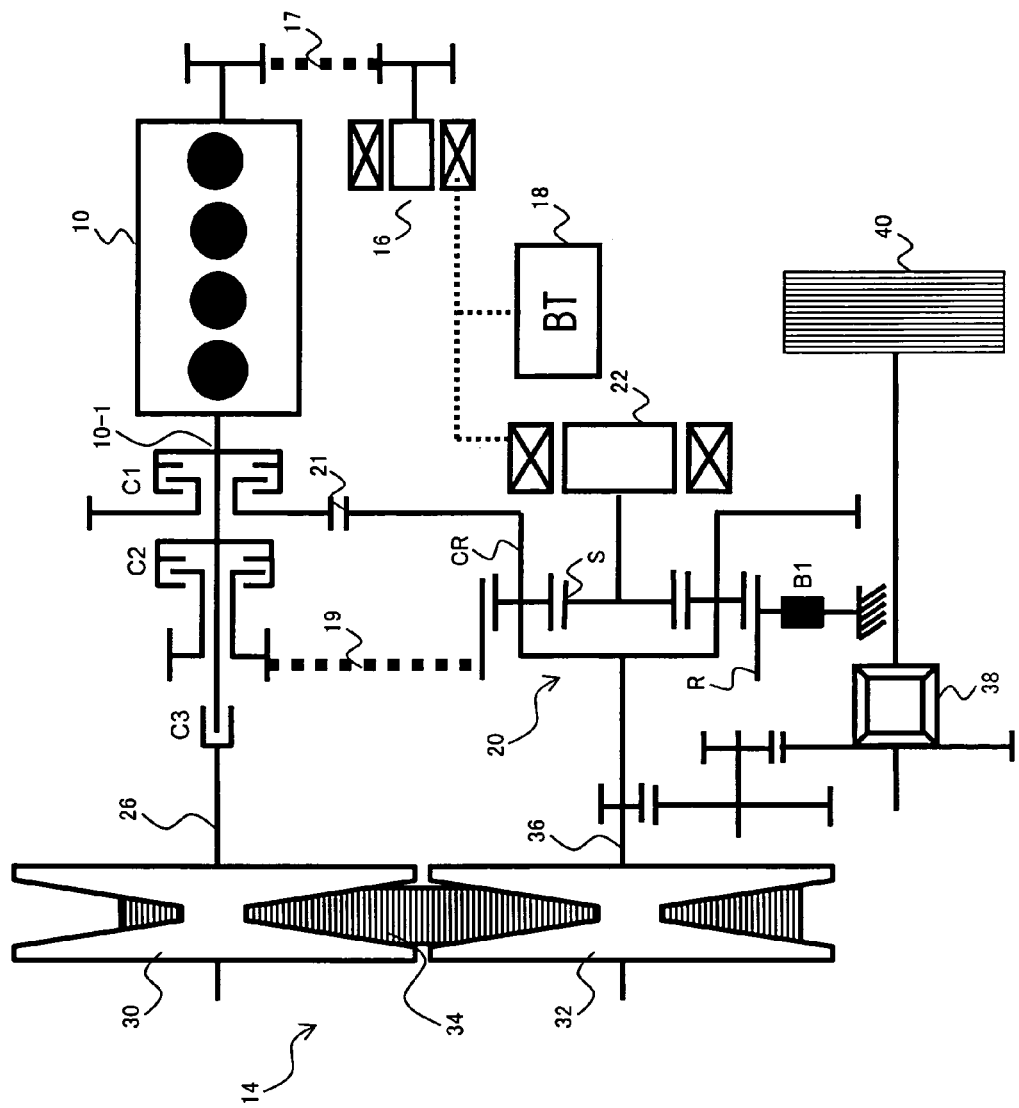
FIG. 9 is a diagram explaining an EV travel control according to the first embodiment.

According to the power output system of the present embodiment, it is also possible to perform EV (electric vehicle) travel operation in which the vehicle is driven by the power of the motor generator 22 without transmitting the power of the engine 10 to the driven wheel 40. When performing the EV travel operation, the electronic control unit 42 performs control so as to release the clutches C1, C2, and C3 and engage the brake B1, as shown in FIG. 9. In other words, control is performed to release the coupling between the engine 10 and the driven wheel 40 via the speed variator 14 and the planetary gear mechanism 20, and to stop rotation of the ring gear R. While in this state, the electronic control unit 42 controls the torque $T_{mg}$ of the motor generator 22 so as to perform EV travel control by which power transmitted between the motor generator 22 and the driven wheel 40 is controlled.

Figure 10:
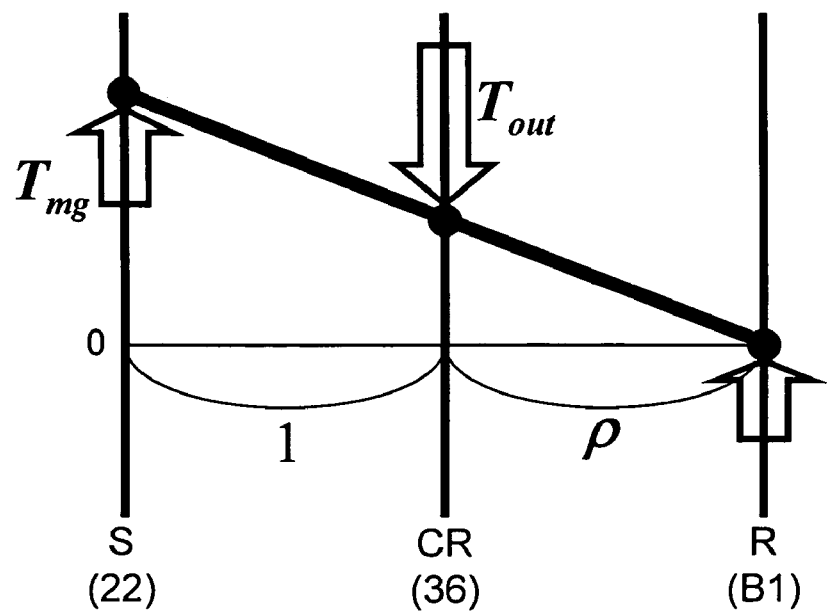
FIG. 10 is a lever diagram explaining an EV travel control according to the first embodiment.
Figure 11:
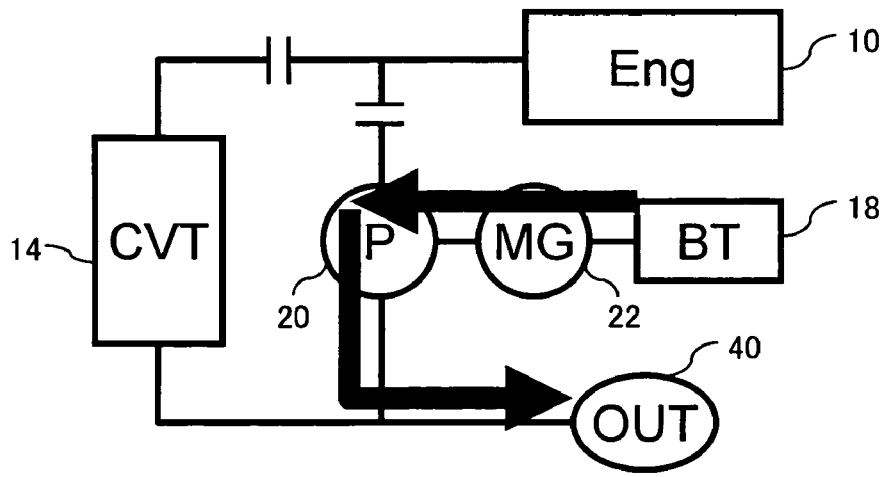
FIG. 11 is a diagram explaining an EV travel control according to the first embodiment.

More specifically, when driving the vehicle in the forward direction by means of power of the motor generator 22, the electronic control unit 42 performs torque control of the motor generator 22 as shown by an arrow in the lever diagram of FIG. 10 so as to apply the torque $T_{mg}$ in the forward rotational direction (upper direction in FIG. 10) to the sun gear S. As a result, powering operation by the motor generator 22 is performed, and, as shown in FIG. 11, power of the motor generator 22 is transmitted to the driven wheel 40 via the planetary gear mechanism 20 while the speed is changed (reduced) by the planetary gear mechanism 20. On the other hand, when regenerating kinetic energy of the vehicle (when the vehicle is decelerating), the electronic control unit 42 performs torque control of the motor generator 22 as shown by an arrow in the lever diagram of FIG. 12 so as to apply the torque $T_{mg}$ in the reverse rotational direction (lower direction in FIG. 12) to the sun gear S. As a result, regenerating operation by the motor generator 22 is performed, and, as shown in FIG. 13, power of the driven wheel 40 is transmitted to the motor generator 22 via the planetary gear mechanism 20 so as to be converted into electric power generated by the motor generator 22.

When performing the above-described EV travel control, the electronic control unit 42 may shut down the engine 10. Alternatively, when performing the above-described EV travel control, the electronic control unit 42 may cause the starter generator 16 to perform regenerating operation after the engine 10 is started by the starter generator 16, so as to convert a portion of power of the engine 10 into electric power generated by the starter generator 16. This generated electric power may then be used in carrying out powering operation by the motor generator 22.

Figure 14:
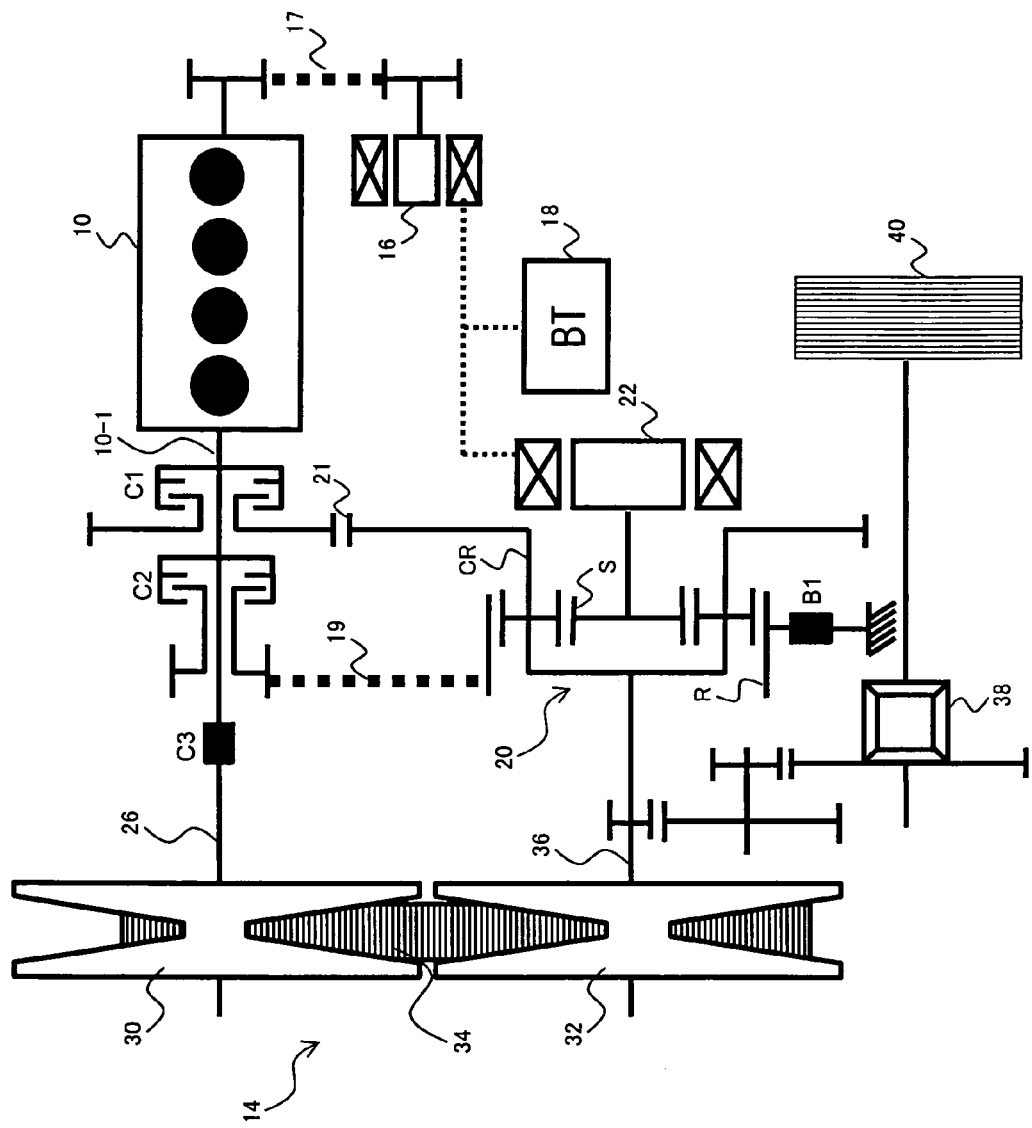
FIGS. 14-16 are diagrams explaining power assist control according to the first embodiment.

Further, according to the power output system of the present embodiment, when the vehicle is driven by the power of the engine 10, it is possible to assist the vehicle drive with the power of the motor generator 22. When doing so, the electronic control unit 42 performs control so as to release the clutches C1 and C2 and engage the clutch C3, as shown in FIG. 14. In other words, control is performed to couple the engine 10 and the driven wheel 40 via the speed variator 14, and to disengage coupling between the engine 10 and the driven wheel 40 via the planetary gear mechanism 20, so as to allow power transmission to occur between the engine 10 and the driven wheel 40 via the speed variator 14. In addition, as shown in FIG. 14, the electronic control unit 42 performs control to engage the brake B1, thereby stopping rotation of the ring gear R. While in this state, the electronic control unit 42 controls the torque $T_{mg}$ of the motor generator 22 so as to perform power assist control by which power transmitted between the motor generator 22 and the driven wheel 40 is adjusted. When the electronic control unit 42 performs the power assist control, operation state of the engine 10 is controlled such that the engine power is adjusted to a predetermined value at which high-efficiency operation can be achieved, and a deviation occurring between an amount of power requested by the vehicle (load) and the engine power can be compensated for by the power of the motor generator 22.

Figure 15:
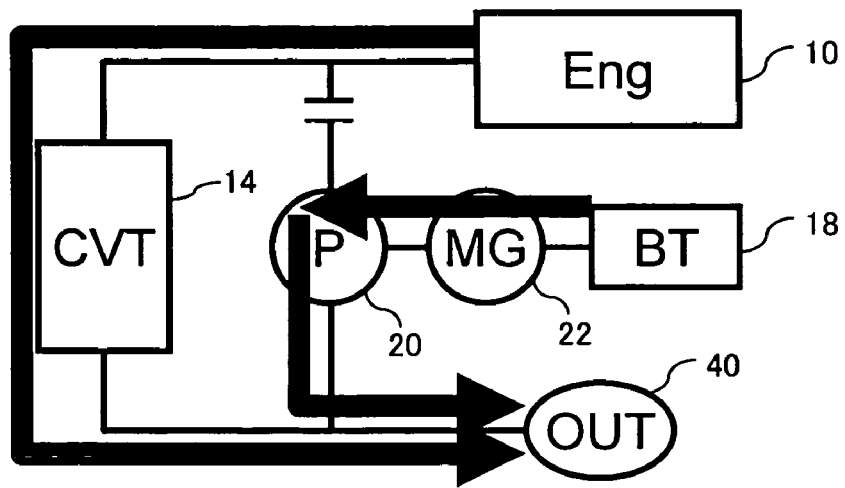

More specifically, in a state in which the requested power of the vehicle is greater than the engine power when the vehicle is to be driven in the forward direction by means of power of the engine 10, the electronic control unit 42 performs torque control of the motor generator 22 as shown by an arrow in the lever diagram of FIG. 10 so as to apply the torque $T_{mg}$ in the forward rotational direction (upper direction in FIG. 10) to the sun gear S. As a result, powering operation by the motor generator 22 is performed. Specifically, as shown in FIG. 15, power of the motor generator 22 is transmitted to the driven wheel 40 via the planetary gear mechanism 20 while the speed is changed (reduced) by the planetary gear mechanism 20, and at the same time, the power of the engine 10 is transmitted to the driven wheel 40 via the speed variator 14 while the speed is changed by the speed variator 14. On the other hand, when the requested power of the vehicle is smaller than the engine power, the electronic control unit 42 performs torque control of the motor generator 22 as shown by an arrow in the lever diagram of FIG. 12 so as to apply the torque $T_{mg}$ in the reverse rotational direction (lower direction in FIG. 12) to the sun gear S. As a result, regenerating operation by the motor generator 22 is performed, and power of the driven wheel 40 is transmitted to the motor generator 22 via the planetary gear mechanism 20 so as to be converted into electric power generated by the motor generator 22.

Figure 12:
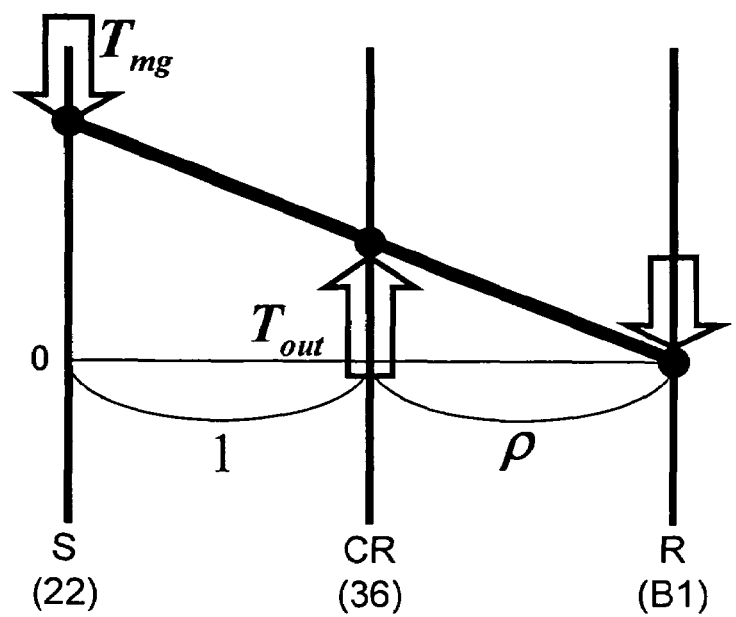
FIG. 12 is a lever diagram explaining an EV travel control according to the first embodiment.
Figure 13:
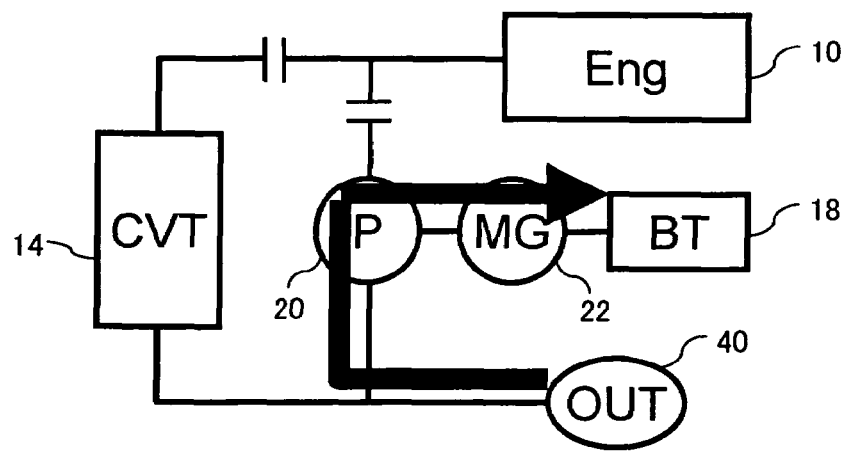
FIG. 13 is a diagram explaining an EV travel control according to the first embodiment.
Figure 16:
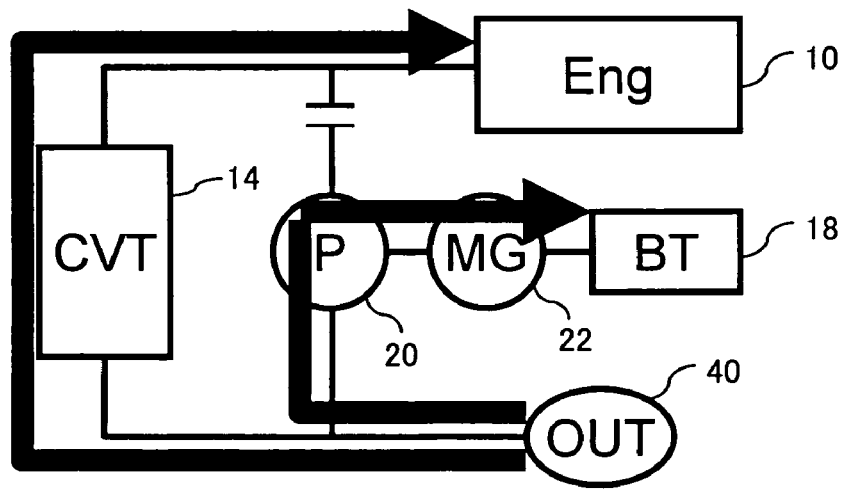

Furthermore, when kinetic energy of the vehicle is to be regenerated (when the vehicle is decelerating), the electronic control unit 42 similarly performs torque control of the motor generator 22 as shown by an arrow in the lever diagram of FIG. 12 so as to apply the torque $T_{mg}$ in the reverse rotational direction to the sun gear S. As a result, regenerating operation by the motor generator 22 is performed. Specifically, as shown in FIG. 16, power of the driven wheel 40 is transmitted to the motor generator 22 via the planetary gear mechanism 20 so as to be converted into electric power generated by the motor generator 22, and at the same time, power of the driven wheel 40 is also transmitted to the engine 10 via the speed variator 14.

Figure 17:
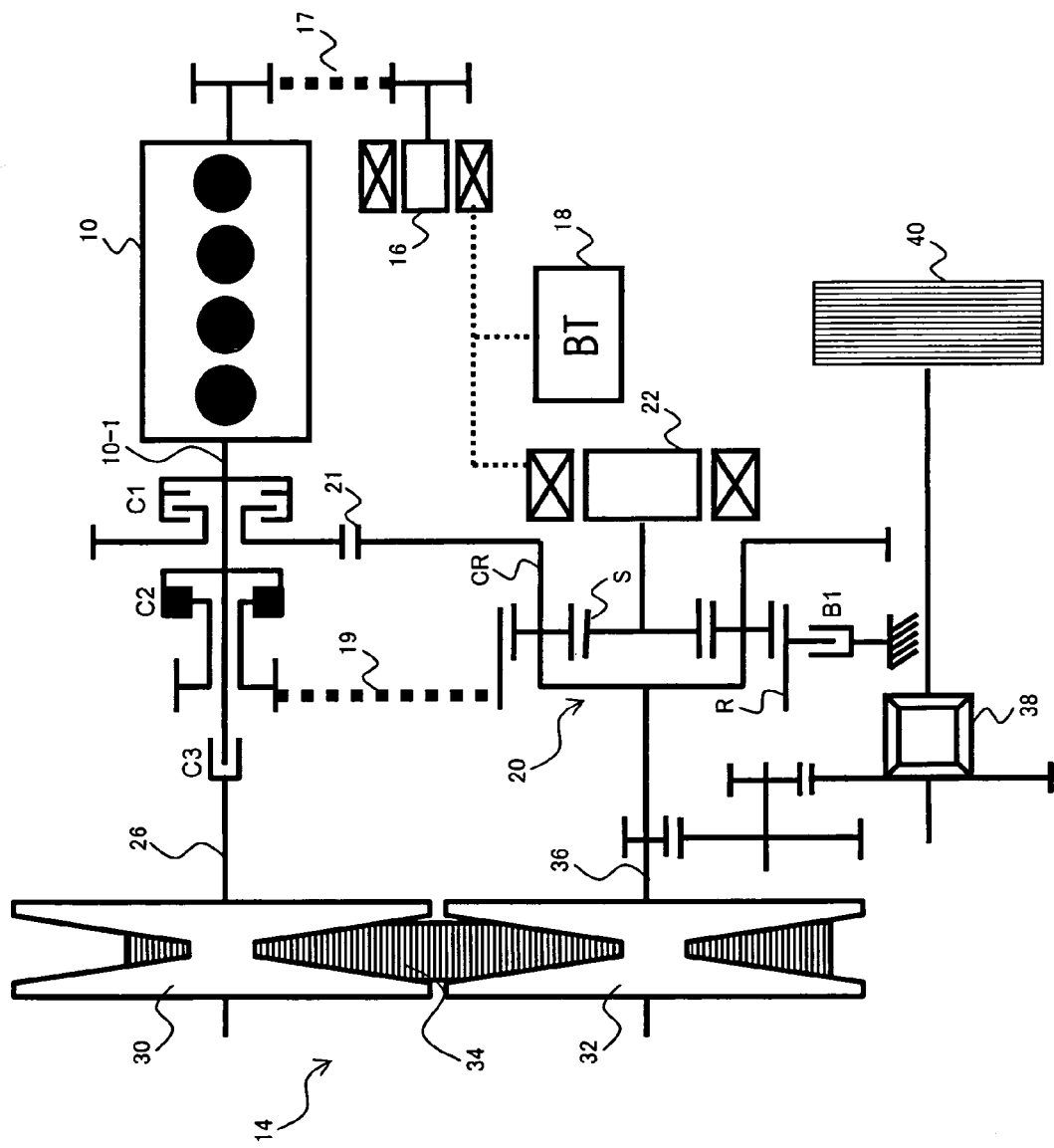
FIG. 17 is a diagram explaining a move-off operation according to the first embodiment.
Figure 18:
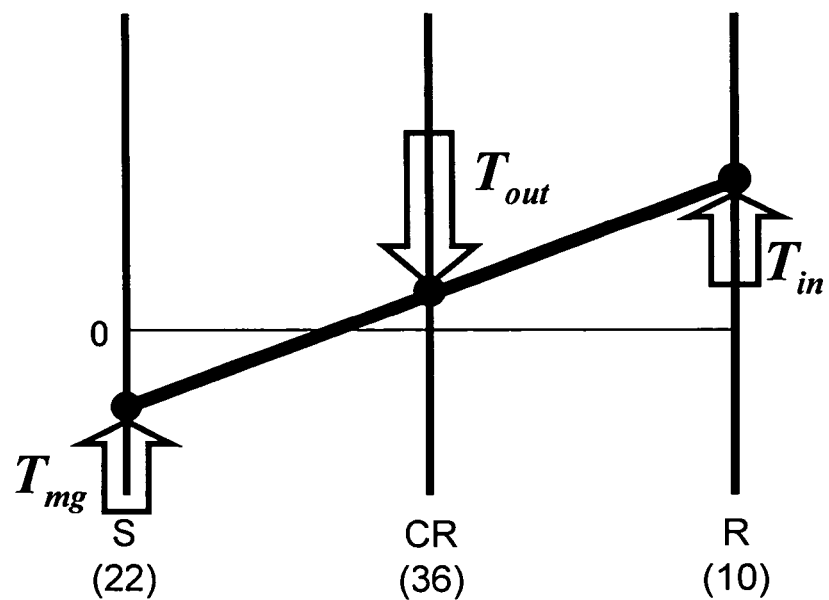
FIG. 18 is a lever diagram explaining a move-off operation according to the first embodiment.
Figure 19:
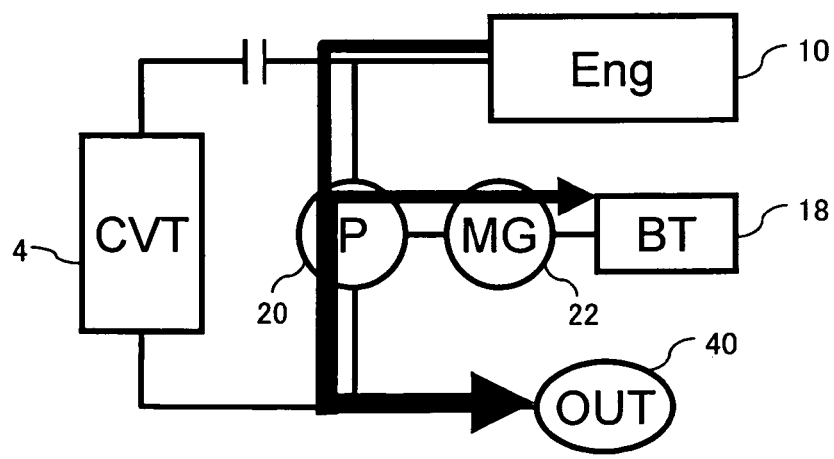
FIG. 19 is a diagram explaining a move-off operation according to the first embodiment.

According to the power output system of the present embodiment, when carrying out a move-off operation in which the vehicle in a stopped state is driven forward, the electronic control unit 42 performs control so as to release the clutches C1, C3 and the brake B1 and engage the clutch C2 as shown in FIG. 17 while the engine 10 is rotationally activated (while the engine 10 is operated). In other words, control is performed to couple the engine 10 and the ring gear R, and to disengage coupling between the engine 10 and the driven wheel 40 via the via the speed variator 14. When the vehicle (rotation of the carrier CR) is stopped, the rotation of the sun gear S is in the opposite direction from the rotation of the ring gear R. While in this state, the electronic control unit 42 performs torque control of the motor generator 22 as shown by an arrow in the lever diagram of FIG. 18 so as to apply the torque $T_{mg}$ in the forward rotational direction (upper direction in FIG. 18) to the sun gears. As a result, torque can be applied to the driven wheel 40 from the carrier CR, to thereby carry out the move-off operation of the vehicle. During this operation, the rotation of the sun gear S is initially in the opposite direction from the rotation of the ring gear R, but by applying the torque $T_{mg}$ to the sun gear S in the direction for stopping this rotation in the opposite direction, the motor generator 22 is controlled to be placed in a regenerating operation state. Accordingly, as shown in FIG. 19, power conveyed from the engine 10 to the ring gear R of the planetary gear mechanism 20 is transmitted to the motor generator 22 so as to be converted into electric power generated by the motor generator 22, and at the same time, the carrier CR is subjected to torque obtained by amplifying the torque $T_{mg}$ of the motor generator 22 applied in order to receive the torque $T_{in}$ conveyed from the engine 10 to the ring gear R. This amplified torque is transmitted to the driven wheel 40. As such, in the present embodiment, by performing control for causing the motor generator 22 to carry out regenerating operation using power of the engine 10, it is possible to achieve a function of an electric torque converter in which torque is amplified and transmitted to the driven wheel 40.

Figure 20:
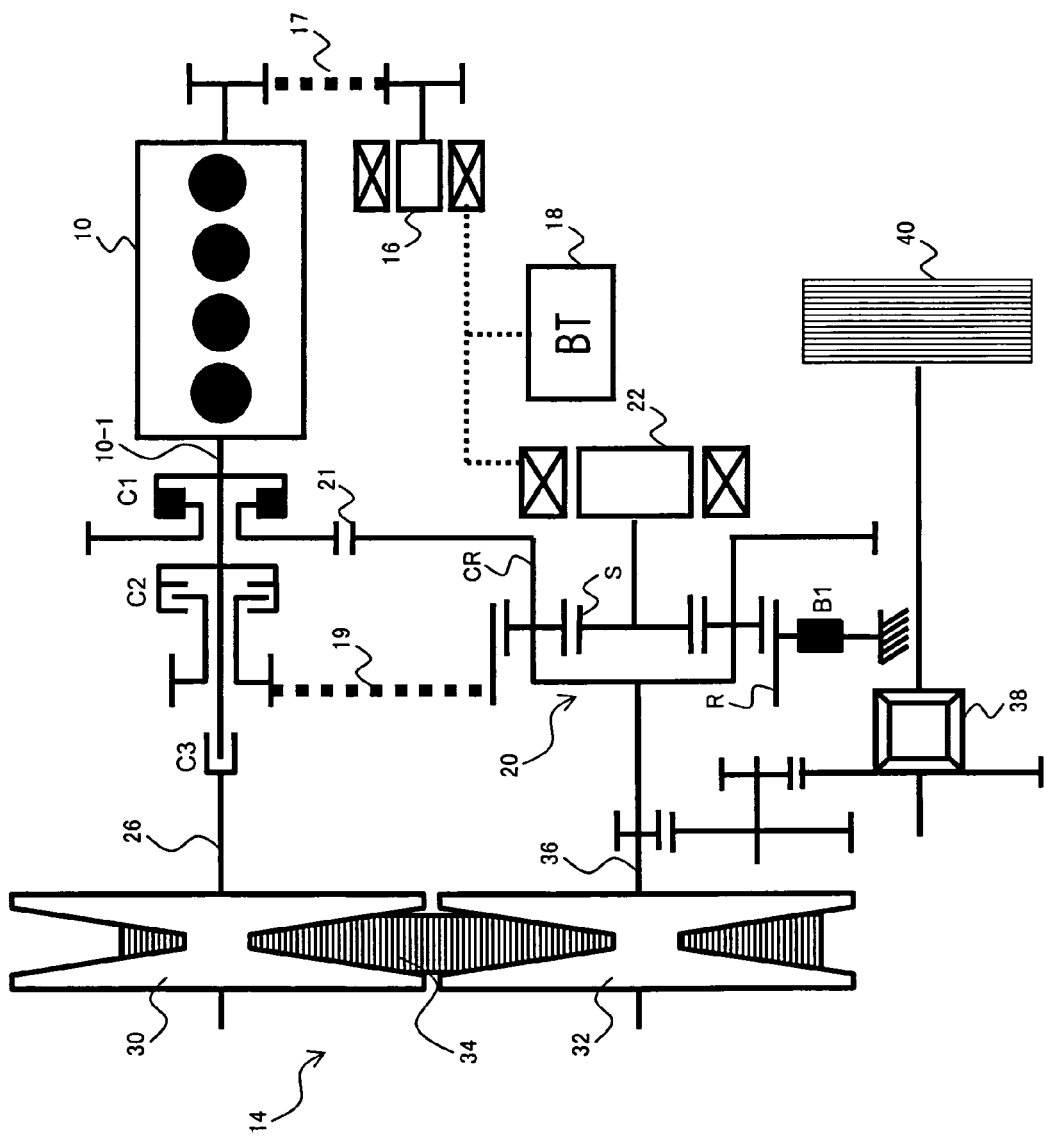
FIGS. 20 and 21 are diagrams explaining a reverse launch operation according to the first embodiment.
Figure 21:
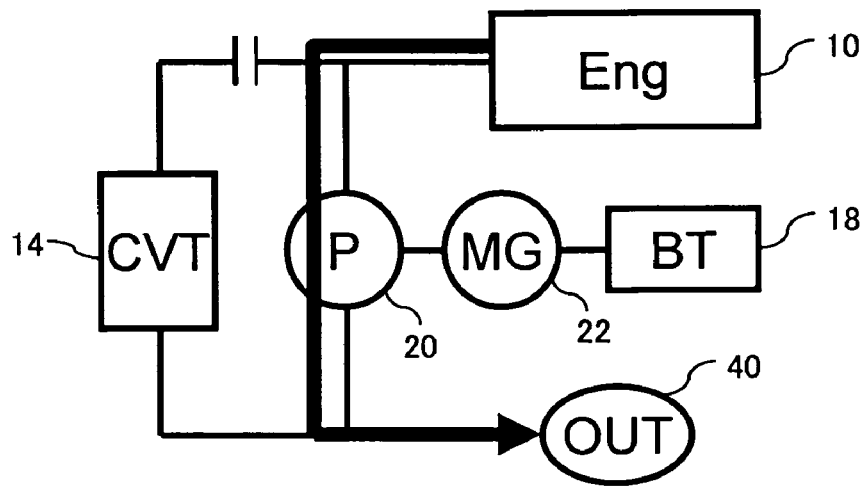

According to the power output system of the present embodiment, when carrying out a reverse launch operation in which the vehicle is driven in the reverse direction, the electronic control unit 42 first performs control so as to release the clutches C1, C2, and C3 and engage the brake B1 while the engine 10 is rotationally activated. From this state, the electronic control unit 42 gradually increases the locking force of the clutch C1 so as to couple the engine 10 and the driven wheel 40 via the counter gears 21, as shown in FIG. 20. As a result of this coupling, the carrier CR is subjected to torque in the reverse rotational direction, and power of the engine 10 is transmitted to the driven wheel 40 via the carrier CR of the planetary gear mechanism 20 at a predetermined gear ratio, as shown in FIG. 21. The gear ratio during the reverse travel can be set by the gear ratio of the counter gears 21.

The engaged/released states of the clutches C1, C2, C3 and the brake B1 in the above-described respective operations of the present embodiment can be summarized as shown in Table 1 below. In Table 1, "O" denotes the engaged state, while blank denotes the released state.

TABLE 1

|  | C1 | C2 | C3 | B1 |
|---|---|---|---|---|
| power distribution control |  | O | O |  |
| EV travel control |  |  |  | O |
| power assist control |  |  | O | O |
| move-off operation |  | O |  |  |
| reverse launch operation | O |  |  | O |

According to the present embodiment described above, when power transmission between the engine 10 and the driven wheel 40 is performed via both the speed variator 14 and the planetary gear mechanism 20, power distribution between the power $P_{eng}$-$P_{in}$ conveyed to the speed variator 14 and the power $P_{in}$ conveyed to the planetary gear mechanism 20 can be actively controlled by adjusting the torque $T_{mg}$ of the motor generator 22. For example, in a state in which power transmission efficiency of the speed variator 14 is reduced, such as when torque obtained at the input shaft 26 is small or when the contacting radius ratio r1/r2 of the endless belt 34 with respect to the primary pulley 30 and the secondary pulley 32 is greatly deviated from one, it is possible to improve the power transmission efficiency by increasing the torque $T_{mg}$ of the motor generator 22 so as to increase distribution of power $P_{in}$ to the planetary gear mechanism 20. In addition, in a state in which the torque Te of the engine 10 becomes greater than the maximum torque transmission capacity of the speed variator 14, by increasing the torque $T_{mg}$ of the motor generator 22 so as to increase distribution of power $P_{in}$ to the planetary gear mechanism 20, it is possible to prevent generation of skidding in the speed variator 14 even when the maximum torque transmission capacity of the speed variator 14 is set to a small value. In this manner, as it is possible to appropriately control power distribution between the power $P_{eng}$-$P_{in}$ conveyed to the speed variator 14 and the power $P_{in}$ conveyed to the planetary gear mechanism 20 according to the present embodiment, maximum torque transmission capacity of the speed variator 14 can be reduced while enhancing power transmission efficiency.

According to the above-referenced patent documents 3-5, input and output axes of a CVT are configured to be couplable by a different transmission device (such as a gear or chain), and power of the engine can be conveyed to a load via both the CVT and the transmission device. However, according to patent documents 3-5, power transmission via the transmission device can be performed only when the gear ratio of the CVT equals a specific value. In contrast, according to the present invention, power transmission via the planetary gear mechanism 20 can be performed regardless of the value of the gear ratio γ of the speed variator 14, such that power transmission efficiency can be enhanced over a wide range of gear ratio γ.

Further, according to the present embodiment described above, EV travel operation in which the vehicle is driven by the power of the motor generator 22 without transmitting the power of the engine 10 to the driven wheel 40 can be performed in a state in which the clutches C1, C2, and C3 are released and the brake B1 is engaged. Moreover, in a state in which the clutches C1, C2 are released and the clutch C3 and the brake B1 are engaged, it is possible to drive the vehicle by means of the power of the engine 10 while assisting the vehicle drive with the power of the motor generator 22. Since power transmitted to the driven wheel 40 can be controlled by the power of the motor generator 22 as described above, a system according to the present embodiment can provide the function of a hybrid power output system while reducing dependency on the electric system.

Furthermore, according to the present embodiment, while in a state in which the clutch C2 is engaged and the rotation of the sun gear S is in the opposite direction from the rotation of the ring gear R, by controlling the torque $T_{mg}$ of the motor generator such that the torque is applied to the sun gear S in the direction for stopping the rotation of the sun gear S, it is possible to apply torque to the driven wheel 40 via the carrier CR to thereby carry out the move-off operation of the vehicle. During this operation, electricity can be generated by the motor generator 22 using the power of the engine 10, and at the same time, it is possible to achieve a function of an electric torque converter in which torque is amplified and transmitted to the driven wheel 40. Accordingly, a fluid-type torque converter for performing torque transmission via a fluid need not be provided, enabling downsizing of the system. Further, even when the amount of electric energy accumulated in the battery 18 is low, it is possible to drive the vehicle while performing electricity generation by the motor generator 22 using the power of the engine 10.

Further, according to the present embodiment, during a move-off operation, power is transmitted from the engine 10 to the driven wheel 40 via the planetary gear mechanism 20 by controlling the torque of the motor generator 22, while in a state in which coupling of the engine 10 and the driven wheel 40 via the speed variator 14 is disengaged by releasing the clutch C3. It is therefore unnecessary to control the gear ratio γ of the speed variator (CVT) 14 to the maximum gear ratio (the state for maximally reducing the speed) in order to perform a move-off operation. Accordingly, the gear ratio γ of the speed variator (CVT) 14 need not be downshifted to the maximum gear ratio (the state for maximally reducing the speed) immediately before stopping the vehicle, and it is also unnecessary to maintain the gear ratio during the temporary stopping of the vehicle. As a result, hydraulic power required for speed changing operations of the speed variator can be reduced, enabling to enhance efficiency of the speed variator 14.

In addition, according to the present embodiment, the vehicle can be moved in reverse direction by gradually increasing the locking force of the clutch C1 from a state in which the clutches C2, C3 and the brake B1 are released. Accordingly, a forward/reverse switching device need not be provided, enabling downsizing of the system.

Second Embodiment

Figure 22:
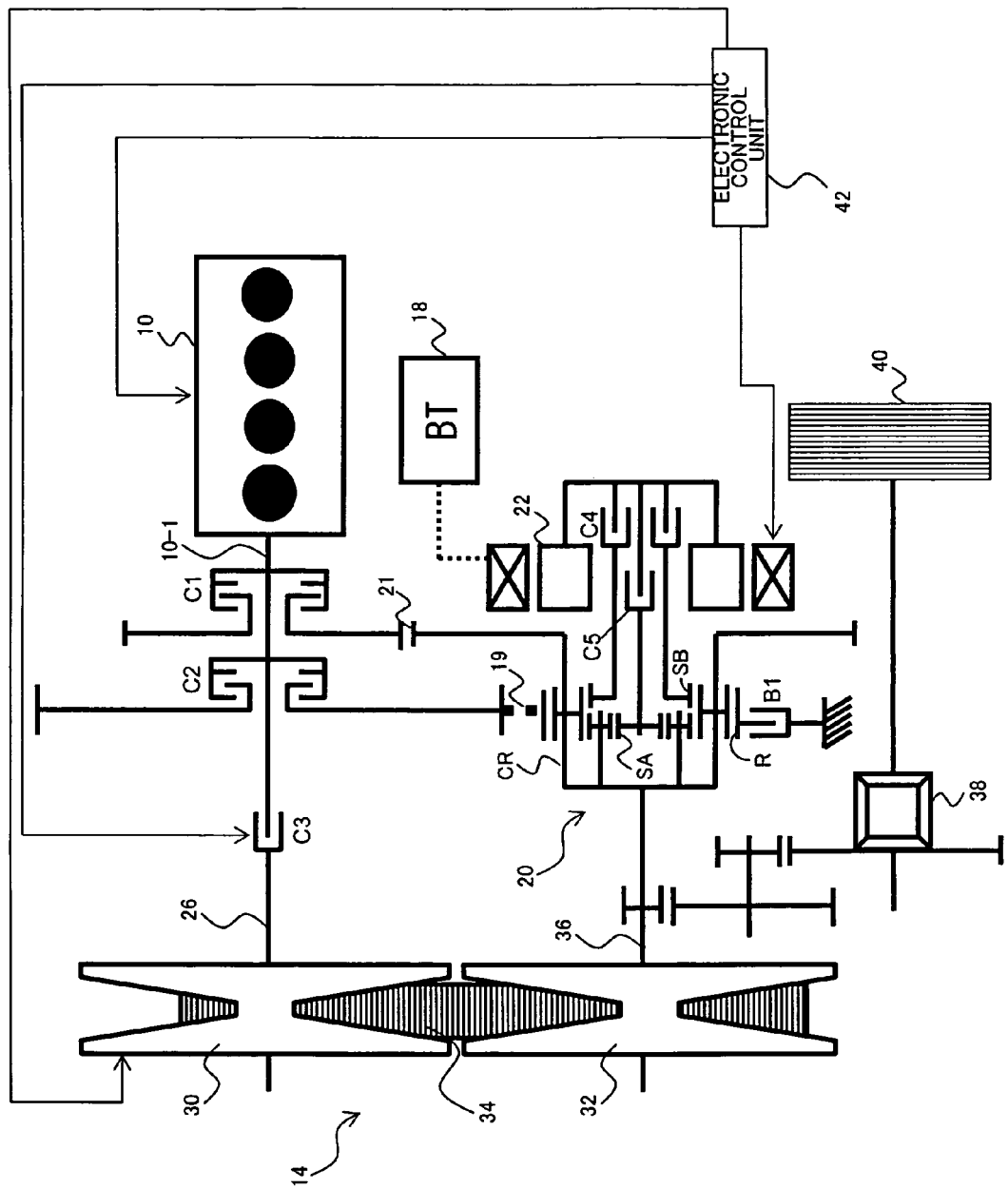
FIG. 22 is a diagram showing a general configuration of a power output system according to a second embodiment of the present invention.

FIG. 22 is a diagram showing a general configuration of a power output system according to a second embodiment of the present invention. In contrast to the first embodiment, the planetary gear mechanism 20 provided in parallel to the speed variator 14 in the present embodiment is configured with a Ravigneaux type planetary gear mechanism, in which the carrier and the ring gear are shared by a single-pinion type planetary gearset and a double-pinion type planetary gearset. This Ravigneaux type planetary gear mechanism includes, as the rotating elements, sun gears SA and SB, carrier CR, and ring gear R. The sun gears SA and SB are capable of coupling to the motor generator 22 via clutches C5 and C4, respectively, and torque can be transmitted from the motor generator 22 to the sun gears SA, SB. The ring gear R is capable of coupling to the output shaft 10-1 of the engine 10 via a transmission device 19 such as a chain and via the clutch C2. The carrier CR is coupled to the output shaft 36 of the speed variator 14, and is further capable of coupling to the output shaft 10-1 of the engine 10 via the counter gears and the clutch C1. In FIG. 22, the starter for staring the engine 10 from a shutdown state is not shown. Further, it should be noted that FIG. 22 shows an example in which the planetary gear mechanism 20 is arranged such that the central axis of the planetary gear mechanism 20 is placed in a position matching the output shaft 36 of the speed variator 14.

The clutch C4 switches the coupling state between the sun gear SB and the motor generator 22 so as to permit or disallow transmission of power therebetween. The clutch C5 switches the coupling state between the sun gear SA and the motor generator 22 so as to permit or disallow transmission of power therebetween. In each of the clutches C4 and C5, the switching between the engaged state and the released (disengaged) state can be achieved by employing hydraulic or electromagnetic force, for example. Furthermore, the locking (engaging) force of the clutches C4, C5 may be adjusted by controlling locking force control signals CS_C4 and CS_C5 from the electronic control unit 42 which adjust the hydraulic or electromagnetic force supplied to the clutches C4 and C5.

Figure 23:
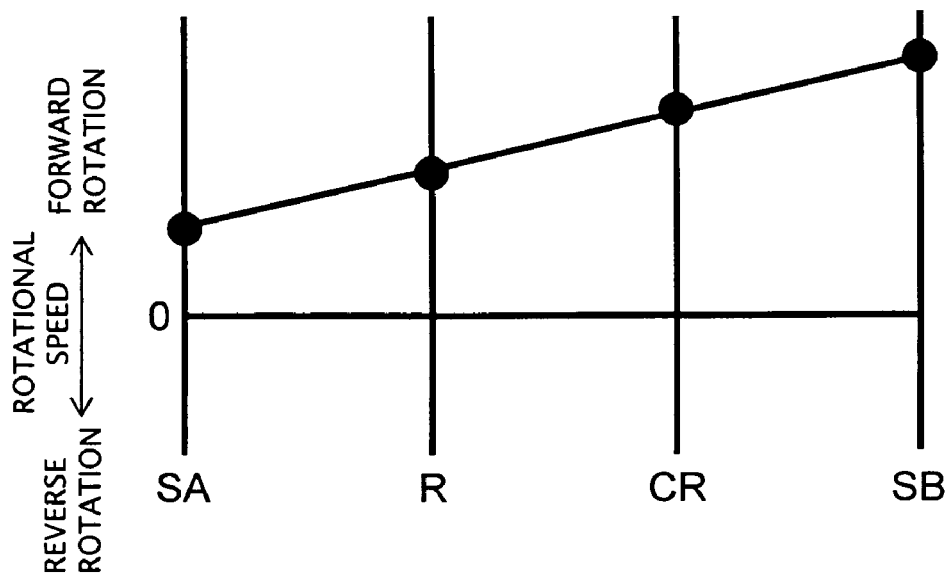
FIG. 23 is a lever diagram showing rotational speeds of respective rotational elements of a planetary gear mechanism in the second embodiment.

In the Ravigneaux planetary gear mechanism, rotational speeds of the four rotating elements (sun gears SA and SB, carrier CR, and ring gear R) have the lever relationship shown in the lever diagram of FIG. 23. In the lever diagram of FIG. 23, the rotating elements are arranged in the order of sun gear SA, ring gear R, carrier CR, and sun gear SB, such that the ring gear R couplable to the engine 10 and the carrier CR coupled to the output shaft 36 of the speed variator 14 are placed between the sun gears SA, SB couplable to the motor generator 22. The Ravigneaux planetary gear mechanism is a mechanism having two rotational degrees of freedom, and, when rotational speeds of two rotating elements among the four rotating elements (sun gears SA and SB, carrier CR, and ring gear R) are decided, the rotational speeds of the remaining two elements are also decided. Accordingly, by selecting an amount of power of the motor generator 22 while the motor generator 22 is coupled to either one of the sun gears SA, SB, power conveyed from the engine 10 to the ring gear R via the clutch C2 can be output from the carrier CR to be transmitted to the driven wheel 40. As other structures of the second embodiment are identical to those of the first embodiment, description of those structures will not be repeated below.

Operations performed by the power output system according to the present embodiment are next described. It should be noted that operations concerning which explanation will not be repeated are identical to those of the first embodiment. Further, in the following description, concerning the rotational directions of the sun gears SA and SB, carrier CR, and ring gear R of the planetary gear mechanism 20, the direction in which the carrier CR rotates when the vehicle travels forward (upper direction in the lever diagram of FIG. 23) is referred to as the forward rotational direction, while the direction in which the carrier CR rotates when the vehicle travels backward (lower direction in the lever diagram of FIG. 23) is referred to as the reverse rotational direction, similarly to in the above description.

Figure 24:
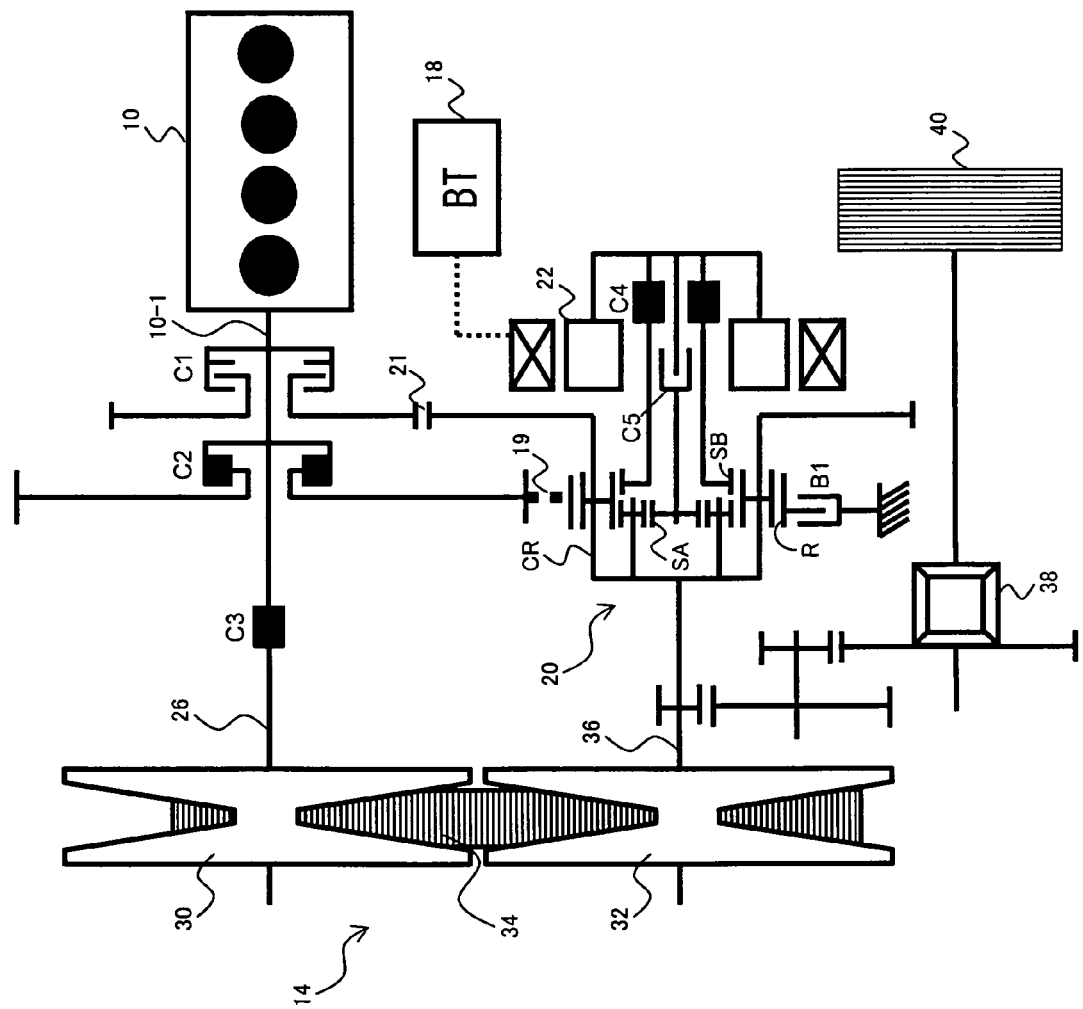
FIG. 24 is a diagram explaining a power distribution control according to the second embodiment.

When power transmission between the engine 10 and the driven wheel 40 is to be performed via both the speed variator 14 and the planetary gear mechanism 20, the electronic control unit 42 performs control so as to release the clutch C1 and the brake B1 and to engage the clutches C2 and C3, as shown in FIG. 24. In addition, as shown in FIG. 24, the electronic control unit 42 performs control to release the clutch C5, and to engage the clutch C4 such that the sun gear SB and the motor generator 22 are coupled via the clutch C4. While in this state, the electronic control unit 42 controls the torque of the motor generator 22, and as a result, power distribution control for controlling distribution of power between the power conveyed to the speed variator 14 and the power conveyed to the planetary gear mechanism 20 can be executed.

Figure 25:
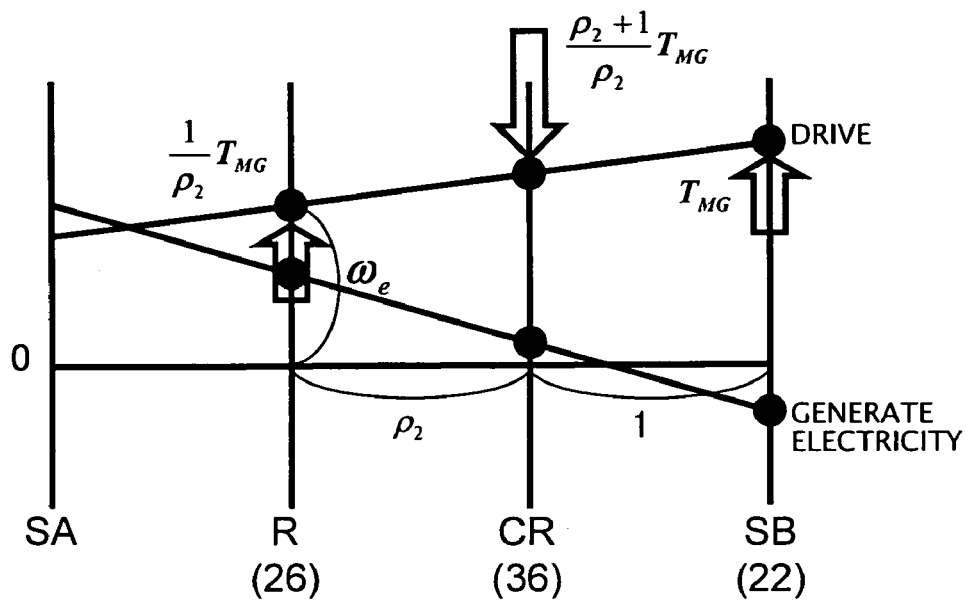
FIG. 25 is a lever diagram showing power distribution control according to the second embodiment.
Figure 26:
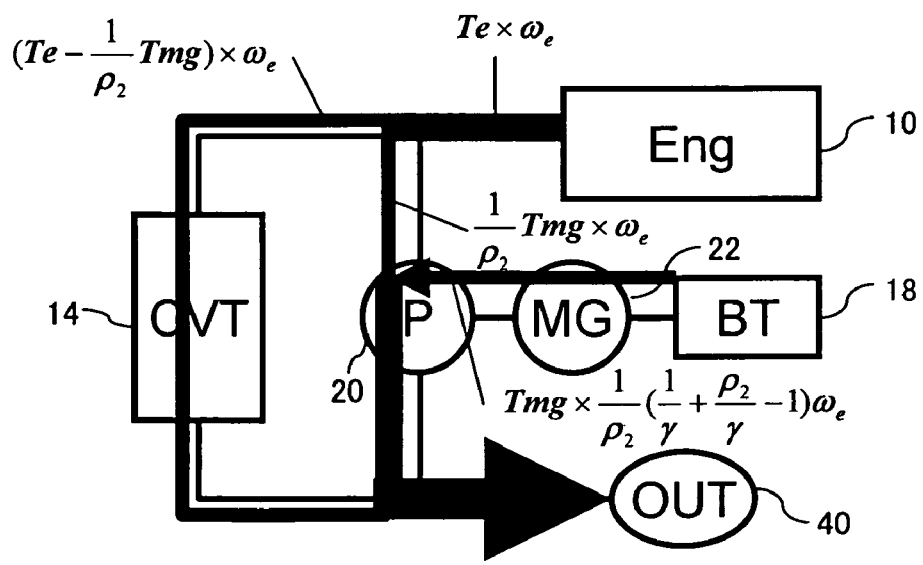
FIG. 26 is a diagram explaining a power distribution control according to the second embodiment.

When driving the vehicle in the forward direction by means of power $P_{eng}$ of the engine 10, the electronic control unit 42 performs torque control of the motor generator 22 as shown by an arrow in the lever diagram of FIG. 25, so as to apply the torque $T_{mg}$ in the forward rotational direction (upper direction in FIG. 25) to the sun gear SB. As a result, the power $P_{eng}$ of the engine 10 is transmitted by being distributed to both the speed variator 14 and the planetary gear mechanism 20, as shown in FIG. 26. The power $P_{in}$ conveyed from the engine 10 to the planetary gear mechanism 20 is combined with the power $P_{mg}$ of the motor generator 22, and this combined power $P_{out}$ is transmitted to the driven wheel 40. In achieving this, the planetary gear mechanism 20 performs a torque combining operation in which the torque $T_{in}$ conveyed from the engine 10 to the ring gear R is combined with the torque $T_{mg}$ conveyed from the motor generator 22 to the sun gear SB in a state such that their torque ratio $T_{in}/T_{mg}$ equals the predetermined ratio $1/\rho_2$, and the resulting torque is transmitted from the carrier CR to the driven wheel 40. Here, $\rho_2$ denotes the ratio (constant value) of number of teeth between the sun gear SB and the ring gear R. Furthermore, the power $P_{eng}-P_{in}$ conveyed from the engine 10 to the speed variator 14 is transmitted to the driven wheel 40 while the speed variator 14 changes speed.

The power $P_{eng}-P_{in}$ conveyed to the speed variator 14, power $P_{in}$ conveyed to the ring gear R, power $P_{mg}$ of the motor generator 22 (power conveyed to the sun gear SB), and power $P_{out}$ conveyed to the carrier CR in the above-described operation are given by the following equations (5)-(8), respectively.

$$P_{eng}-P_{in}=(Te-T_{mg}/\rho_2)\times\omega_{eng} \quad (5)$$

$$P_{in}=T_{mg}/\rho_2\times\omega_{eng} \quad (6)$$

$$P_{mg}=T_{mg}/\rho_2\times(1/\gamma+\rho_2/\gamma-1)\times\omega_{eng} \quad (7)$$

$$P_{out}=T_{mg}/\rho_2\times(1/\gamma+\rho_2/\gamma)\times\omega_{eng} \quad (8)$$

Figure 27:
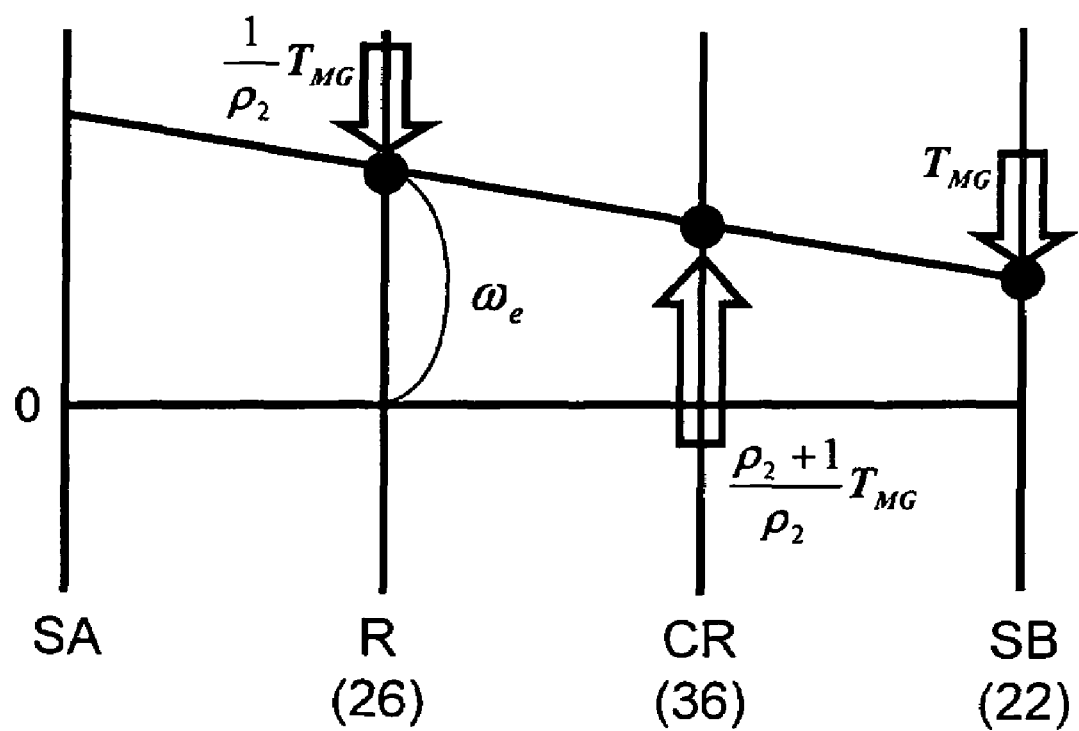
FIG. 27 is a lever diagram showing a power distribution control according to the second embodiment.

When kinetic energy of the vehicle is to be regenerated (when the vehicle is decelerating), the electronic control unit 42 performs torque control of the motor generator 22 as shown by an arrow in the lever diagram of FIG. 27, so as to apply the torque $T_{mg}$ in the reverse rotational direction (lower direction in FIG. 7) to the sun gear SB. As a result, as shown in FIG. 8 illustrating the first embodiment, the power of the driven wheel 40 is transmitted by being distributed to both the speed variator 14 and the planetary gear mechanism 20, and the power conveyed from the driven wheel 40 to the planetary gear mechanism 20 is further transmitted by being distributed to both the engine 10 and the motor generator 22. In achieving this, the planetary gear mechanism 20 performs a torque distributing operation in which the torque $T_{out}$ conveyed from the driven wheel 40 to the carrier CR is distributed to the ring gear R and the sun gear SB in a state such that their torque ratio $T_{in}/T_{mg}$ equals the predetermined ratio $1/\rho_2$, and the distributed torques are transmitted to the engine 10 and the motor generator 22, respectively. The power conveyed from the driven wheel 40 to the speed variator 14 is transmitted to the engine 10. The power transmitted to the motor generator 22 is converted into electric power generated by the regenerating operation of the motor generator 22.

Figure 28:
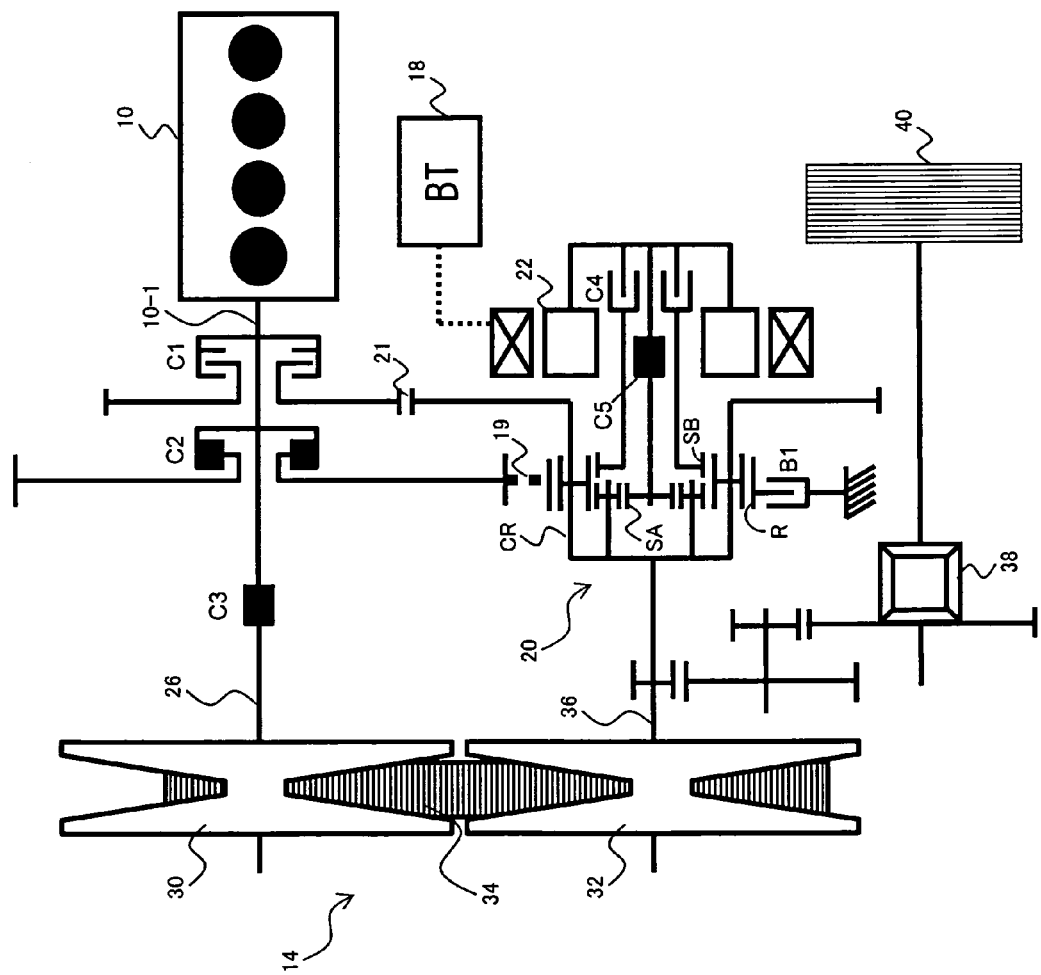
FIG. 28 is a diagram explaining a further example of power distribution control according to the second embodiment.

When performing power distribution control in the present embodiment, the electronic control device 42 may alternatively perform control to engage the clutch C5 instead of the clutch C4 as shown in FIG. 28, such that the sun gear SA and the motor generator 22 are coupled via the clutch C5. By adjusting the torque of the motor generator 22 while in this state, distribution of power conveyed to the speed variator 14 and the power conveyed to the planetary gear mechanism 20 can similarly be controlled.

Figure 29:
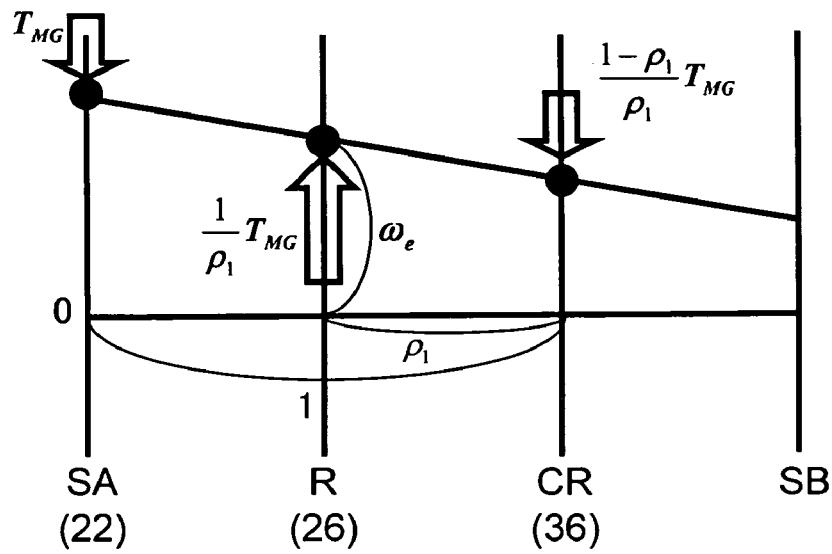
FIG. 29 is a lever diagram showing a further example of power distribution control according to the second embodiment.
Figure 30:
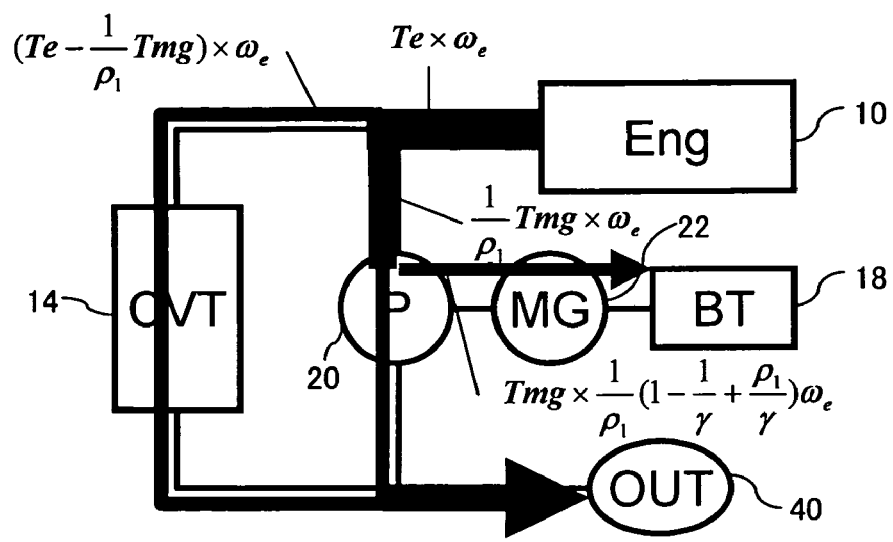
FIG. 30 is a diagram explaining another example of power distribution control according to the second embodiment.

More specifically, the electronic control unit 42 performs torque control of the motor generator 22 as shown by an arrow in the lever diagram of FIG. 29, so as to apply the torque $T_{mg}$ in the reverse rotational direction (lower direction in FIG. 29) to the sun gear SA. As a result, the power $P_{eng}$ of the engine 10 is transmitted by being distributed to both the speed variator 14 and the planetary gear mechanism 20, as shown in FIG. 30. The power $P_{in}$ conveyed from the engine 10 to the planetary gear mechanism 20 is further transmitted by being distributed to both the driven wheel 40 and the motor generator 22. In achieving this, the planetary gear mechanism 20 performs a torque distributing operation in which the torque $T_{in}$ conveyed from the engine 10 to the ring gear R is distributed to the carrier CR and the sun gear SA in a state such that their torque ratio $T_{out}/T_{mg}$ equals the predetermined ratio $(1-\rho_1)/\rho_1$, and the distributed torques are transmitted to the driven wheel 40 and the motor generator 22, respectively. Here, $\rho_1$ denotes the ratio (constant value) of number of teeth between the sun gear SA and the ring gear R. Furthermore, the power $P_{eng}-P_{in}$ conveyed from the engine 10 to the speed variator 14 is transmitted to the driven wheel 40 while the speed variator 14 changes speed. The power transmitted to the motor generator 22 is converted into electric power generated by the regenerating operation of the motor generator 22. In other words, the motor generator 22 functions as an electric generator (driven machinery).

The power $P_{eng}$-$P_{in}$ conveyed to the speed variator 14, power Pin conveyed to the ring gear R, power $P_{mg}$ of the motor generator 22 (power conveyed to the sun gear SB), and power Pout conveyed to the carrier CR in the above-described operation are given by the following equations (9)-(12), respectively.

$$P_{eng} - P_{in} = (Te - T_{mg}/\rho_1) \times \omega_{eng} \quad (9)$$

$$P_{in} = T_{mg}/\rho_1 \times \omega_{eng} \quad (10)$$

$$P_{mg} = T_{mg}/\rho_1 \times (1 - 1/\gamma + \rho_1/\gamma) \times \omega_{eng} \quad (11)$$

$$P_{out} = T_{mg}/\rho_1 \times (1/\gamma - \rho_1/\gamma) \times \omega_{eng} \quad (12)$$

When the vehicle is driven by means of the power $P_{eng}$ of the engine 10 while executing power distribution control in the state in which the sun gear SB and the motor generator 22 are coupled via the clutch C4, the motor generator 22 performs powering operation (functions as an electric motor) when the rotation of the sun gear SB is in the same direction as the rotation of the ring gear R, such that electric discharge occurs in the battery 18. On the other hand, when the vehicle is driven by means of the power $P_{eng}$ of the engine 10 while executing power distribution control in the state in which the sun gear SA and the motor generator 22 are coupled via the clutch C5, the motor generator 22 performs regenerating operation (functions as an electric generator), such that the battery 18 is charged. Accordingly, when the electronic control unit 42 performs power distribution control, electronic control unit 42 preferably selects which of the clutches C4 or C5 to engage (i.e., which of the sun gears SA or SB to couple to the motor generator 22) based on the state of charge (SOC) of the battery 18 for accumulating electric energy used by the motor generator 22 to generate power.

For example, when the SOC of the battery 18 is higher than a predetermined level at a point when power distribution control is to be executed, the electronic control unit 42 selects to engage the clutch C4 (to couple the motor generator 22 to the sun gear SB). As a result, the planetary gear mechanism 20 performs the torque combining operation in which the torque $T_{in}$ conveyed from the engine 10 is combined with the torque $T_{mg}$ conveyed from the motor generator 22 in a state such that their torque ratio $T_{in}/T_{mg}$ equals the predetermined ratio $1/\rho_2$, and the resulting torque is transmitted to the driven wheel 40. On the other hand, when the SOC of the battery 18 is lower than the predetermined level at a point when power distribution control is to be executed, the electronic control unit 42 selects to engage the clutch C5 (to couple the motor generator 22 to the sun gear SA). As a result, the planetary gear mechanism 20 performs the torque distributing operation in which the torque $T_{in}$ conveyed from the engine 10 is distributed and transmitted to the driven wheel 40 and the motor generator 22 in a state such that their torque ratio $T_{out}/T_{mg}$ equals the predetermined ratio $(1-\rho_1)/\rho_1$. The SOC of the battery 18 may be estimated from current and voltage values of the battery 18 detected by sensors not shown, for example. The switching of coupling between the sun gears SA and SB with respect to the motor generator 22 may be performed by, for example, gradually decreasing the locking force of the clutch for the engaged one of the sun gears while gradually increasing the locking force of the clutch for the other released one of the sun gears. Concerning specific preferred details according to which the torque $T_{mg}$ of the motor generator 22 is controlled (according to which the power distribution control is executed), those described above for the first embodiment can be applied to the present embodiment.

Figure 31:
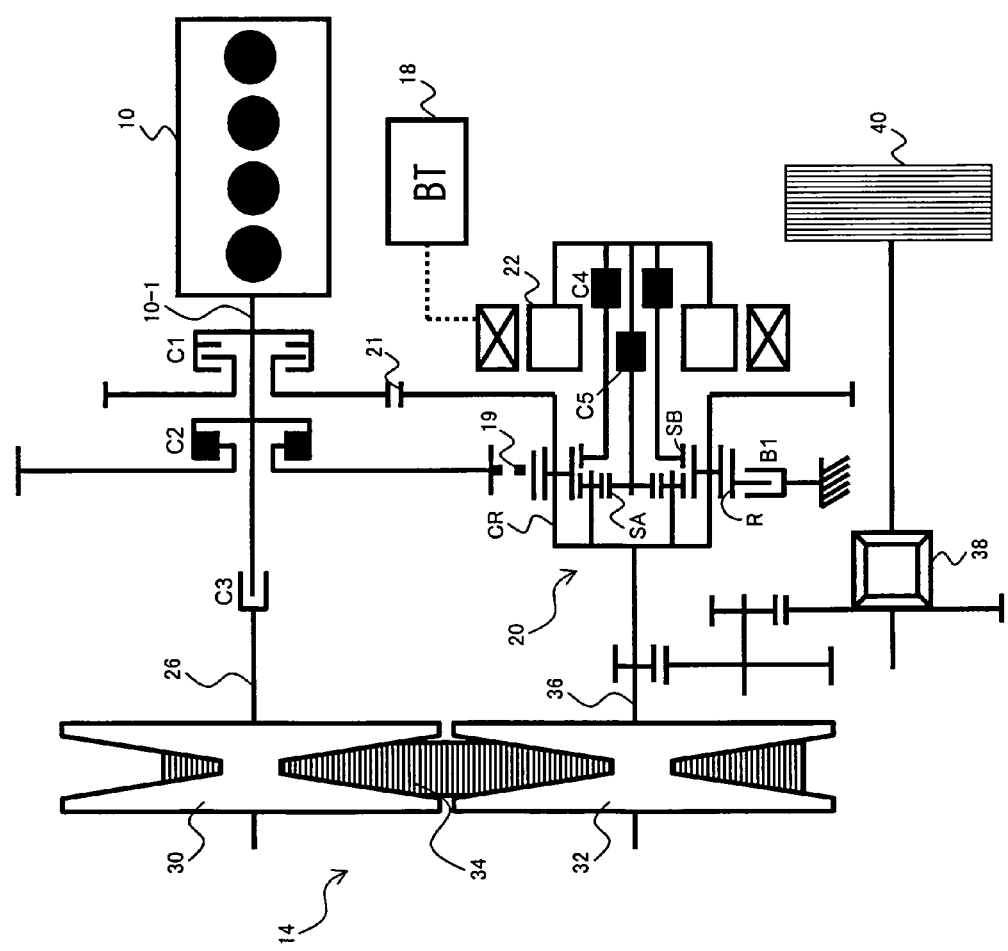
FIG. 31 is a diagram explaining a constant gear ratio transmission control according to the second embodiment.
Figure 32:
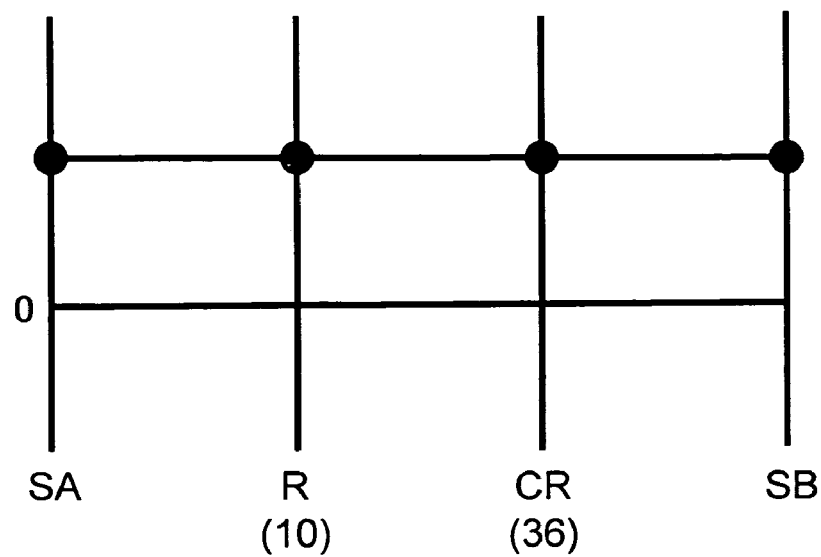
FIG. 32 is a lever diagram explaining a constant gear ratio transmission control according to the second embodiment.
Figure 33:
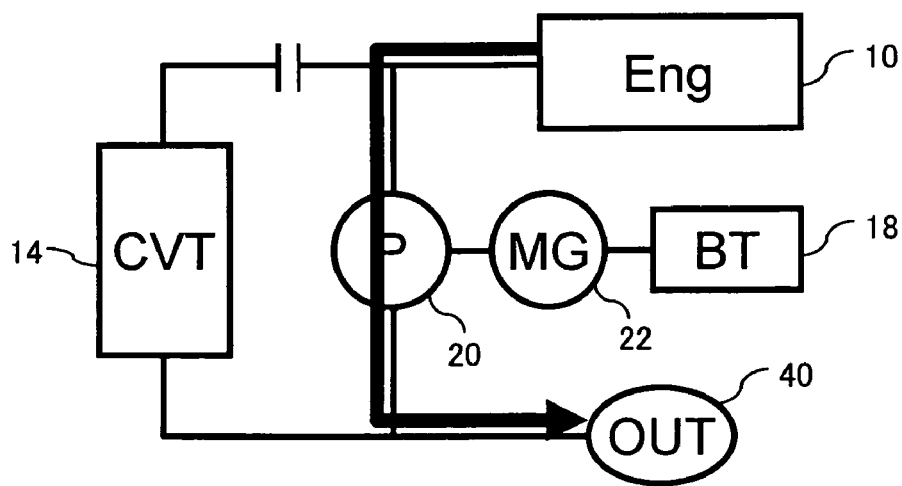
FIG. 33 is a diagram explaining a constant gear ratio transmission control according to the second embodiment.

According to the present embodiment, when the ratio between the rotational speed $\omega_{eng}$ of the engine 10 and the rotational speed $\omega_{out}$ of the output shaft 36 (i.e., the gear ratio γ of the speed variator 14) equals to a predetermined ratio, rotations of the sun gears SA and SB synchronize with one another. When in this state, the electronic control unit 42 may engage both the clutches C4 and C5 so as to couple the motor generator 22 to both the sun gears SA and SB, to thereby couple the two sun gears SA, SB to one another via the clutches C4, C5, as shown in FIG. 31. As a result of this coupling of the sun gears SA, SB to one another, the sun gears SA and SB, carrier CR, and ring gear R rotate as one piece, as shown in the lever diagram of FIG. 32. While in this state, when the clutch C2 is engaged to couple the engine 10 and the driven wheel 40 via the planetary gear mechanism 20 as shown in FIG. 31, the electronic control unit 42 can execute constant gear ratio transmission control so as to transmit power between the engine 10 and the driven wheel 40 via the planetary gear mechanism 20 at a predetermined gear ratio without controlling the torque $T_{mg}$ of the motor generator 22, as shown in FIG. 33. It should be noted that FIG. 33 illustrates a case in which the vehicle is driven by means of power of the engine 10. The gear ratio γ at which rotations of the sun gears SA, SB synchronize with one another can be set for example by the gear ratio of the transmission device 19 provided between the clutch C2 and the ring gear R.

While FIG. 31 illustrates a case in which constant gear ratio transmission control is executed while the coupling of the engine 10 and the driven wheel 40 via the speed variator 14 is decoupled by releasing the clutch C3, it should be noted that, according to the present embodiment, constant gear ratio transmission control can be also executed while the clutch C3 is engaged to couple the engine 10 and the driven wheel 40 via the speed variator 14. In a case in which torque transmission capacity of the speed variator 14 is controllable by the electronic control unit 42, during execution of constant gear ratio transmission control, the electronic control unit 42 may control the torque transmission capacity of the speed variator 14 so as to control distribution of power conveyed to the speed variator 14 and power conveyed to the planetary gear mechanism 20 without adjusting the torque $T_{mg}$ of the motor generator 22.

For example, in a belt-type CVT 14 in which power is transmittable between the primary pulley 30 and the secondary pulley 32 via the endless belt 34, belt pressure (pressing force of the endless belt 34 against the primary pulley 30 and the secondary pulley 32) is generated by hydraulic force supplied to the primary pulley 30 or the secondary pulley 32, and power transmission is performed in a state in which the endless belt 34 is pressed against the primary pulley 30 and the secondary pulley 32 by means of this belt pressure. When such a belt-type CVT 14 is employed, the electronic control unit 42 can control the torque transmission capacity of the belt-type CVT 14 by adjusting this belt pressure, thereby in turn controlling distribution of power conveyed to the belt-type CVT 14 and power conveyed to the planetary gear mechanism 20. More specifically, by decreasing the belt pressure, it is possible to reduce the torque transmission capacity of the belt-type CVT 14 and to increase power distribution to the planetary gear mechanism 20. On the other hand, by increasing the belt pressure, it is possible to increase the torque transmission capacity of the belt-type CVT 14 and to reduce power distribution to the planetary gear mechanism 20. When performing power distribution control by controlling the belt pressure, the electronic control unit 42 must precisely adjust the gear ratio γ of the speed variator 14 to the predetermined ratio at which the rotations of the sun gears SA, SB synchronize with one another. For this purpose, it is preferable to use a sensor (not shown) to detect the position of the movable sheave of the primary pulley 30 along the input shaft 26 direction, or the position of the movable sheave of the secondary pulley 32 along the output shaft 36 direction, and control the gear ratio γ of the speed variator 14 based on the detected position.

Alternatively, when the speed variator 14 is a toroidal CVT in which power is transmittable between the input and output disks via a roller, power transmission is performed in a state in which the roller is pressed against between the input and output disks. In this case, the electronic control unit 42 can control the torque transmission capacity of the toroidal CVT by adjusting the pressure by which the roller is pressed against the input and output disks. When performing this control, it is preferable to detect the roller rotation tilt angle using a sensor, and control the gear ratio γ of the toroidal CVT based on the detected roller rotation tilt angle.

Furthermore, when executing constant gear ratio transmission control, the electronic control unit 42 can also control distribution of power conveyed to the speed variator 14 and power conveyed to the planetary gear mechanism 20 by adjusting the locking force of the clutch C3 so as to control the torque transmission capacity of the clutch C3.

Figure 34:
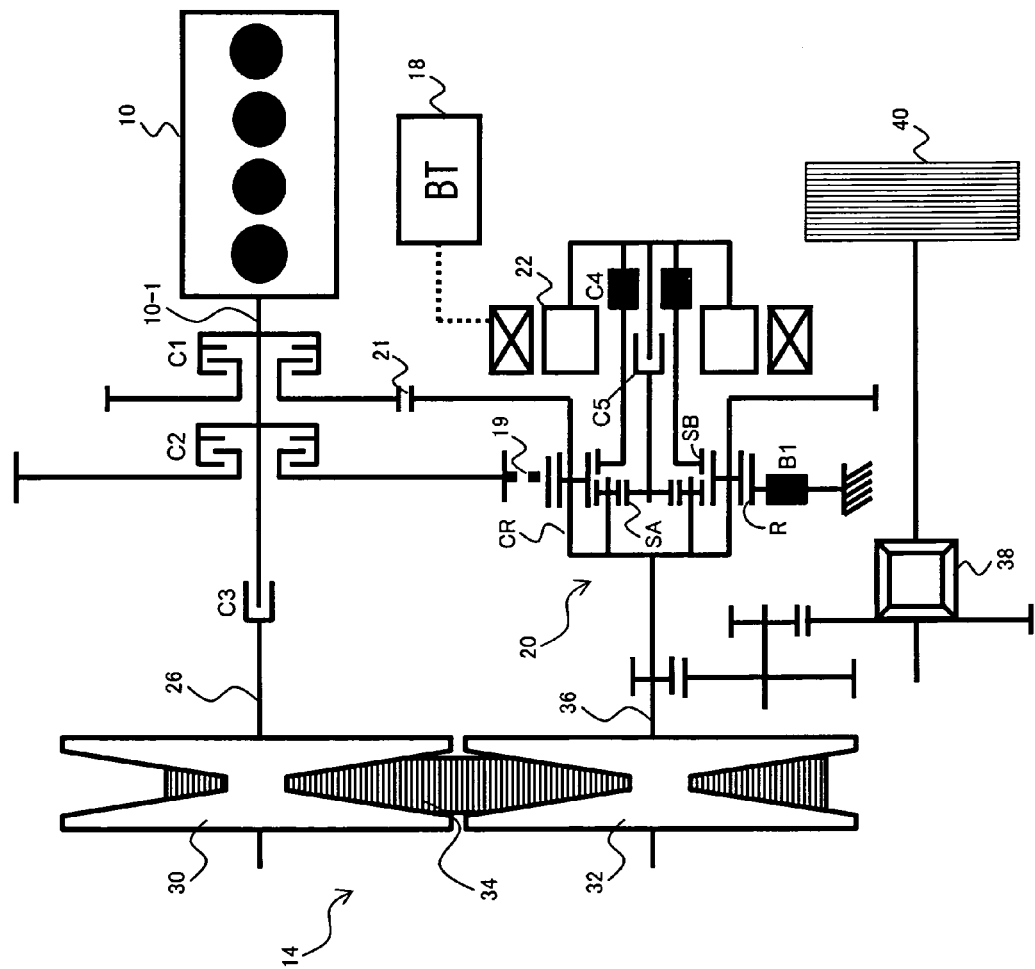
FIG. 34 is a diagram explaining an EV travel control according to the second embodiment.

When performing EV travel operation in which the vehicle is driven by the power of the motor generator 22 without transmitting the power of the engine 10 to the driven wheel 40, the electronic control unit 42 performs control so as to release the clutches C1, C2, and C3 and engage the brake B1, as shown in FIG. 34. In addition, as shown in FIG. 34, the electronic control unit 42 performs control to release the clutch C5, and to engage the clutch C4 such that the sun gear SB and the motor generator 22 are coupled. While in this state, the electronic control unit 42 controls the torque $T_{mg}$ of the motor generator 22 so as to perform EV travel control by which power transmitted between the motor generator 22 and the driven wheel 40 is controlled.

Figure 35:
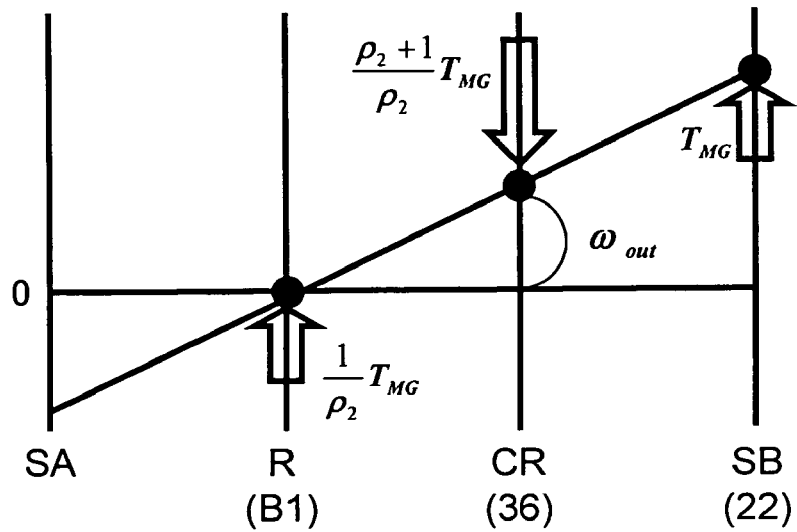
FIGS. 35 and 36 are lever diagrams explaining an EV travel control according to the second embodiment.
Figure 36:
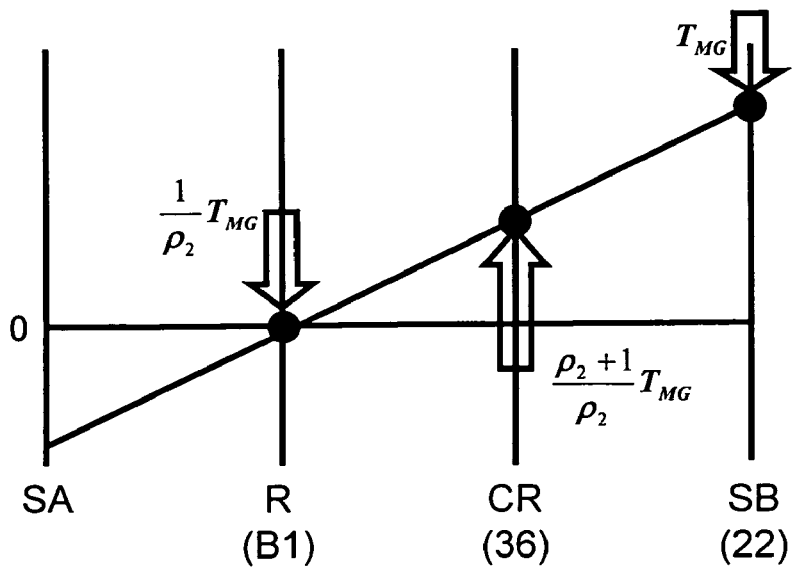

More specifically, when driving the vehicle in the forward direction by means of power of the motor generator 22, the electronic control unit 42 performs torque control of the motor generator 22 as shown by an arrow in the lever diagram of FIG. 35 so as to apply the torque $T_{mg}$ in the forward rotational direction (upper direction in FIG. 35) to the sun gear SB. On the other hand, when regenerating kinetic energy of the vehicle (when the vehicle is decelerating), the electronic control unit 42 performs torque control of the motor generator 22 as shown by an arrow in the lever diagram of FIG. 36 so as to apply the torque $T_{mg}$ in the reverse rotational direction (lower direction in FIG. 36) to the sun gear SB. When regenerating kinetic energy of the vehicle, the electronic control unit 42 may alternatively effect regenerating operation of the motor generator 22 by engaging the clutch C5 instead of the brake B1 to thereby cause the sun gears SA and SB, carrier CR, and ring gear R to rotate as one piece.

Figure 37:
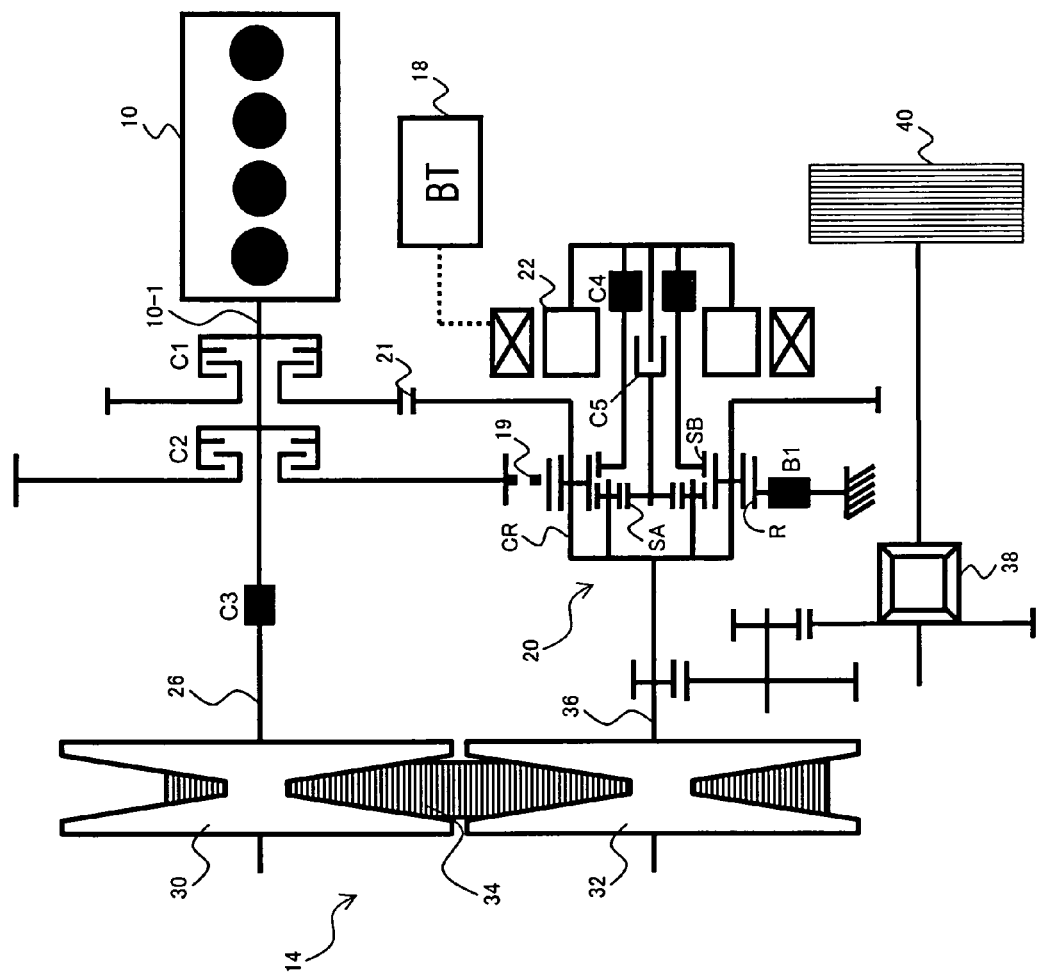
FIG. 37 is a diagram explaining a power assist control according to the second embodiment.

When assisting the vehicle drive with the power of the motor generator 22 while the vehicle is driven by the power of the engine 10, the electronic control unit 42 performs control so as to release the clutches C1 and C2 and engage the clutch C3 as shown in FIG. 37, to thereby allow power transmission to occur between the engine 10 and the driven wheel 40 via the speed variator 14. In addition, as shown in FIG. 37, the electronic control unit 42 performs control to release the clutch C5, and to engage the clutch C4 and the brake B1 to thereby stop rotation of the ring gear R and couple the sun gear SB and the motor generator 22. While in this state, the electronic control unit 42 controls the torque $T_{mg}$ of the motor generator 22 so as to perform power assist control by which power transmitted between the motor generator 22 and the driven wheel 40 is adjusted.

More specifically, in a state in which the requested power of the vehicle is greater than the engine power when the vehicle is to be driven in the forward direction by means of power of the engine 10, the electronic control unit 42 performs torque control of the motor generator 22 as shown by an arrow in the lever diagram of FIG. 35 so as to apply the torque $T_{mg}$ in the forward rotational direction (upper direction in FIG. 35) to the sun gear SB. On the other hand, when the requested power of the vehicle is smaller than the engine power, the electronic control unit 42 performs torque control of the motor generator 22 as shown by an arrow in the lever diagram of FIG. 36 so as to apply the torque $T_{mg}$ in the reverse rotational direction (lower direction in FIG. 36) to the sun gear SB. Furthermore, when kinetic energy of the vehicle is to be regenerated (when the vehicle is decelerating), the electronic control unit 42 similarly performs torque control of the motor generator 22 as shown by an arrow in the lever diagram of FIG. 36 so as to apply the torque $T_{mg}$ in the reverse rotational direction to the sun gear SB. When regenerating kinetic energy of the vehicle, the electronic control unit 42 may alternatively effect regenerating operation of the motor generator 22 by engaging the clutch C5 instead of the brake B1 to thereby cause the sun gears SA and SB, carrier CR, and ring gear R to rotate as one piece.

Figure 38:
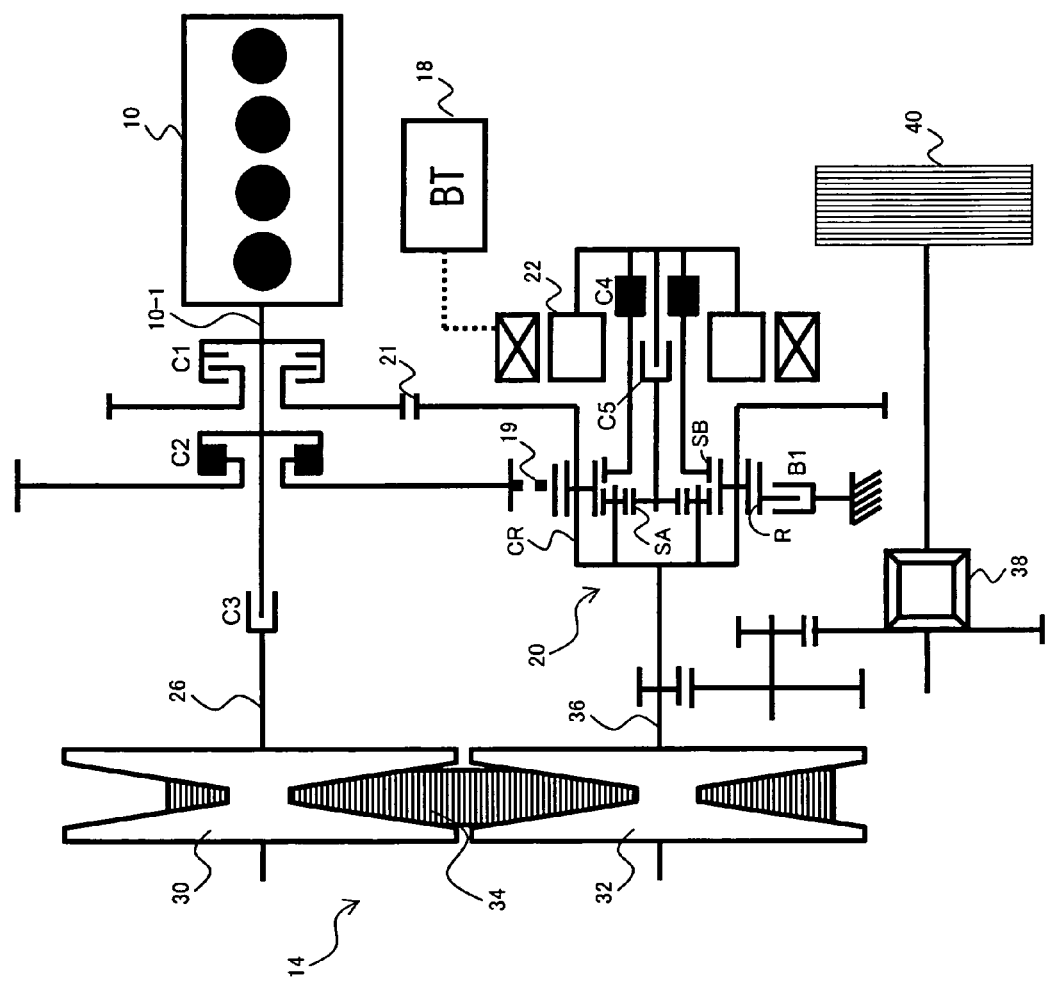
FIG. 38 is a diagram explaining a move-off operation according to the second embodiment.
Figure 39:
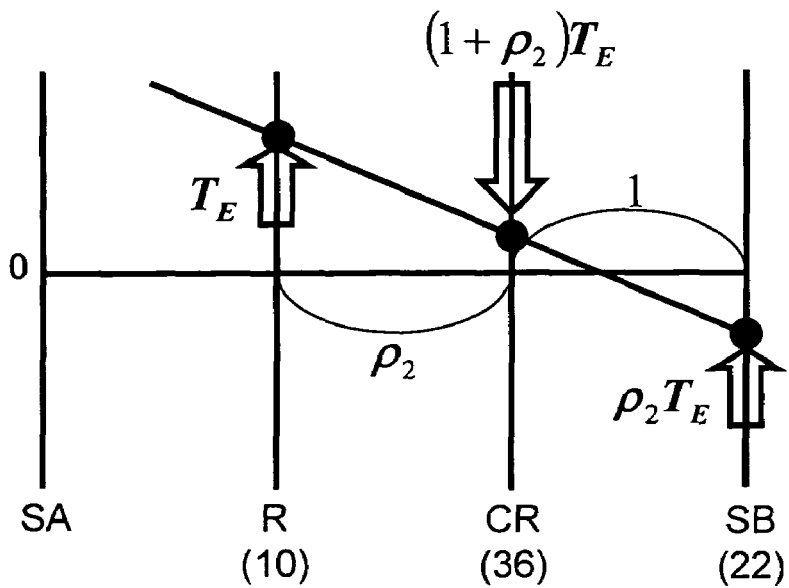
FIG. 39 is a lever diagram explaining a move-off operation according to the second embodiment.

When carrying out a move-off operation in which the vehicle in a stopped state is driven forward, the electronic control unit 42 performs control so as to release the clutches C1, C3 and the brake B1 and engage the clutch C2 as shown in FIG. 38 while the engine 10 is rotationally activated. In addition, as shown in FIG. 38, the electronic control unit 42 performs control to release the clutch C5, and to engage the clutch C4 such that the sun gear SB and the motor generator 22 are coupled. While in this state, the electronic control unit 42 performs torque control of the motor generator 22 as shown by an arrow in the lever diagram of FIG. 39 so as to apply the torque $T_{mg}$ in the forward rotational direction (upper direction in FIG. 39) to the sun gear SB, thereby causing the vehicle to move off.

Figure 40:
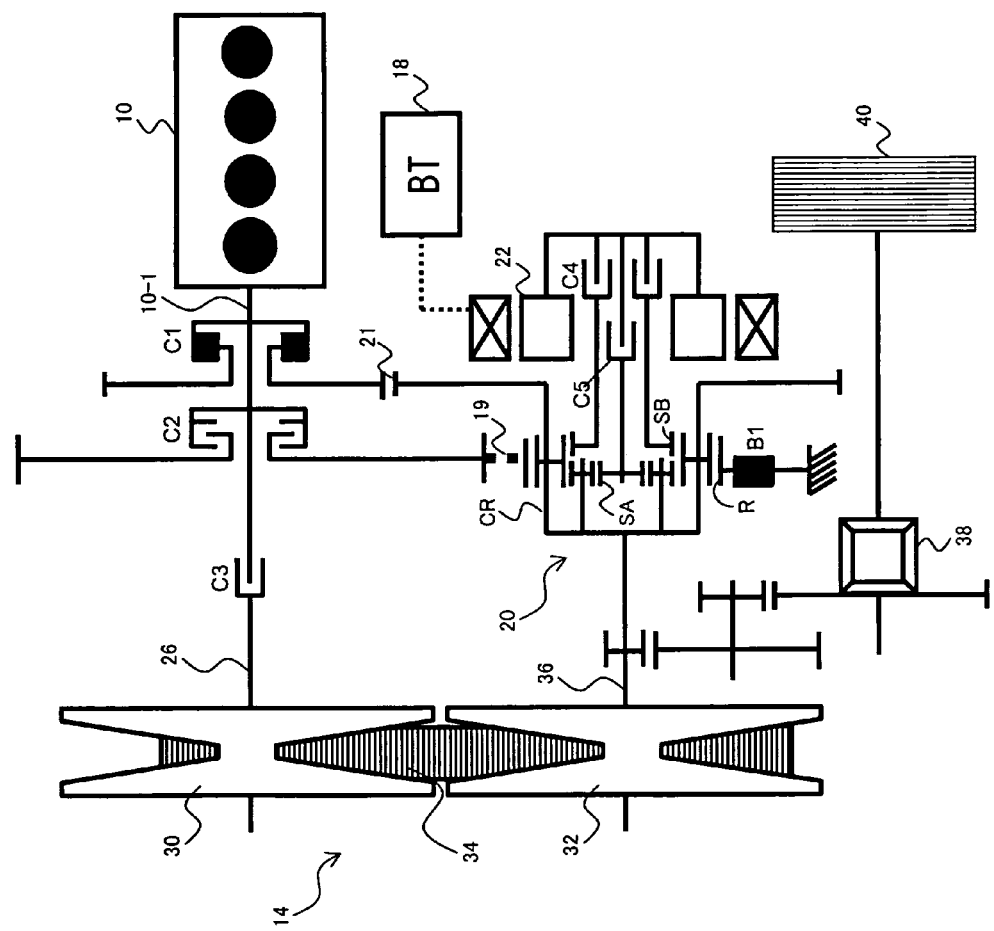
FIG. 40 is a diagram explaining a reverse launch operation according to the second embodiment.

When carrying out a reverse launch operation in which the vehicle is driven in the reverse direction, the electronic control unit 42 first performs control so as to release the clutches C1, C2, and C3 and engage the brake B1 while the engine 10 is rotationally activated. From this state, the electronic control unit 42 gradually increases the locking force of the clutch C1 so as to couple the engine 10 and the driven wheel 40 via the counter gears 21, as shown in FIG. 40. As a result of this coupling, the carrier CR is subjected to torque in the reverse rotational direction, and power of the engine 10 is transmitted to the driven wheel 40 via the carrier CR of the planetary gear mechanism 20 at a predetermined gear ratio.

The engaged/released states of the clutches C1, C2, C3, C4, C5, and the brake B1 in the above-described respective operations of the present embodiment can be summarized as shown in Table 2 below. In Table 2, "O" denotes the engaged state, while blank denotes the released state.

TABLE 2

|  | C1 | C2 | C3 | C4 | C5 | B1 |
|---|---|---|---|---|---|---|
| power distribution control |  | O | O | O |  |  |
| power distribution control (second example) |  | O |  |  | O |  |
| constant gear ratio transmission control |  | O |  | O | O |  |
| EV travel control |  |  |  | O |  | O |
| power assist control |  |  | O | O |  | O |

TABLE 2-continued

|  | C1 | C2 | C3 | C4 | C5 | B1 |
|---|---|---|---|---|---|---|
| move-off operation |  | ○ |  | ○ |  |  |
| reverse launch operation | ○ |  |  |  |  | ○ |

According to the present embodiment described above, similarly to in the first embodiment, power distribution between the power $P_{eng}$-$P_{in}$ conveyed to the speed variator 14 and the power $P_{in}$ conveyed to the planetary gear mechanism 20 can be actively controlled by adjusting the torque $T_{mg}$ of the motor generator 22. Further, a system according to the present embodiment can provide the function of a hybrid power output system while reducing dependency on the electric system.

In addition, when executing power distribution control in the present embodiment, it is possible to switch between the regenerating operation and the powering operation of the motor generator 22 by switching the coupling of the motor generator 22 to either of the sun gears SA or SB. For example, by selecting which of the sun gears SA or SB to couple to the motor generator 22 based on the state of charge (SOC) of the battery 18, it is possible to appropriately control electric energy accumulated in the battery 18.

Furthermore, according to the present embodiment, when the ratio between the rotational speed $\omega_{eng}$ of the engine 10 and the rotational speed $\omega_{out}$ of the output shaft 36 equals to the predetermined ratio, by coupling the sun gears SA, SB to one another via the clutches C4, C5, it is possible to transmit power between the engine 10 and the driven wheel 40 via the planetary gear mechanism 20 without controlling the torque $T_{mg}$ of the motor generator 22. For example, by setting the gear ratio of the transmission device 19 such that the sun gears SA, SB are couplable to one another while in a speed increasing state in which the gear ratio γ is smaller than one, it is possible to further enhance power transmission efficiency during light-load drive operation. Further, by controlling the torque transmission capacity (for example, the belt pressure or the pressing force of the roller against the input and output disks) of the speed variator 14 while the clutch C3 is engaged, power distribution between the power conveyed to the speed variator 14 and the power conveyed to the planetary gear mechanism 20 can be actively controlled.

Other example configurations of the present embodiment are described below.

Figure 41:
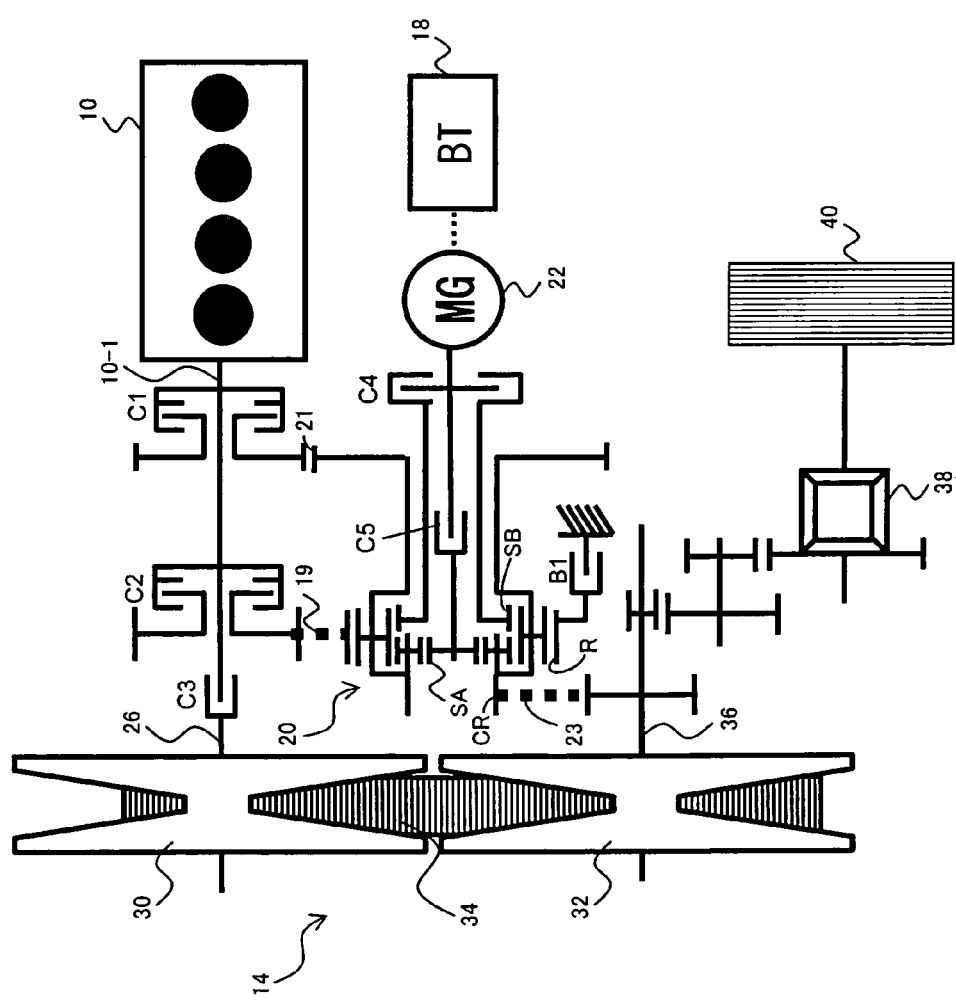
FIG. 41 is a diagram showing another general configuration of a power output system according to the second embodiment.

FIG. 41 shows an example in which the planetary gear mechanism 20 is arranged such that the central axis of the planetary gear mechanism 20 is placed in a position between the input shaft 26 and the output shaft 36 of the speed variator 14. The carrier CR of the planetary gear mechanism 20 is coupled to the output shaft 36 of the speed variator 14 via a transmission device 23 such as a chain. Operations of the example configuration shown in FIG. 41 are identical to those of the system of FIG. 22.

The planetary gear mechanism 20, which has two rotational degrees of freedom and in which rotational speeds of the respective rotating elements have a lever relationship, is not limited to a Ravigneaux type planetary gear mechanism described above, and may be configured in various manners by combining a plurality of planetary gearsets. For example, when two planetary gearsets are to be combined to configure the planetary gear mechanism, two rotating elements in one planetary gearset may be coupled to two rotating elements in the other planetary gearset, respectively, and thereby it is possible to obtain a planetary gear mechanism which has two rotational degrees of freedom and in which rotational speeds of the four rotating elements have a lever relationship. As such, the planetary gear mechanism according to the present embodiment can be configured by coupling or sharing any one of rotating elements in a planetary gearset with any one of rotating elements in another planetary gearset, such that the planetary gear mechanism is provided with two rotational degrees of freedom.

Moreover, in the present embodiment, it is also possible to eliminate the sun gear SB and configure the planetary gear mechanism 20 with a double-pinion type planetary gearset, while further eliminating the clutches C4, C5 and coupling the motor generator 22 to the sun gear SA. In this case, torque from the engine 10 is distributed to the driven wheel 40 and the motor generator 22, such that the motor generator 22 functions as an electric generator (driven machinery). Further, another motor generator coupled to the output shaft 10-1 of the engine 10 may be separately provided, so as to allow this motor generator to function as an electric motor (prime mover).

Third Embodiment

Figure 42:
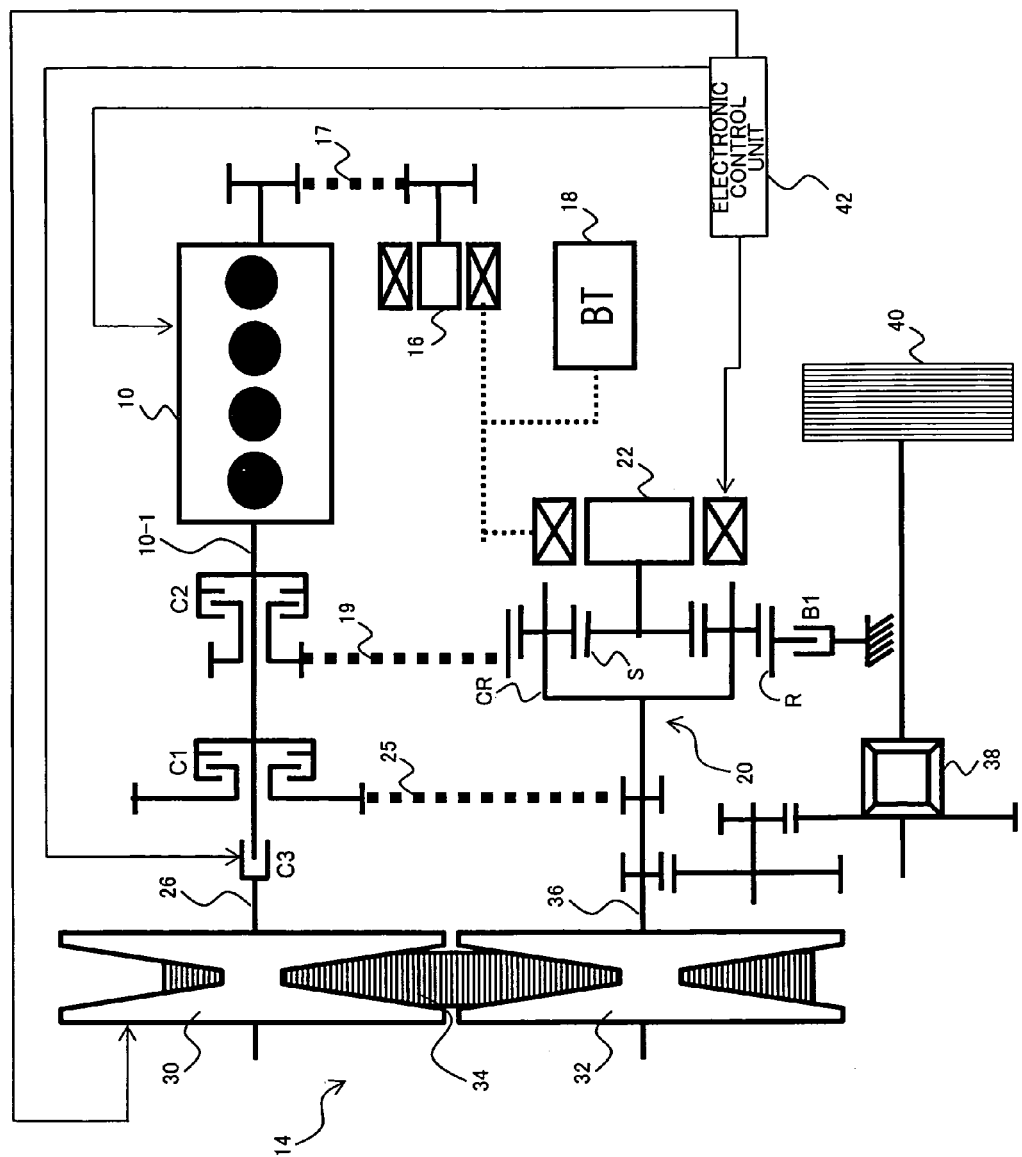
FIG. 42 is a diagram showing a general configuration of a power output system according to a third embodiment of the present invention.

FIG. 42 is a diagram showing a general configuration of a power output system according to a third embodiment of the present invention. In contrast to the first embodiment, the clutch C1 of the present embodiment is capable of effecting and decoupling the coupling between the output shaft 10-1 of the engine 10 and the carrier CR (driven wheel 40) via a transmission device 25. The transmission device 25 may be composed with a chain or the like, and is provided in parallel to the speed variator 14. As such, in the present embodiment, there is provided a third power transmission path by which power from the engine 10 can be transmitted to the driven wheel 40 via the clutch C1 and the transmission device 25 at a predetermined gear ratio. As other structures of the third embodiment are identical to those of the first embodiment, description of those structures will not be repeated below.

Operations performed by the power output system according to the present embodiment are next described. It should be noted that operations concerning which explanation will not be repeated are identical to those of the first and second embodiments.

Figure 43:
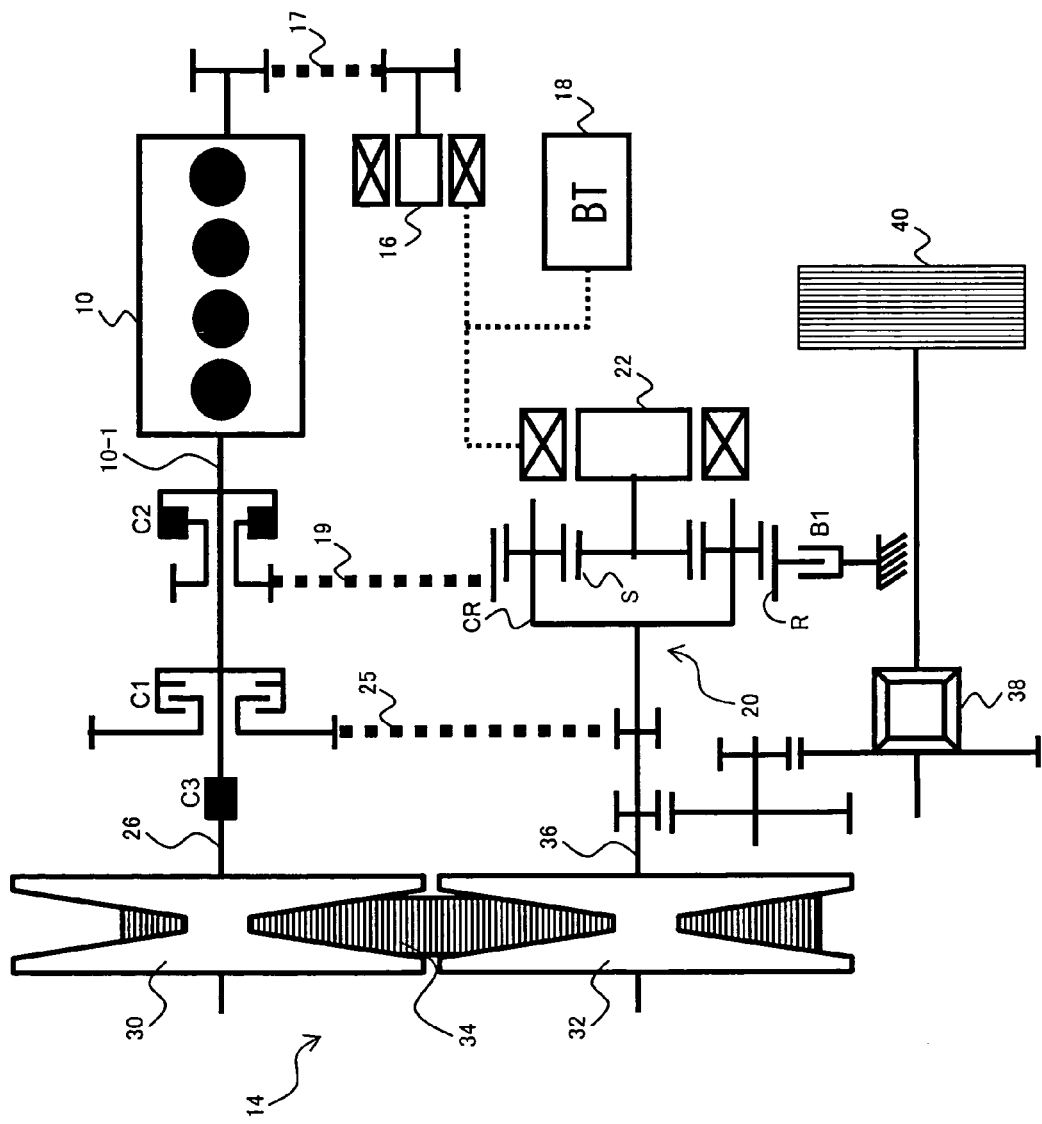
FIG. 43 is a diagram explaining a power distribution control according to the third embodiment.

When power transmission between the engine 10 and the driven wheel 40 is to be performed via both the speed variator 14 and the planetary gear mechanism 20, the electronic control unit 42 performs control so as to release the clutch C1 and the brake B1 and to engage the clutches C2 and C3, as shown in FIG. 43. While in this state, similarly to in the first embodiment, the electronic control unit 42 controls the torque of the motor generator 22, and as a result, power distribution control for controlling distribution of power between the power conveyed to the speed variator 14 and the power conveyed to the planetary gear mechanism 20 can be executed.

Figure 44:
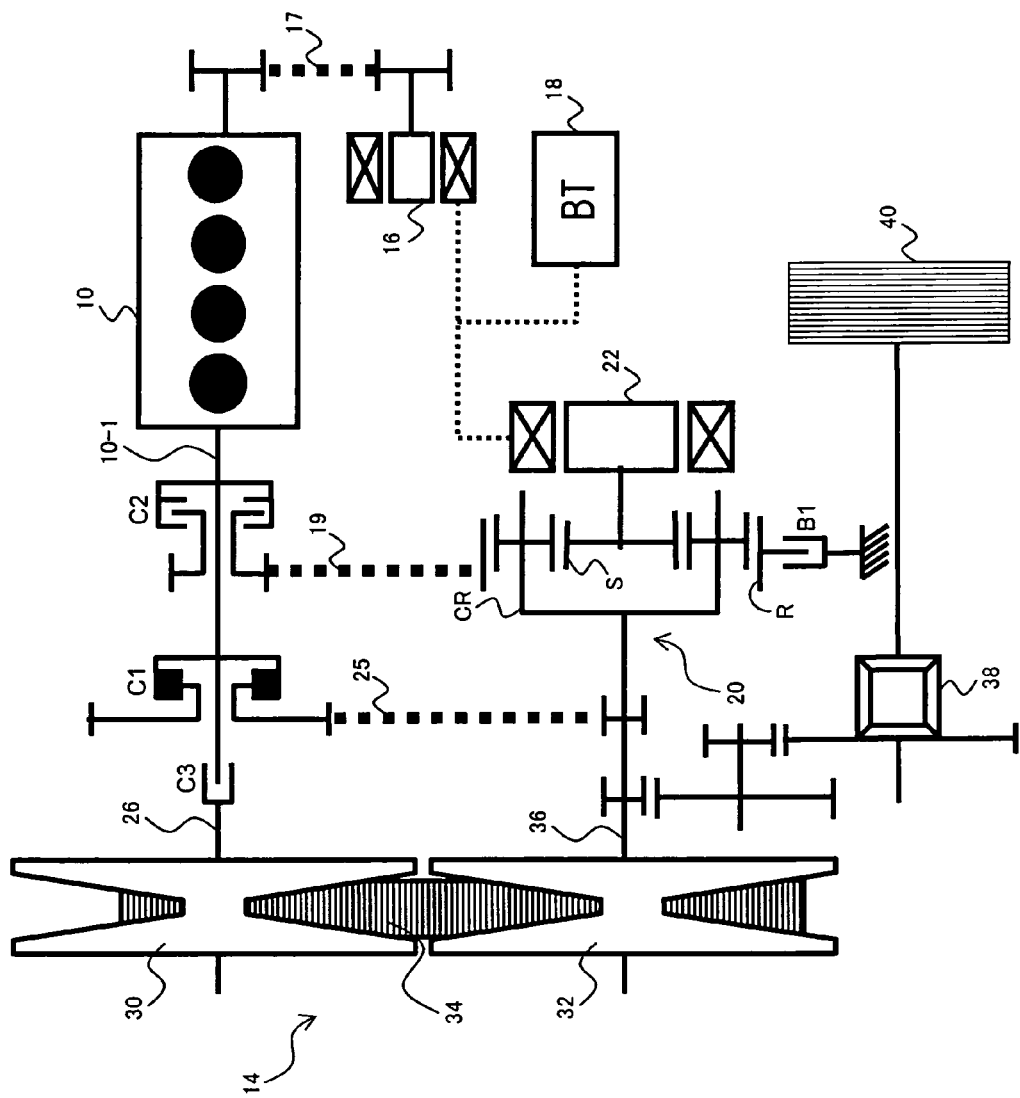
FIG. 44 is a diagram explaining a constant gear ratio transmission control according to the third embodiment.

According to the present embodiment, when the ratio between the rotational speed $\omega_{eng}$ of the engine 10 and the rotational speed $\omega_{out}$ of the output shaft 36 (i.e., the gear ratio γ of the speed variator 14) equals a predetermined ratio, the electronic control unit 42 can engage the clutch C1 so as to couple the engine 10 and the carrier CR (driven wheel 40) via the transmission device 25, as shown in FIG. 44. As a result of this coupling, the electronic control unit 42 can execute constant gear ratio transmission control so as to transmit power between the engine 10 and the driven wheel 40 via the transmission device 25 at a predetermined gear ratio without controlling the torque $T_{mg}$ of the motor generator 22. Further, according to the present embodiment, during execution of the constant gear ratio transmission control, it is also possible to assist the vehicle drive with the power of the motor generator 22 by having the electronic control unit 42 control the torque $T_{mg}$ of the motor generator 22 while stopping rotation of the ring gear R by engaging the brake B1. The gear ratio γ at which the clutch C1 becomes engageable can be set for example by the gear ratio of the transmission device 25 provided between the clutch C1 and the carrier CR (output shaft 36 of the speed variator 14).

While FIG. 44 illustrates a case in which constant gear ratio transmission control is executed while the coupling of the engine 10 and the driven wheel 40 via the speed variator 14 is decoupled by releasing the clutch C3, it should be noted that, according to the present embodiment, constant gear ratio transmission control can be also executed while the clutch C3 is engaged to couple the engine 10 and the driven wheel 40 via the speed variator 14. In a case in which torque transmission capacity of the speed variator 14 is controllable by the electronic control unit 42, during execution of constant gear ratio transmission control, the electronic control unit 42 may control the torque transmission capacity of the speed variator 14 so as to control distribution of power conveyed to the speed variator 14 and power conveyed to the transmission device 25 without adjusting the torque $T_{mg}$ of the motor generator 22. Specific details according to which the torque transmission capacity of the speed variator 14 may be controlled in this case are similar to those of the second embodiment. Furthermore, when executing constant gear ratio transmission control, the electronic control unit 42 can also control distribution of power conveyed to the speed variator 14 and power conveyed to the transmission device 25 by adjusting the locking force of the clutch C3 so as to control the torque transmission capacity of the clutch C3.

Figure 45:
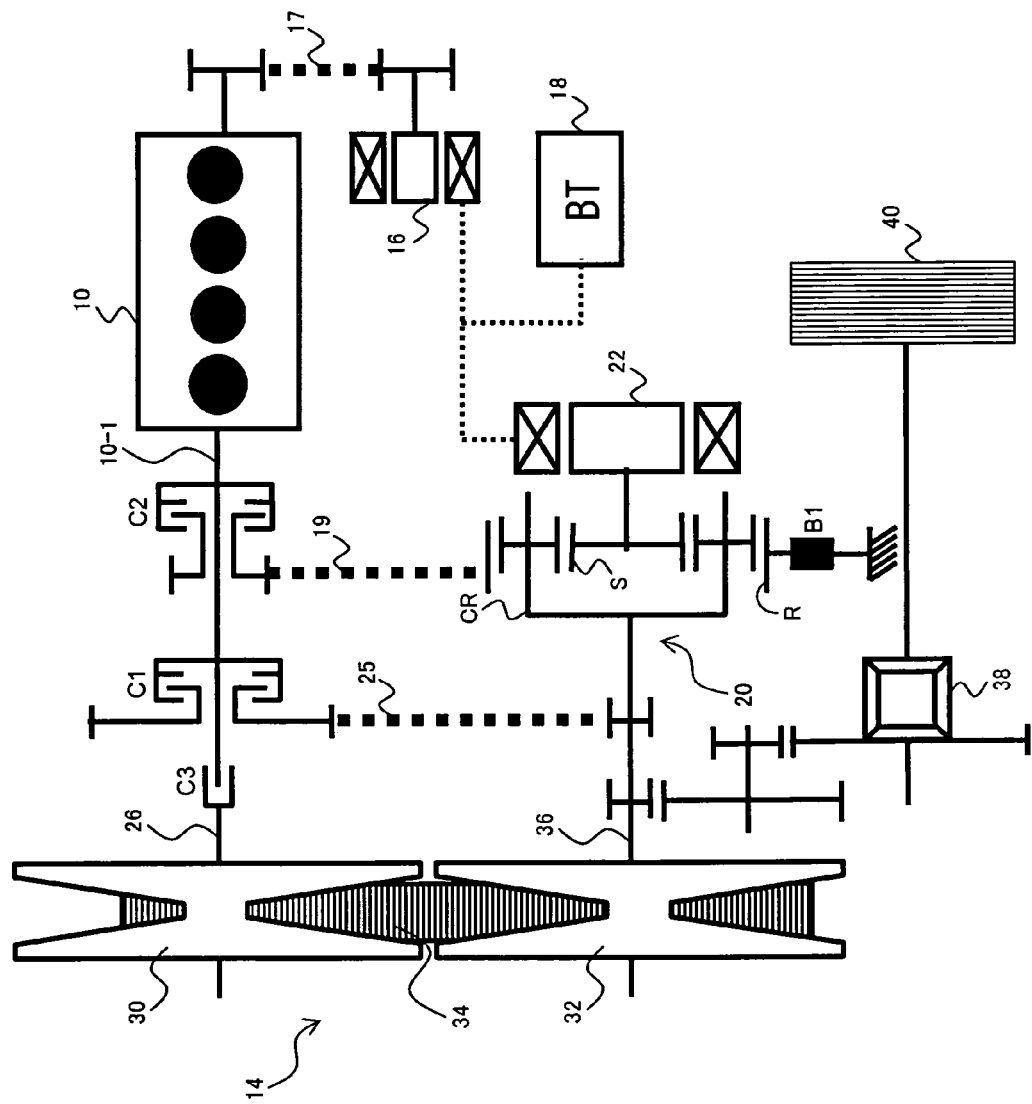
FIG. 45 is a diagram explaining an EV travel control according to the third embodiment.

When performing EV travel operation in which the vehicle is driven by the power of the motor generator 22 without transmitting the power of the engine 10 to the driven wheel 40, the electronic control unit 42 performs control so as to release the clutches C1, C2, and C3 and engage the brake B1, as shown in FIG. 45. While in this state, similarly to in the first embodiment, the electronic control unit 42 controls the torque $T_{mg}$ of the motor generator 22 so as to perform EV travel control by which power transmitted between the motor generator 22 and the driven wheel 40 is controlled.

Figure 46:
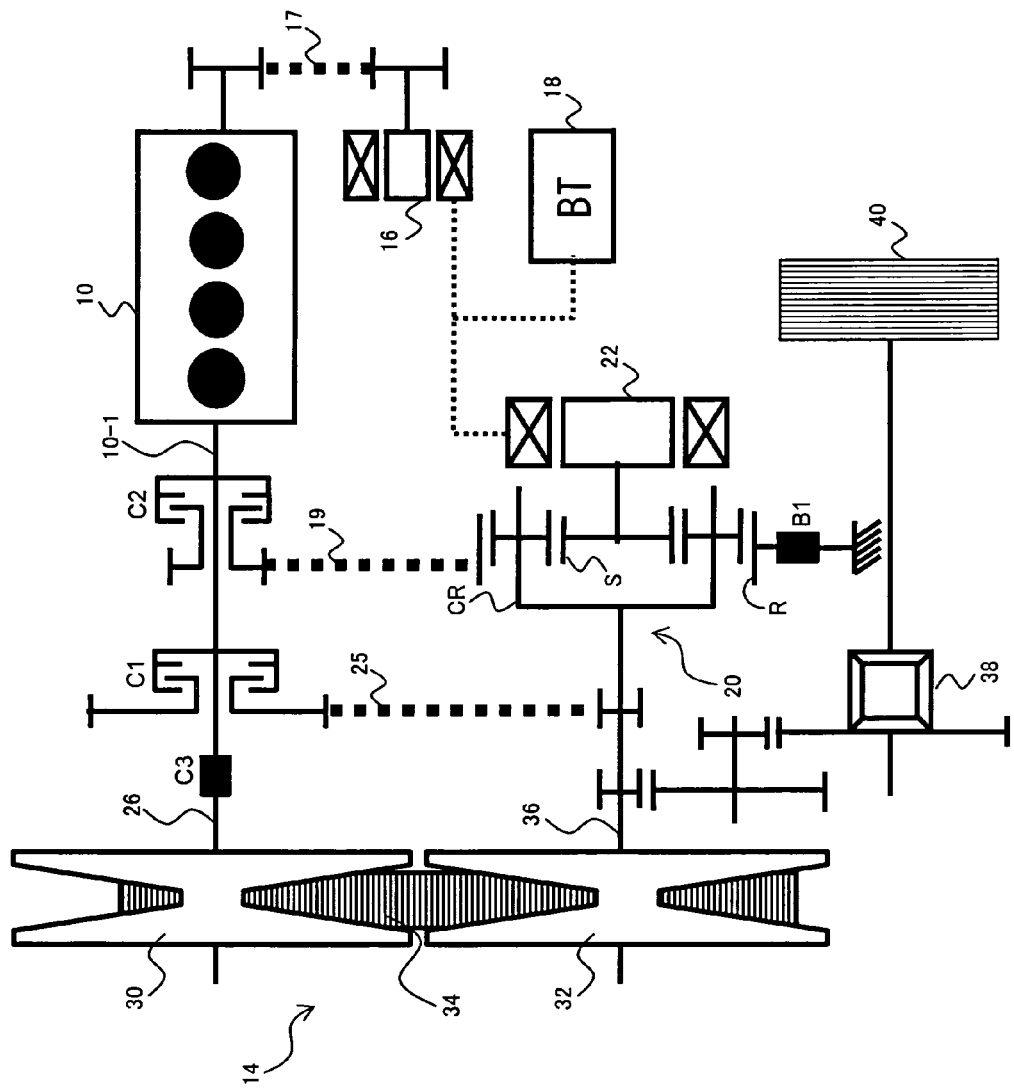
FIG. 46 is a diagram explaining a power assist control according to the third embodiment.

When assisting the vehicle drive with the power of the motor generator 22 while the vehicle is driven by the power of the engine 10, the electronic control unit 42 performs control so as to release the clutches C1, C2 and engage the clutch C3 and the brake B1 as shown in FIG. 46, to thereby allow power transmission to occur between the engine 10 and the driven wheel 40 via the speed variator 14. While in this state, similarly to in the first embodiment, the electronic control unit 42 controls the torque $T_{mg}$ of the motor generator 22 so as to perform power assist control by which power transmitted between the motor generator 22 and the driven wheel 40 is adjusted.

Figure 47:
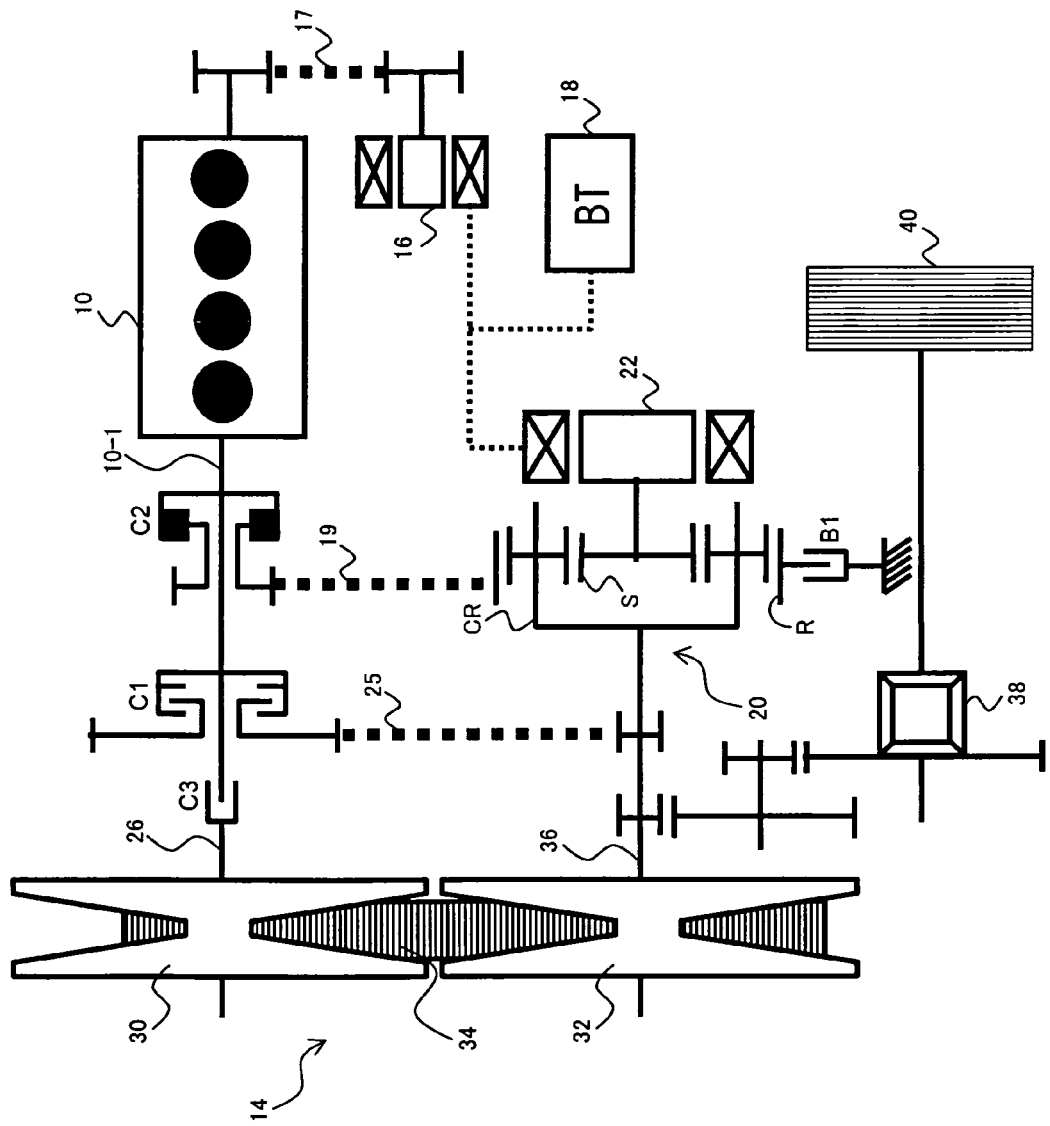
FIG. 47 is a diagram explaining a move-off operation according to the third embodiment.

When carrying out a move-off operation in which the vehicle in a stopped state is driven forward, the electronic control unit 42 performs control so as to release the clutches C1, C3 and the brake B1 and engage the clutch C2 as shown in FIG. 47 while the engine 10 is rotationally activated. While in this state, similarly to in the first embodiment, the electronic control unit 42 performs torque control of the motor generator 22 to apply the torque $T_{mg}$ in the forward rotational direction to the sun gear S, thereby causing the vehicle to move off.

Figure 48:
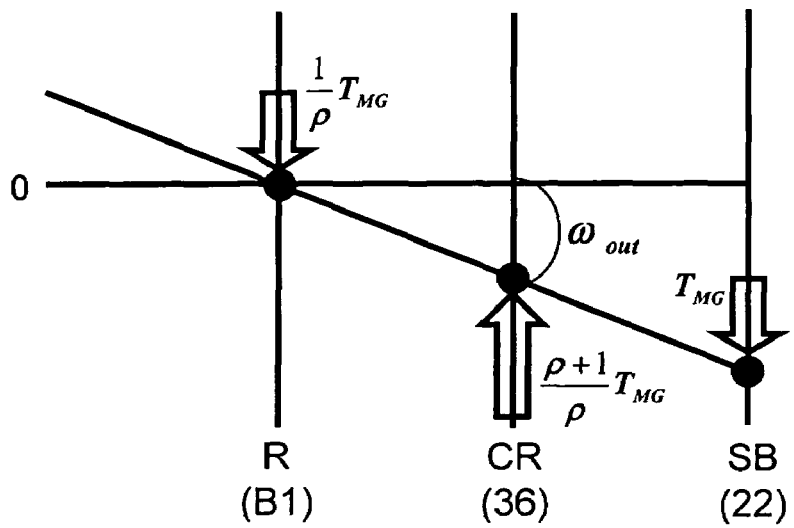
FIG. 48 is a diagram explaining a reverse launch operation according to the third embodiment.

When carrying out a reverse launch operation in which the vehicle is driven in the reverse direction, the electronic control unit 42 performs control so as to release the clutches C1, C2, and C3 and engage the brake B1, as shown in FIG. 45. While in this state, the electronic control unit 42 performs torque control of the motor generator 22 as shown by an arrow in the lever diagram of FIG. 48 so as to apply the torque $T_{mg}$ in the reverse rotational direction (lower direction in FIG. 48) to the sun gear S, thereby causing the vehicle to travel in the reverse direction. As such, according to the present embodiment, reverse launch operation is executed by performing EV travel control.

The engaged/released states of the clutches C1, C2, C3, and the brake B1 in the above-described respective operations of the present embodiment can be summarized as shown in Table 3 below. In Table 3, "O" denotes the engaged state, while blank denotes the released state.

TABLE 3

|  | C1 | C2 | C3 | B1 |
|---|---|---|---|---|
| power distribution control |  | O | O |  |
| constant gear ratio transmission control | O |  |  |  |
| EV travel control |  |  |  | O |
| power assist control |  |  | O | O |
| move-off operation |  | O |  |  |
| reverse launch operation |  |  |  | O |

According to the present embodiment described above, similarly to in the first and second embodiments, power distribution between the power conveyed to the speed variator 14 and the power conveyed to the planetary gear mechanism 20 can be actively controlled by adjusting the torque $T_{mg}$ of the motor generator 22. Further, a system according to the present embodiment can provide the function of a hybrid power output system while reducing dependency on the electric system.

Furthermore, according to the present embodiment, when the ratio between the rotational speed $\omega_{eng}$ of the engine 10 and the rotational speed $\omega_{out}$ of the output shaft 36 equals a predetermined ratio, by engaging the clutch C1, it is possible to transmit power between the engine 10 and the driven wheel 40 via the transmission device 25 without controlling the torque $T_{mg}$ of the motor generator 22. For example, by setting the gear ratio of the transmission device 25 such that the clutch C1 can be engaged while in a speed increasing state in which the gear ratio γ is smaller than one, it is possible to further enhance power transmission efficiency during light-load drive operation. Further, by controlling the torque transmission capacity (for example, the belt pressure or the pressing force of the roller against the input and output disks) of the speed variator 14 while the clutch C3 is engaged, power distribution between the power conveyed to the speed variator 14 and the power conveyed to the planetary gear mechanism 20 can be actively controlled.

Other example configurations of the present embodiment are described below.

Figure 49:
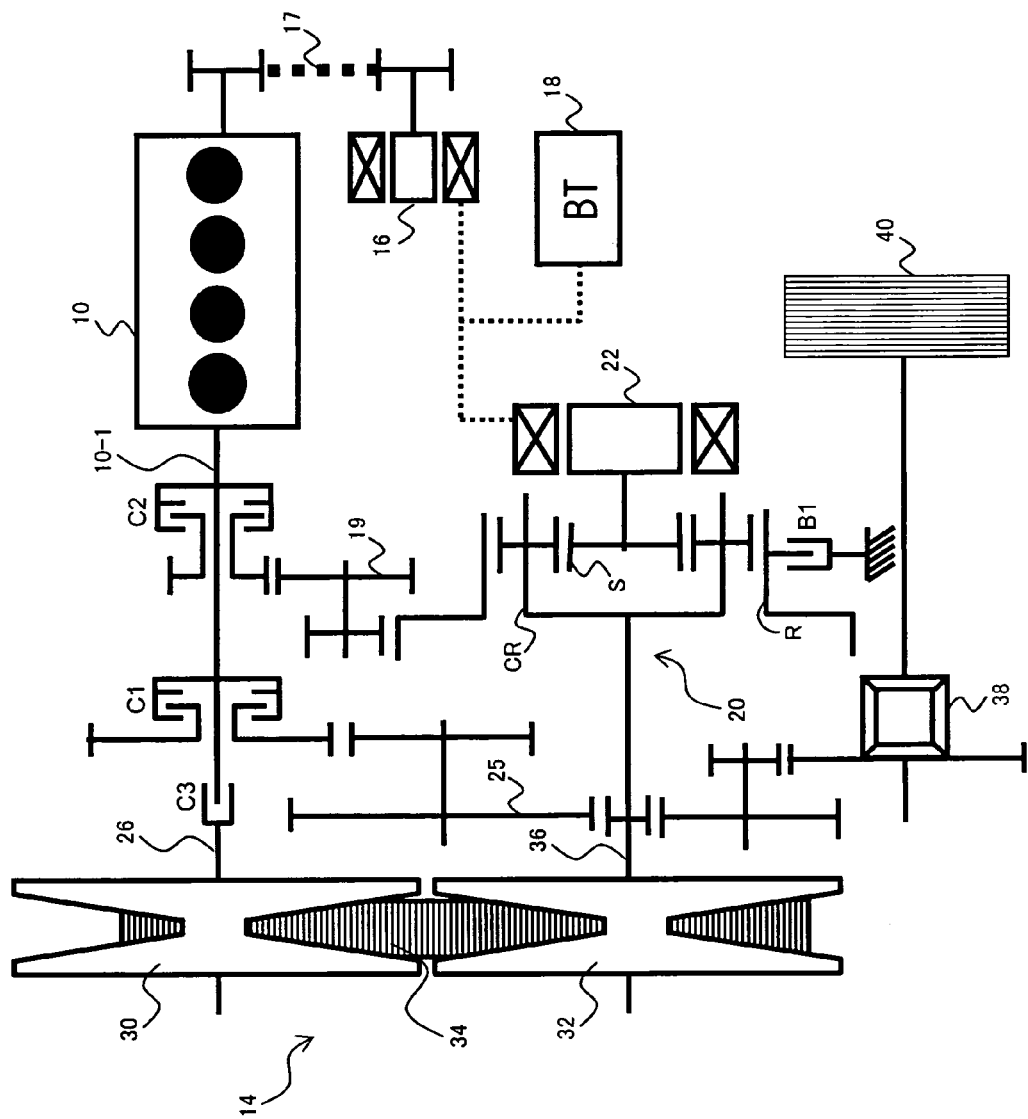
FIG. 49 is a diagram showing another general configuration of a power output system according to the third embodiment.
Figure 50:
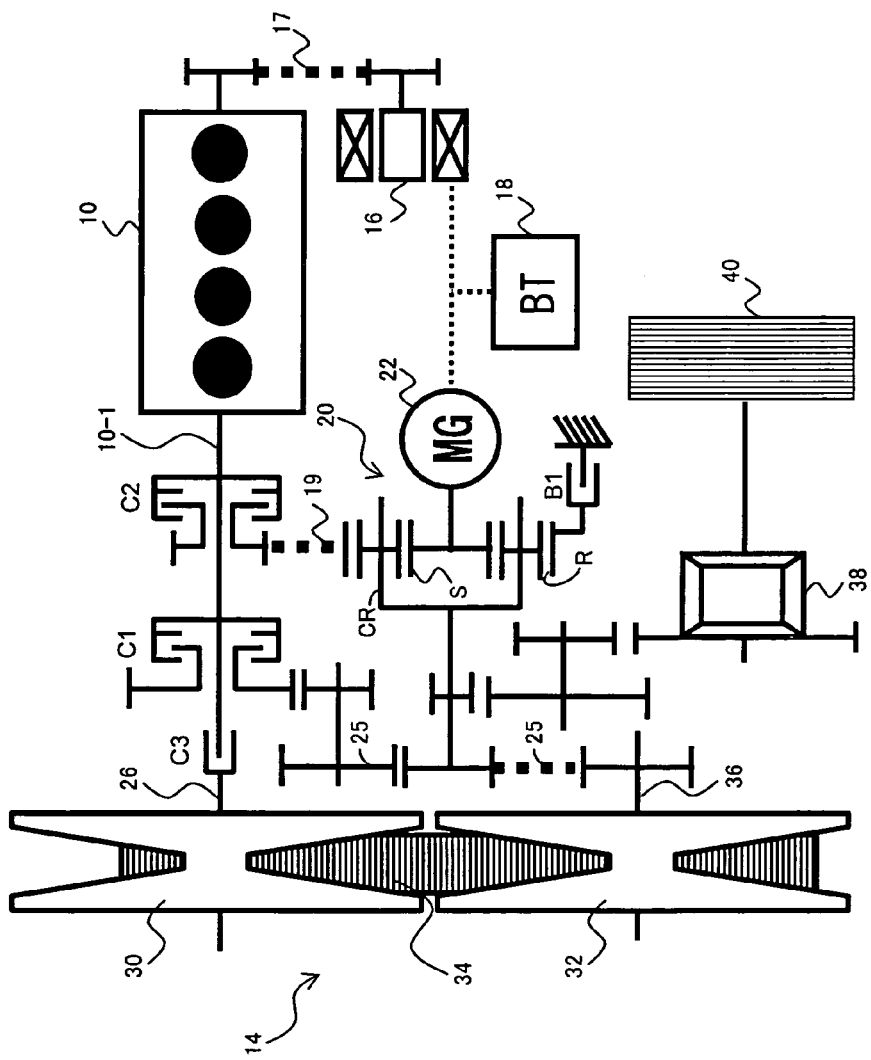
FIG. 50 is a diagram showing a further general configuration of a power output system according to the third embodiment.

FIG. 49 shows an example in which counter gears are employed as the transmission device 25. Further, FIG. 50 shows an example in which the planetary gear mechanism 20 is arranged such that the central axis of the planetary gear mechanism 20 is placed in a position between the input shaft 26 and the output shaft 36 of the speed variator 14. In this example, the transmission device 25 provided between the clutch C1 and the output shaft 36 of the speed variator 14 is configured with counter gears and a chain. Operations of the example configurations shown in FIGS. 49 and 50 are identical to those of the system of FIG. 42.

Fourth Embodiment

Figure 51:
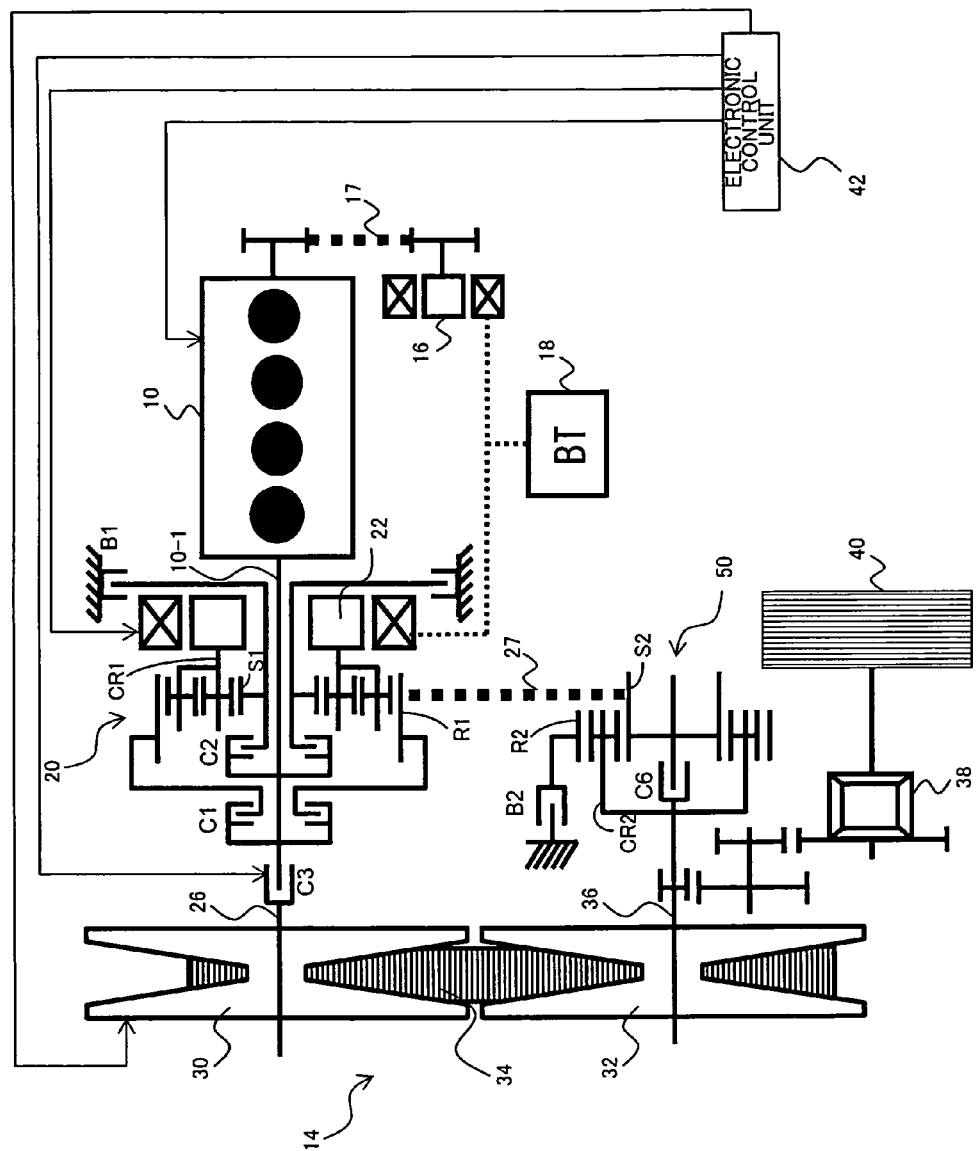
FIG. 51 is a diagram showing a general configuration of a power output system according to a fourth embodiment of the present invention.

FIG. 51 is a diagram showing a general configuration of a power output system according to a fourth embodiment of the present invention. In contrast to the first embodiment, the planetary gear mechanism 20 in the present embodiment is configured with a double-pinion type planetary gearset which includes, as the rotating elements, a sun gears S1, carrier CR1, and ring gear R1. Further, this planetary gear mechanism 20 is coupled to another planetary gear mechanism 50 via a transmission device 27 composed with a chain or the like provided in parallel to the speed variator 14. The planetary gear mechanism 50 is configured with a single-pinion type planetary gearset which includes, as the rotating elements, a sun gears S2, carrier CR2, and ring gear R2. The carrier CR1 is coupled to the motor generator 22, and can transmit torque from the motor generator 22. The sun gear S1 is capable of coupling to the output shaft 10-1 of the engine 10 via the clutch C2, and can transmit torque from the engine 10. The ring gear R1 is coupled to the sun gear S2 via the transmission device 27. The carrier CR2 is coupled to the output shaft 36 of the speed variator 14. The sun gear S2 is capable of coupling to the output shaft 36 of the speed variator 14 and the carrier CR2 via a clutch C6. Both of the planetary gear mechanisms 20 and 50 are mechanisms having two rotational degrees of freedom. It should be noted that FIG. 51 shows an example in which the planetary gear mechanism 20 is arranged such that the central axis of the planetary gear mechanism 20 is placed in a position matching the input shaft 26 of the speed variator 14, and the planetary gear mechanism 50 is arranged such that the central axis of the planetary gear mechanism 50 is placed in a position matching the output shaft 36 of the speed variator 14.

By engaging or releasing the clutch C1, it is possible to couple or decouple between the output shaft 10-1 of the engine and the ring gear R1 (sun gear S2). By engaging or releasing the clutch C2, it is possible to couple or decouple between the output shaft 10-1 of the engine and the sun gear S1. By engaging or releasing the clutch C3, it is possible to couple or decouple between the output shaft 10-1 of the engine and the input shaft 26 of the speed variator 14. By engaging or releasing the clutch C6, it is possible to couple or decouple between the carrier CR2 and the sun gear S2. By engaging or releasing the brake B1, it is possible to constrain or allow rotation of the sun gear S1. By engaging or releasing the brake B2, it is possible to constrain or allow rotation of the ring gear R2. In each of the above-described clutches C1, C2, C3, C6 and brakes B1, B2, the switching between the engaged state and the released (disengaged) state can be achieved by employing hydraulic or electromagnetic force, for example. Furthermore, the locking (engaging) force of each of the clutches C1, C2, C3, C6 and brakes B1, B2 may be adjusted by controlling locking force control signals CS_C1, CS_C2, CS_C3, CS_C6, CS_B1, and CS_B2 from the electronic control unit 42 which adjust the hydraulic or electromagnetic force supplied to the clutches C1, C2, C3, C6 and brakes B1, B2, respectively.

As such, the present embodiment includes a second power transmission path by which power from the engine 10 can be transmitted to the driven wheel 40 via the clutch C2, the planetary gear mechanism 20, the transmission device 27, and the planetary gear mechanism 50, and a third power transmission path by which power from the engine 10 can be transmitted to the driven wheel 40 via the clutch C1, the transmission device 27, and the planetary gear mechanism 50 at a predetermined gear ratio. Other structures of the present embodiment are identical to those of the first embodiment.

Operations performed by the power output system according to the present embodiment are next described. It should be noted that operations concerning which explanation will not be repeated are identical to those of the first to third embodiments.

Figure 52:
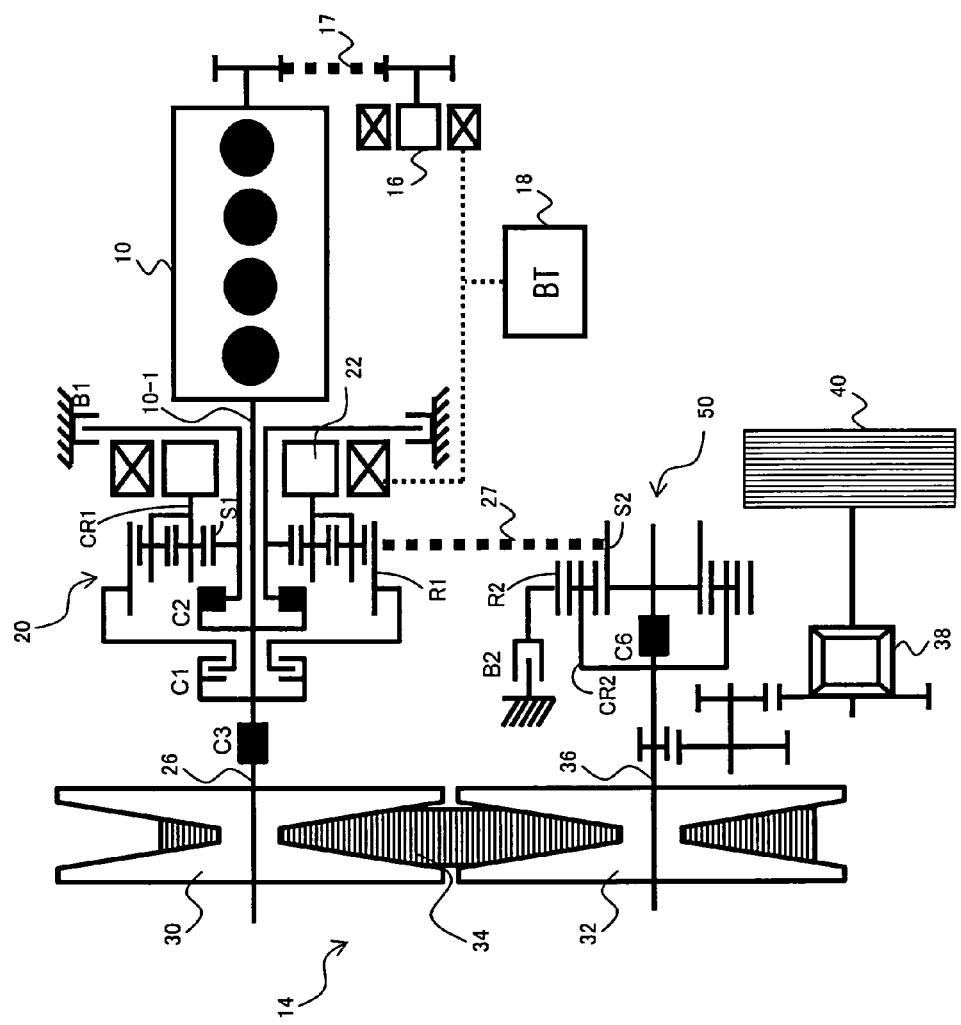
FIG. 52 is a diagram explaining a power distribution control according to the fourth embodiment.

When power transmission between the engine 10 and the driven wheel 40 is to be performed via both the speed variator 14 and the planetary gear mechanism 20, the electronic control unit 42 performs control so as to release the clutch C1 and the brakes B1 and B2, and to engage the clutches C2, C3, and C6, as shown in FIG. 52. While in this state, the electronic control unit 42 controls the torque of the motor generator 22 so as to execute power distribution control for controlling distribution of power between the power conveyed to the speed variator 14 and the power conveyed to the planetary gear mechanism 20.

Figure 53:
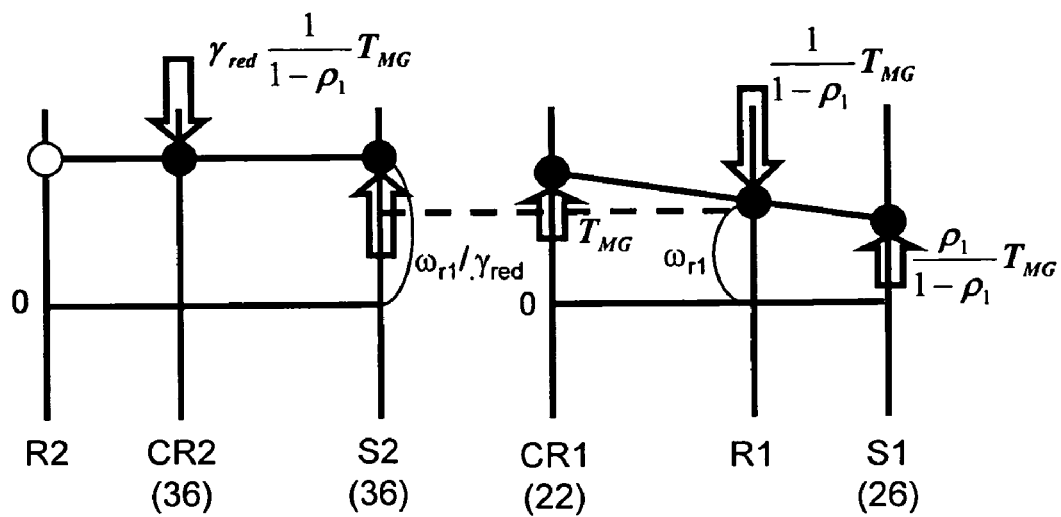
FIG. 53 is a lever diagram showing a power distribution control according to the fourth embodiment.
Figure 54:
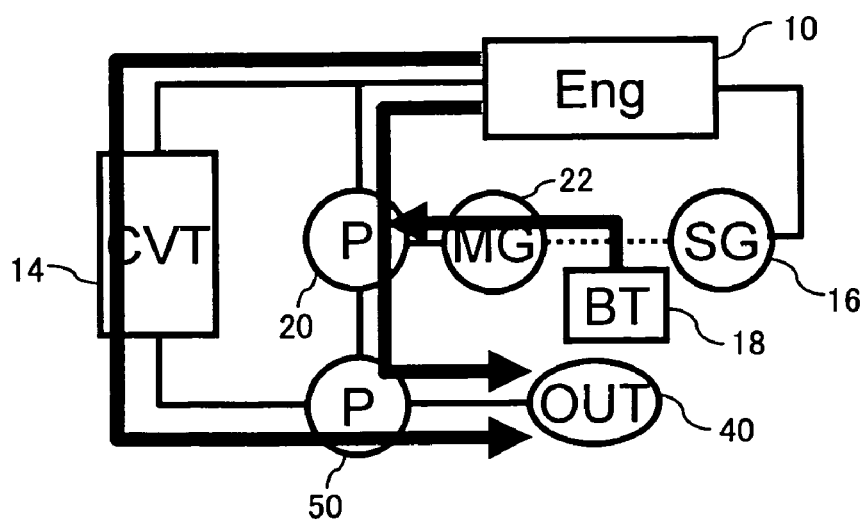
FIG. 54 is a diagram explaining a power distribution control according to the fourth embodiment.
Figure 55:
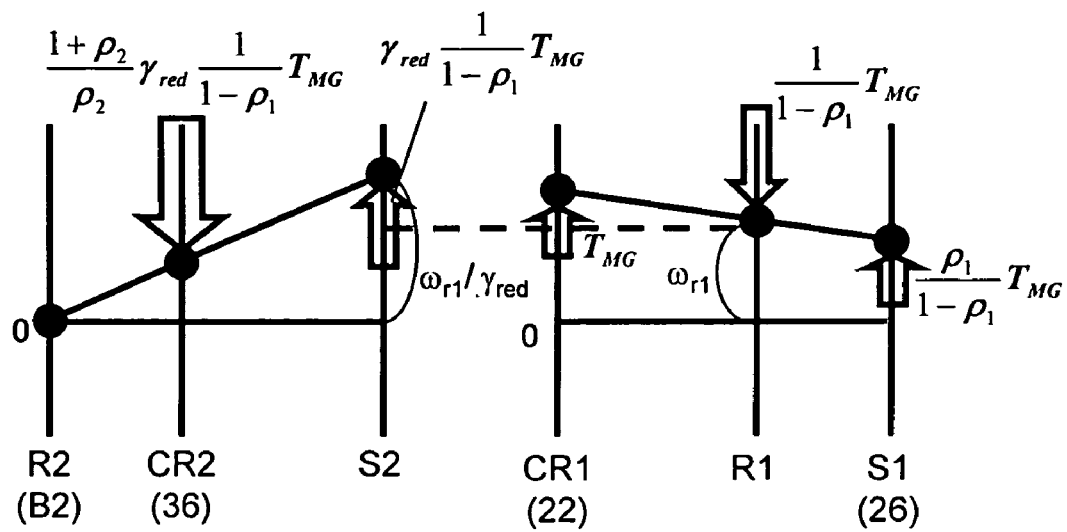
FIG. 55 is a lever diagram showing another example of power distribution control according to the fourth embodiment.

When driving the vehicle in the forward direction, the electronic control unit 42 performs torque control of the motor generator 22 as shown by an arrow in the lever diagram of FIG. 53 so as to apply the torque $T_{mg}$ in the forward rotational direction (upper direction in FIG. 53) to the carrier CR1. As a result, the power of the engine 10 is transmitted by being distributed to both the speed variator 14 and the planetary gear mechanism 20, as shown in FIG. 54. The power conveyed to the planetary gear mechanism 20 is combined with the power of the motor generator 22, and this combined power is transmitted to the driven wheel 40 via the planetary gear mechanism 50 in which the sun gear S2, carrier CR2, and the ring gear R2 are rotated as one piece. In achieving this, the planetary gear mechanism 20 performs a torque combining operation in which the torque conveyed from the engine 10 to the sun gear S1 is combined with the torque conveyed from the motor generator 22 to the carrier CR1 in a state such that their torque ratio equals the predetermined ratio $\rho_1/(1-\rho_1)$, and the resulting torque is transmitted from the ring gear R1 to the driven wheel 40. In the lever diagram of FIG. 53, $\rho_1$ denotes the ratio (constant value) of number of teeth between the sun gear S1 and the ring gear R1, $\omega_{hd\ r1}$ denotes the rotational speed of the ring gear R1, and $\gamma_{red}$ denotes the ratio (constant value) of number of teeth between the sun gear S2 and the ring gear R1. When kinetic energy of the vehicle is to be regenerated (when the vehicle is decelerating), the electronic control unit 42 performs torque control of the motor generator 22 so as to apply the torque $T_{mg}$ in the reverse rotational direction (lower direction in FIG. 53) to the carrier CR1. Further, when executing power distribution control in the present embodiment, the electronic control unit 42 may alternatively engage the brake B2 instead of the clutch C6. In this case, the power conveyed from the ring gear R1 to the sun gear S2 is transmitted to the output shaft 36 of the speed variator 14 after being subjected to change (reduction) of speed at the gear ratio $(1+\rho_2)/\rho_2$, as shown in the lever diagram of FIG. 55. Here, $\rho_2$ denotes the ratio (constant value) of number of teeth between the sun gear S2 and the ring gear R2.

Figure 59:
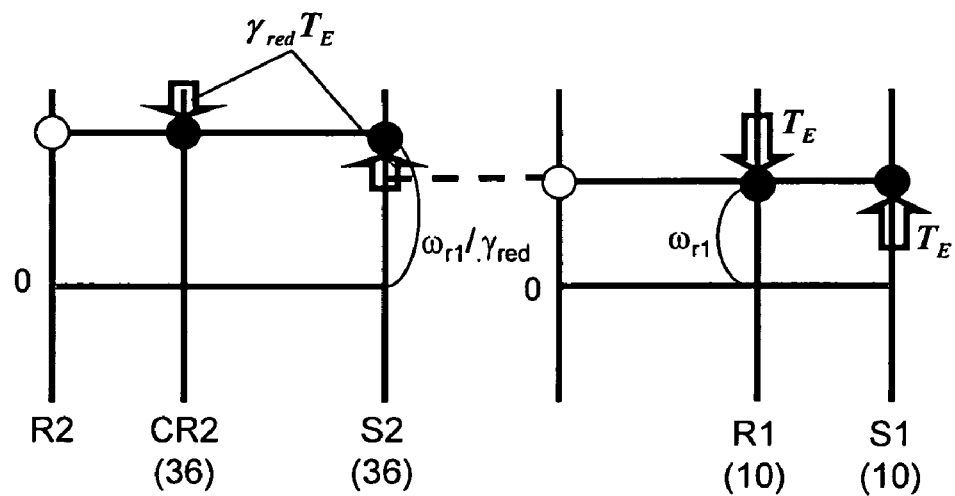
FIG. 59 is a lever diagram explaining another example of constant gear ratio transmission control according to the fourth embodiment.
Figure 56:
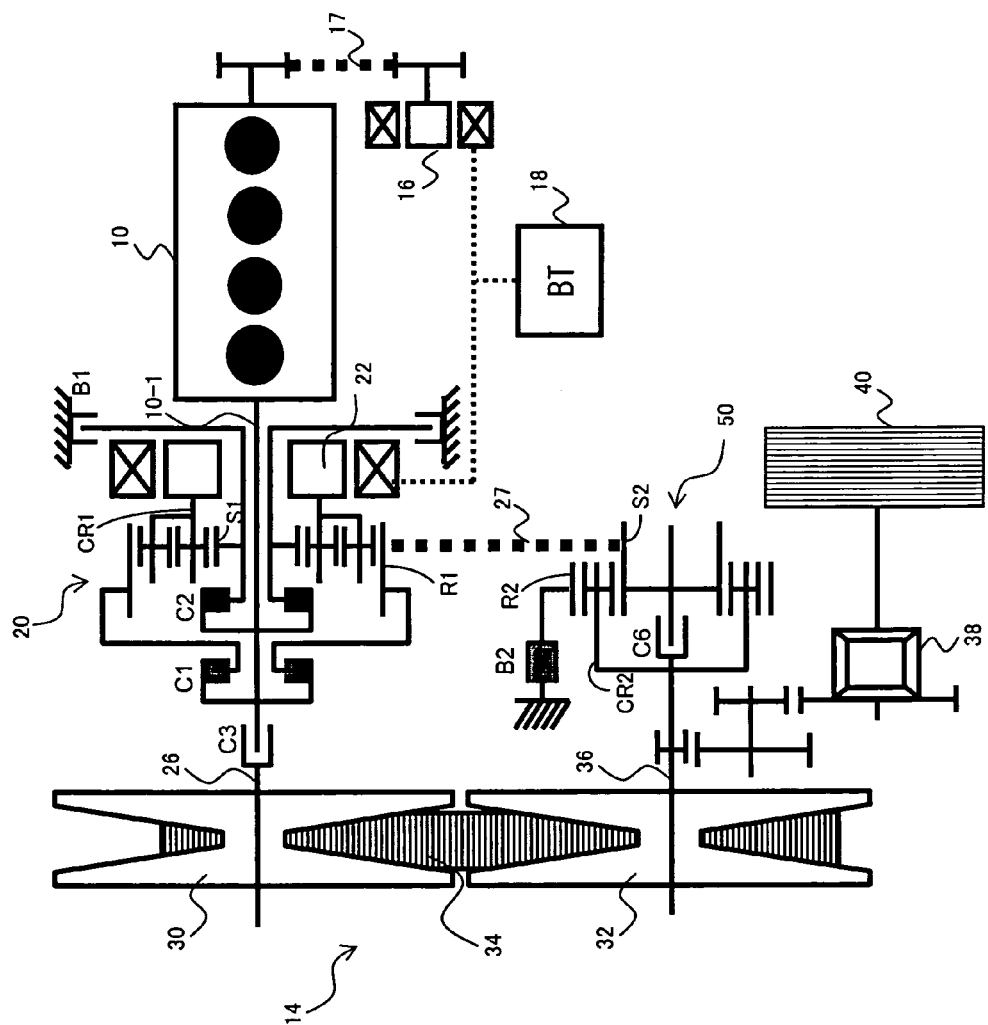
FIG. 56 is a diagram explaining a constant gear ratio transmission control according to the fourth embodiment.
Figure 57:
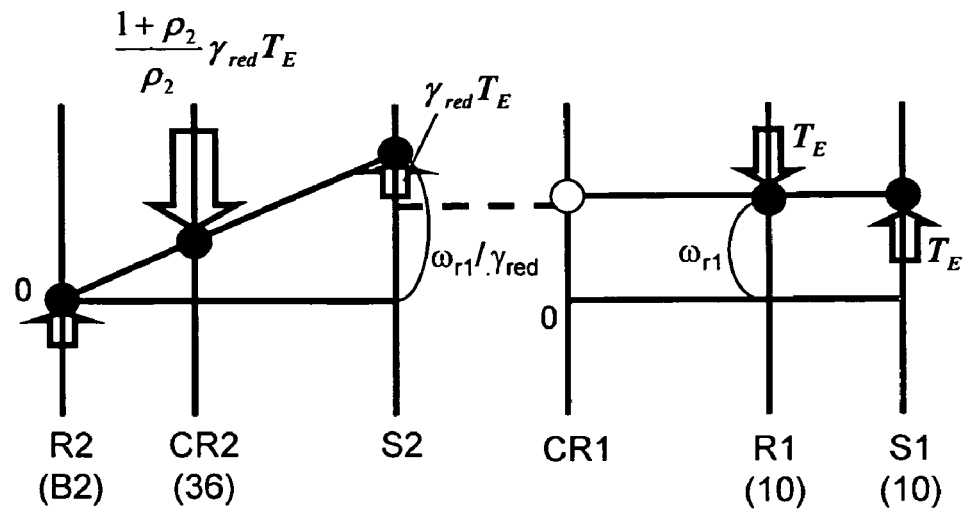
FIG. 57 is a lever diagram explaining a constant gear ratio transmission control according to the fourth embodiment.
Figure 58:
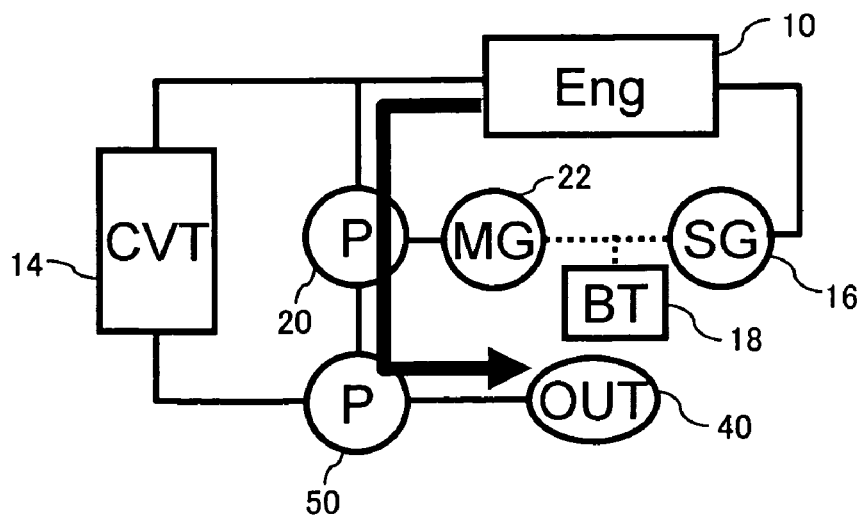
FIG. 58 is a diagram explaining a constant gear ratio transmission control according to the fourth embodiment.

According to the present embodiment, when the ratio between the rotational speed $\omega_{eng}$ of the engine 10 and the rotational speed $\omega_{out}$ of the output shaft 36 (i.e., the gear ratio $\gamma$ of the speed variator 14) equals a predetermined ratio $[(1+\rho_2)/\rho_2]\times\gamma_{red}$, the electronic control unit 42 can engage the clutches C1, C2, and the brake B2, so as to couple the engine 10 and the output shaft 36 of the speed variator 14 (i.e., driven wheel 40) via the transmission device 27 and the planetary gear mechanism 50, as shown in FIG. 56. As a result of this coupling, the electronic control unit 42 can execute constant gear ratio transmission control so as to transmit power between the engine 10 and the driven wheel 40 via the transmission device 27 and the planetary gear mechanism 50 at a predetermined gear ratio without controlling the torque $T_{mg}$ of the motor generator 22. When the vehicle is to be driven by means of the power of the engine 10 during execution of constant gear ratio transmission control, the power $T_e \times \omega_{r1}$ of the engine 10 is first conveyed to the output shaft 36 of the speed variator 14 at the predetermined ratio $[(1+\rho_2)/\rho_2] \times \gamma_{red}$ and subsequently transmitted to the driven wheel 40, as shown in FIGS. 57 and 58. Further, according to the present embodiment, when the ratio between the rotational speed $\omega_{eng}$ of the engine 10 and the rotational speed $\omega_{out}$ of the output shaft 36 equals the predetermined ratio $\gamma_{red}$, the electronic control unit 42 can engage the clutches C1, C2, and C6 so as to transmit the power $T_e \times \omega_{r1}$ of the engine 10 to the output shaft 36 of the speed variator 14 via the transmission device 27 and the planetary gear mechanism 50 at the predetermined gear ratio $\gamma_{red}$, as shown in FIG. 59, thereby similarly executing constant gear ratio transmission control.

While FIG. 56 illustrates a case in which constant gear ratio transmission control is executed while the coupling of the engine 10 and the driven wheel 40 via the speed variator 14 is decoupled by releasing the clutch C3, it should be noted that, according to the present embodiment, constant gear ratio transmission control can be also executed while the clutch C3 is engaged to couple the engine 10 and the driven wheel 40 via the speed variator 14. When executing constant gear ratio transmission control in this state, the electronic control unit 42 may control the torque transmission capacity of the speed variator 14, so as to thereby control distribution of power conveyed to the speed variator 14 and power conveyed to the transmission device 27 (planetary gear mechanism 50). Specific details according to which the torque transmission capacity of the speed variator 14 may be controlled in this case are similar to those of the second embodiment. Furthermore, when executing constant gear ratio transmission control, the electronic control unit 42 can also control distribution of power conveyed to the speed variator 14 and power conveyed to the transmission device 27 by adjusting the torque transmission capacity of the clutch C3.

Figure 60:
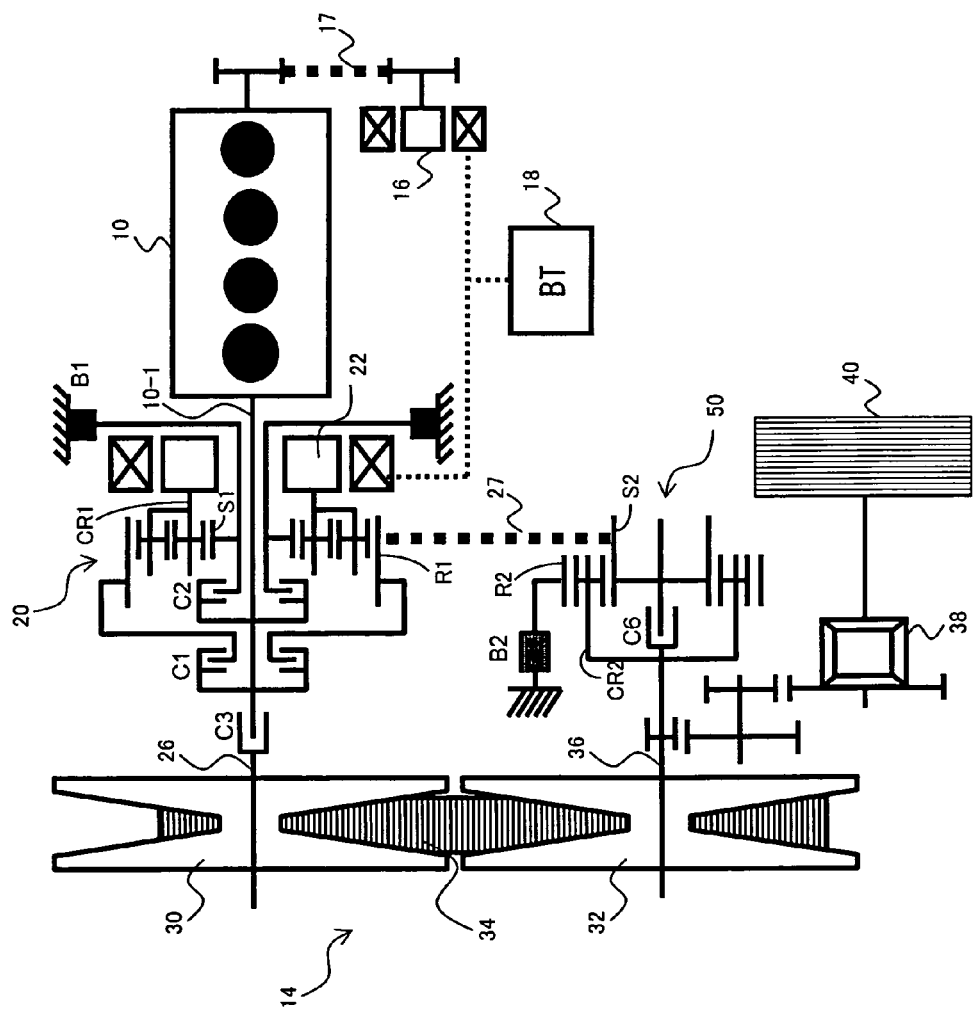
FIG. 60 is a diagram explaining an EV travel control according to the fourth embodiment.

When performing EV travel operation in which the vehicle is driven by the power of the motor generator 22 without transmitting the power of the engine 10 to the driven wheel 40, the electronic control unit 42 performs control so as to release the clutches C1, C2, C3, C6 and engage the brakes B1, B2, as shown in FIG. 60. While in this state, the electronic control unit 42 controls the torque $T_{mg}$ of the motor generator 22 so as to perform EV travel control by which power transmitted between the motor generator 22 and the driven wheel 40 is controlled.

Figure 61:
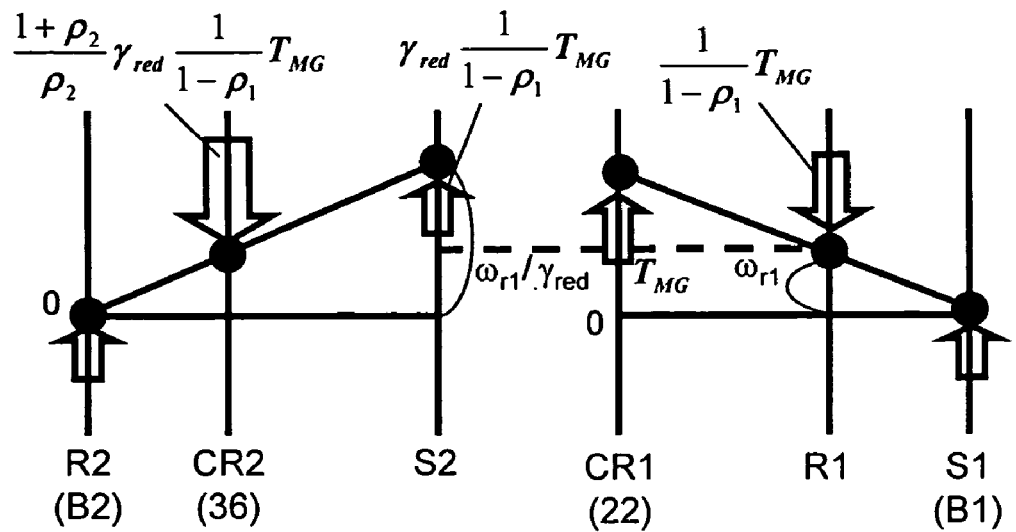
FIG. 61 is a lever diagram explaining an EV travel control according to the fourth embodiment.
Figure 62:
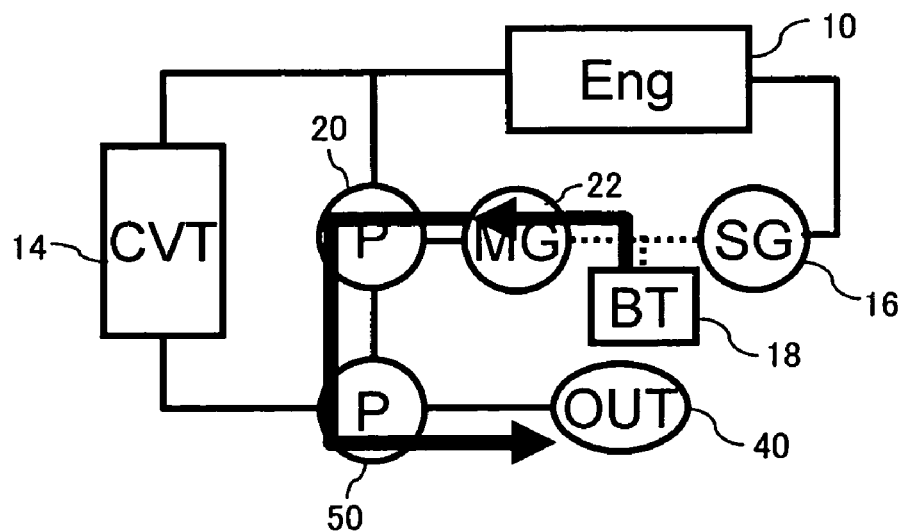
FIG. 62 is a diagram explaining an EV travel control according to the fourth embodiment.
Figure 63:
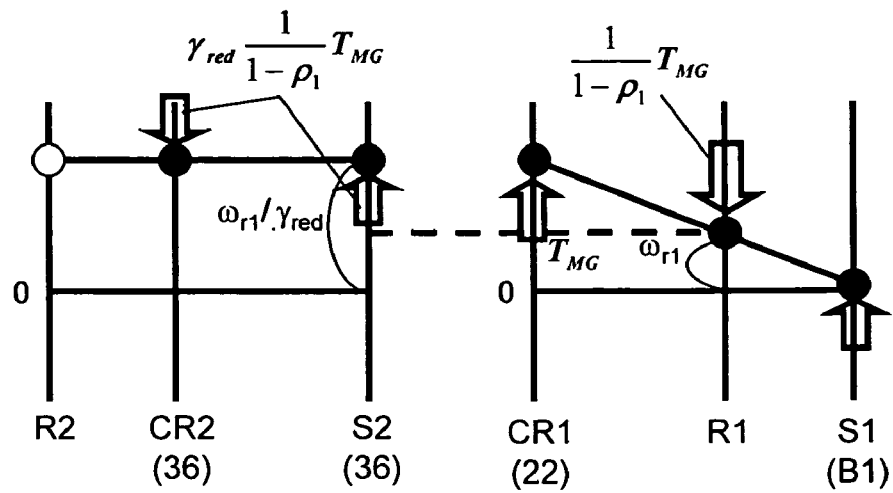
FIG. 63 is a lever diagram explaining another example of EV travel control according to the fourth embodiment.

More specifically, when driving the vehicle in the forward direction by means of power of the motor generator 22, the electronic control unit 42 performs torque control of the motor generator 22 as shown by an arrow in the lever diagram of FIG. 61 so as to apply the torque $T_{mg}$ in the forward rotational direction (upper direction in FIG. 61) to the carrier CR1. As a result, powering operation by the motor generator 22 is performed, and, as shown in FIG. 62, power of the motor generator 22 is transmitted to the driven wheel 40 via the planetary gear mechanisms 20, 50 while the speed is changed (reduced) by the planetary gear mechanisms 20, 50. On the other hand, when regenerating kinetic energy of the vehicle (when the vehicle is decelerating), the electronic control unit 42 performs torque control of the motor generator 22 so as to apply the torque $T_{mg}$ in the reverse rotational direction (lower direction in FIG. 61) to the carrier CR1. Further, when performing EV travel control in the present embodiment, the electronic control unit 42 may alternatively engage the clutch C6 instead of the brake B2. In this case, the sun gear S2, carrier CR2, and ring gear R2 of the planetary gear mechanism 50 are rotated as one piece, as shown in the lever diagram of FIG. 63.

Figure 64:
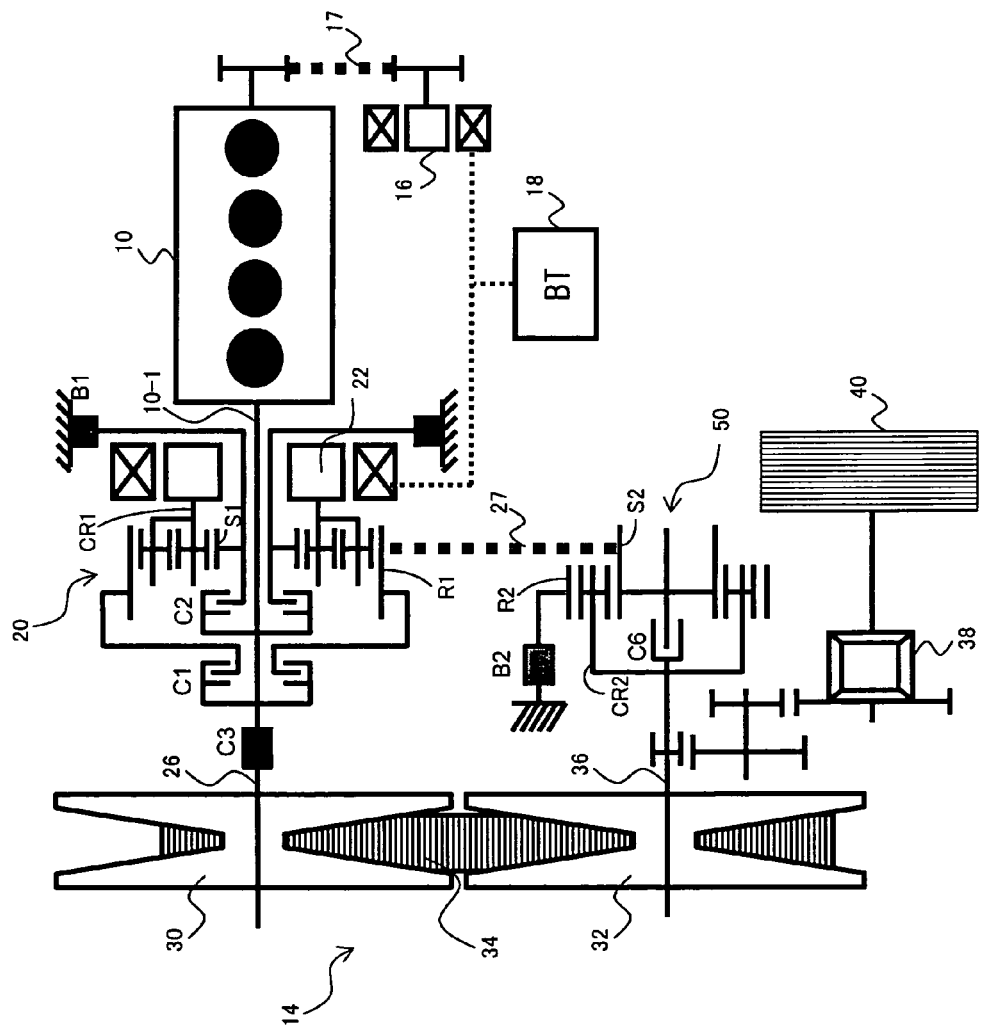

When assisting the vehicle drive with the power of the motor generator 22 while the vehicle is driven by the power of the engine 10, the electronic control unit 42 performs control so as to release the clutches C1, C2, C6 and engage the clutch C3 and the brakes B1, B2 as shown in FIG. 64, to thereby allow power transmission to occur between the engine 10 and the driven wheel 40 via the speed variator 14. While in this state, the electronic control unit 42 controls the torque $T_{mg}$ of the motor generator 22 so as to perform power assist control by which power transmitted between the motor generator 22 and the driven wheel 40 is adjusted.

Figure 65:
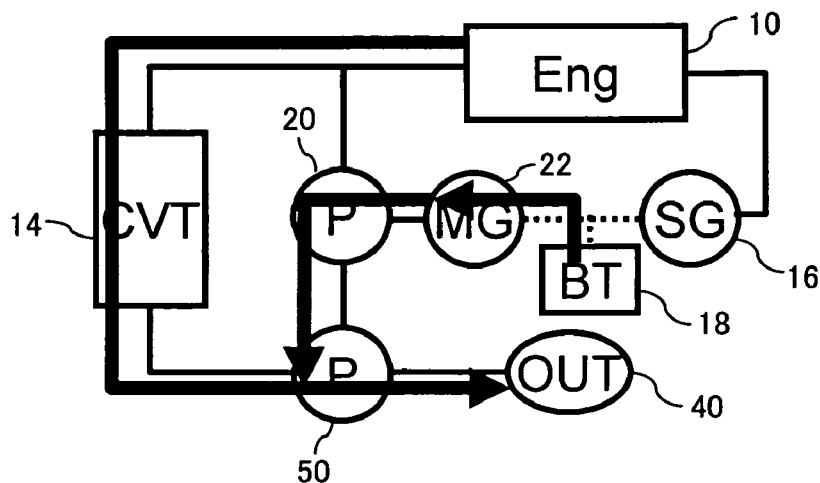
FIGS. 64 and 65 are diagrams explaining a power assist control according to the fourth embodiment.

More specifically, in a state in which the requested power of the vehicle is greater than the engine power when the vehicle is to be driven in the forward direction by means of power of the engine 10, the electronic control unit 42 performs torque control of the motor generator 22 as shown by an arrow in the lever diagram of FIG. 61 so as to apply the torque $T_{mg}$ in the forward rotational direction (upper direction in FIG. 61) to the carrier CR1. As a result, powering operation by the motor generator 22 is performed, and, as shown in FIG. 65, power of the motor generator 22 is transmitted to the driven wheel 40 via the planetary gear mechanisms 20, 50 while the speed is changed (reduced) by the planetary gear mechanisms 20, 50. On the other hand, when the requested power of the vehicle is smaller than the engine power, or when kinetic energy of the vehicle is to be regenerated, the electronic control unit 42 performs torque control of the motor generator 22 so as to apply the torque $T_{mg}$ in the reverse rotational direction (lower direction in FIG. 61) to the carrier CR1. Further, when performing power assist control in the present embodiment, the electronic control unit 42 may alternatively engage the clutch C6 instead of the brake B2. In this case, the sun gear S2, carrier CR2, and ring gear R2 of the planetary gear mechanism 50 are rotated as one piece, as shown in the lever diagram of FIG. 63.

Figure 66:
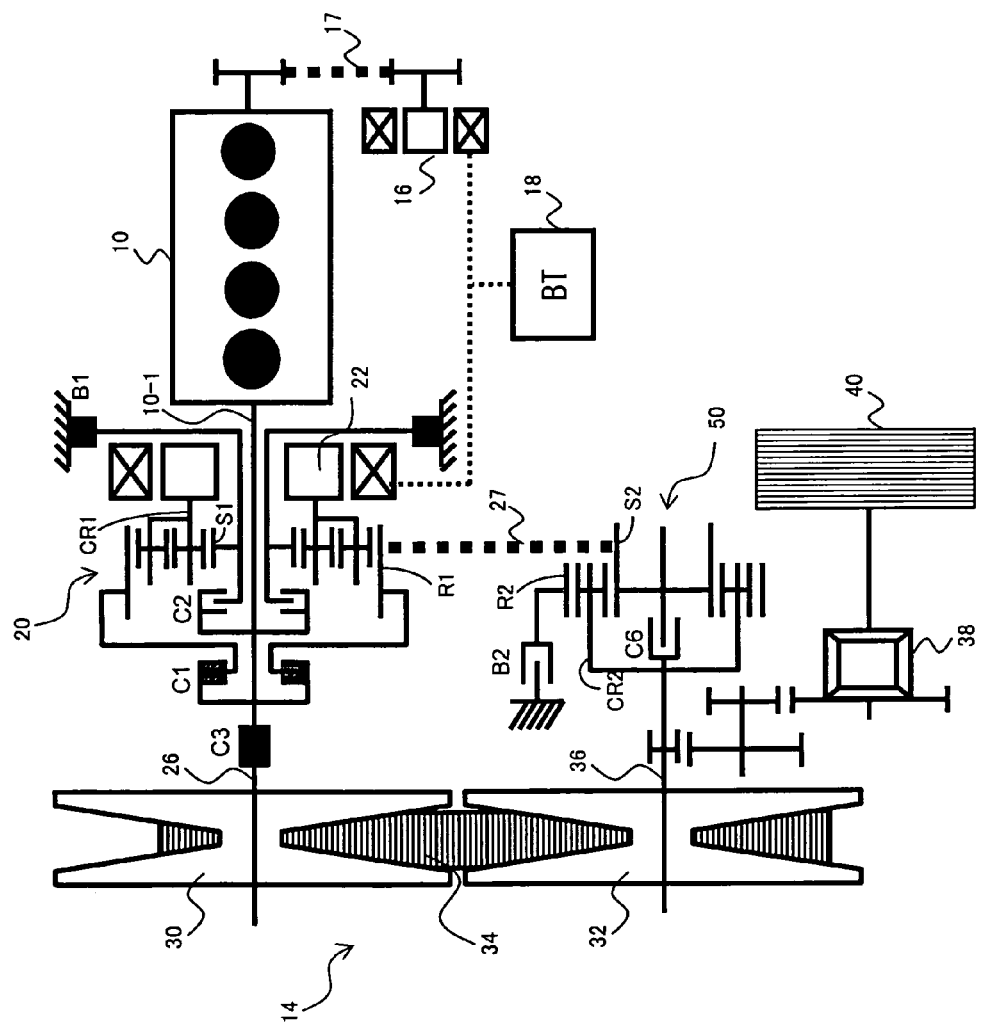
FIG. 66 is a diagram explaining a further example of power assist control according to the fourth embodiment.
Figure 67:
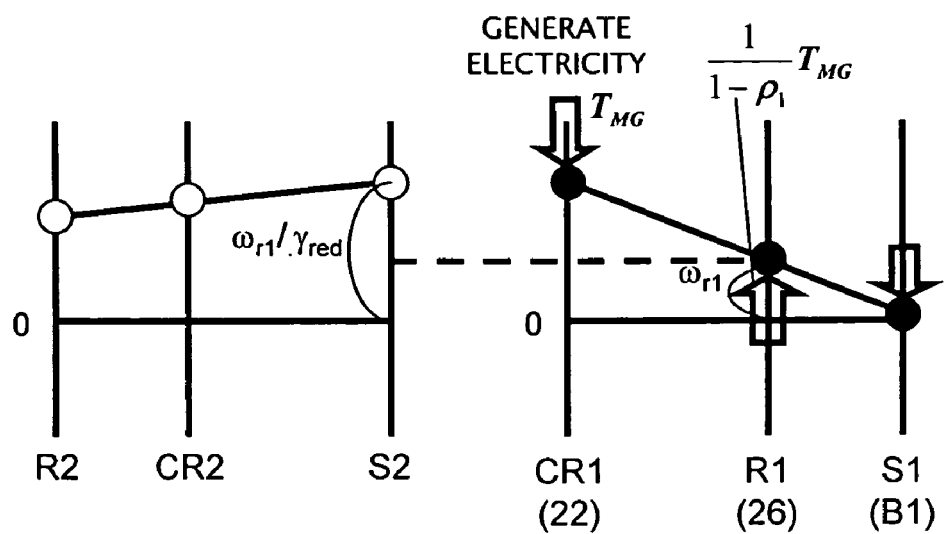
FIG. 67 is a lever diagram explaining the further example of power assist control according to the fourth embodiment.
Figure 68:
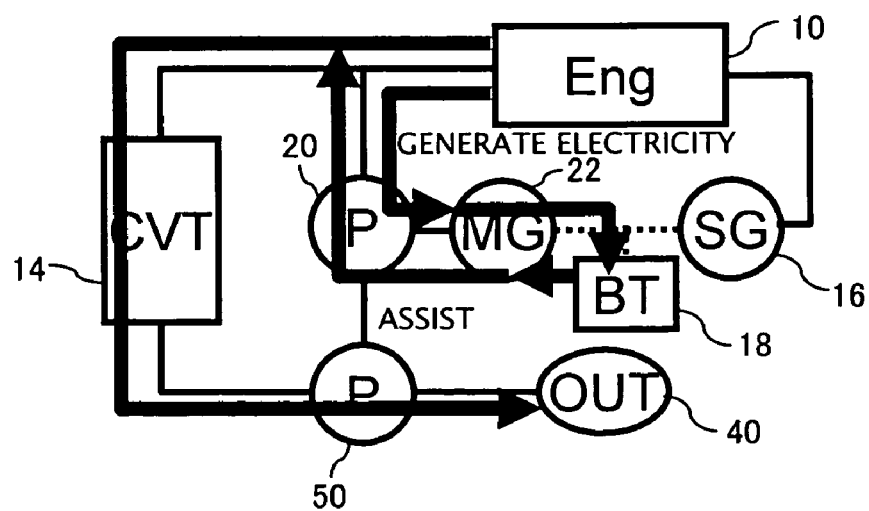
FIG. 68 is a diagram explaining another example of power assist control according to the fourth embodiment.

Furthermore, when performing power assist control in the present embodiment, the electronic control unit 42 may alternatively engage the clutch C1 instead of the clutch C6 or the brake B2 so as to couple the ring gear R1 and the input shaft 26 of the speed variator 14 (i.e., output shaft 10-1 of the engine 10), as shown in FIG. 66. When the requested power of the vehicle is smaller than the engine power, the electronic control unit 42 performs torque control of the motor generator 22 as shown by an arrow in the lever diagram of FIG. 67 so as to apply the torque $T_{mg}$ in the reverse rotational direction (lower direction in FIG. 67) to the carrier CR1. As a result, regenerating operation by the motor generator 22 is performed, and, as shown in FIG. 68, a portion of power of the engine 10 is transmitted to the motor generator 22 via the planetary gear mechanism 20 so as to be converted into electric power generated by the motor generator 22. On the other hand, when the requested power of the vehicle is greater than the engine power, the electronic control unit 42 performs torque control of the motor generator 22 so as to apply the torque $T_{mg}$ in the forward rotational direction (upper direction in FIG. 67) to the carrier CR1. As a result, powering operation by the motor generator 22 is performed, and, as shown in FIG. 68, power of the motor generator 22 is conveyed via the planetary gear mechanisms 20 to the speed variator 14, and then transmitted to the driven wheel 40 along with the power of the engine 10 while the speed is changed.

Figure 69:
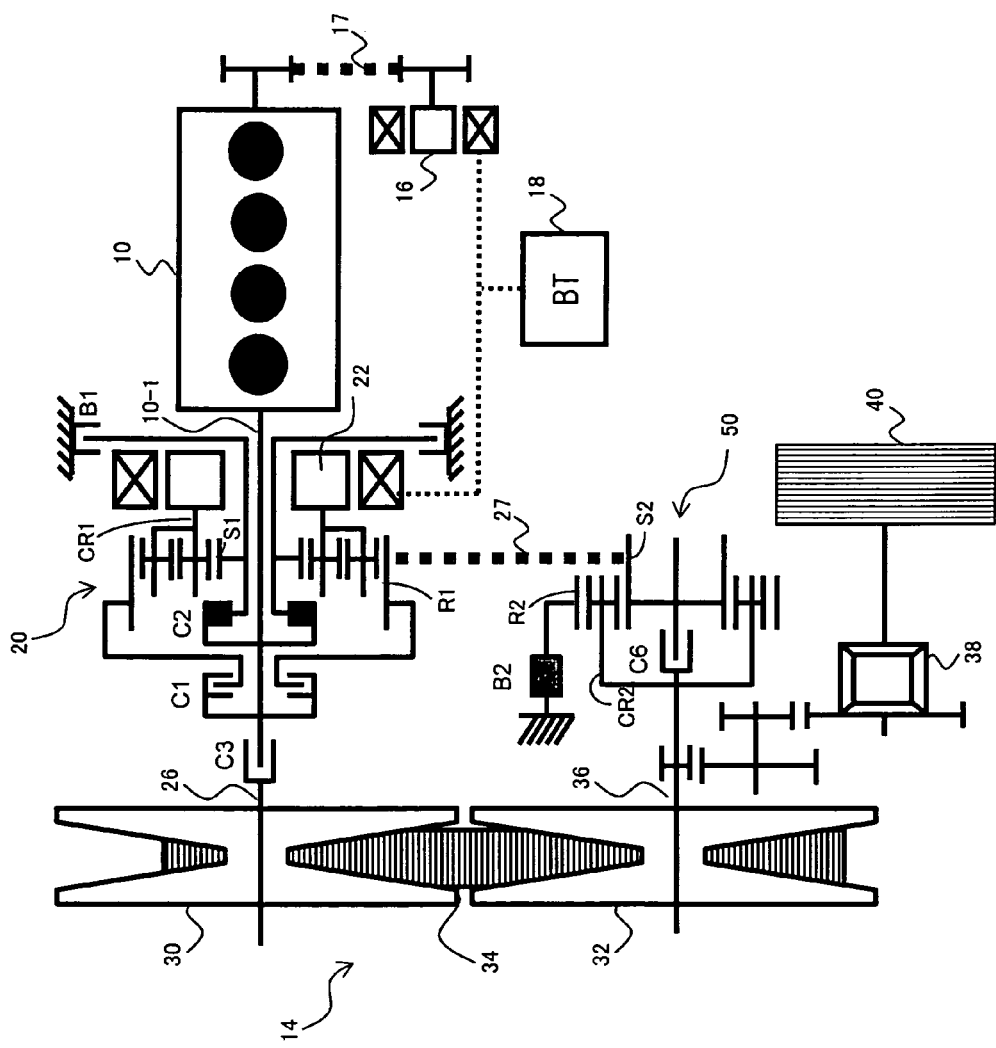
FIG. 69 is a diagram explaining a move-off operation according to the fourth embodiment.
Figure 70:
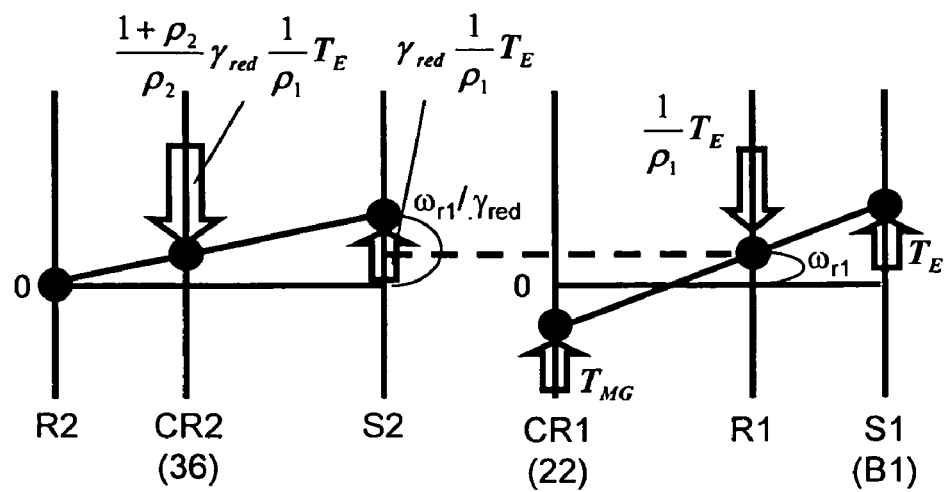
FIG. 70 is a lever diagram explaining a move-off operation according to the fourth embodiment.
Figure 71:
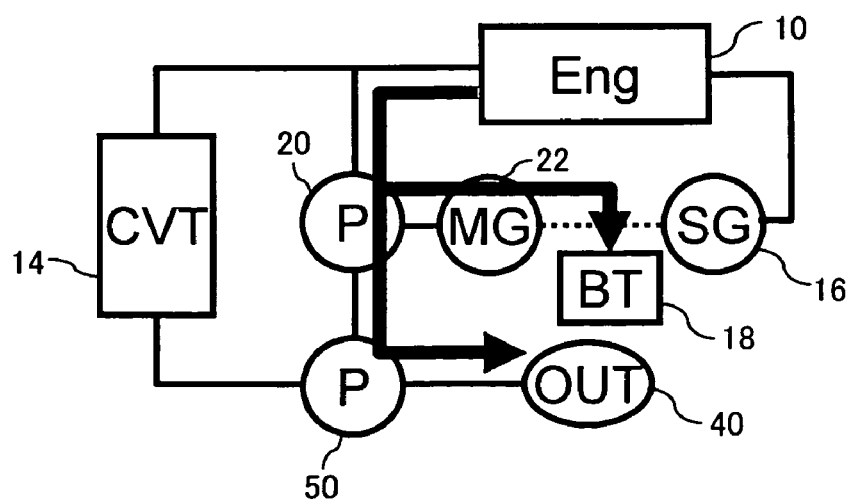
FIG. 71 is a diagram explaining a move-off operation according to the fourth embodiment.

When carrying out a move-off operation in which the vehicle in a stopped state is driven forward, the electronic control unit 42 performs control so as to release the clutches C1, C3, C6 and the brake B1 and engage the clutch C2 and the brake B2 as shown in FIG. 69 while the engine 10 is rotationally activated. In this state, the electronic control unit 42 performs torque control of the motor generator 22 as shown by an arrow in the lever diagram of FIG. 70 so as to apply the torque $T_{mg}$ in the forward rotational direction (upper direction in FIG. 70) to the carrier CR1. As a result, torque is applied from the ring gear R1 to the driven wheel 40 via the planetary gear mechanism 50, thereby causing the vehicle to move off. During this operation, because the power conveyed from the ring gear R1 to the sun gear S2 is transmitted to the output shaft 36 of the speed variator 14 after being subjected to change (reduction) of speed at the gear ratio $(1+\rho_2)/\rho_2$ as shown in the lever diagram of FIG. 70, torque of the driven wheel 40 can be increased. Further, as shown in FIG. 71, the power conveyed from the engine 10 to the sun gear S1 of the planetary gear mechanism 20 is transmitted to the motor generator 22 so as to be converted into electric power generated by the motor generator 22.

When carrying out a reverse launch operation in which the vehicle is driven in the reverse direction, the electronic control unit 42 first performs control so as to release the clutches C1, C2, C3, C6 and engage the brakes B1, B2. While in this state, the electronic control unit 42 performs torque control of the motor generator 22 to apply the torque $T_{mg}$ in the reverse rotational direction to the carrier CR1, thereby causing the vehicle to travel in the reverse direction. As such, according to the present embodiment, reverse launch operation is executed by performing EV travel control. Further, when performing reverse launch operation in the present embodiment, the electronic control unit 42 may alternatively engage the clutch C6 instead of the brake B2.

Figure 72:
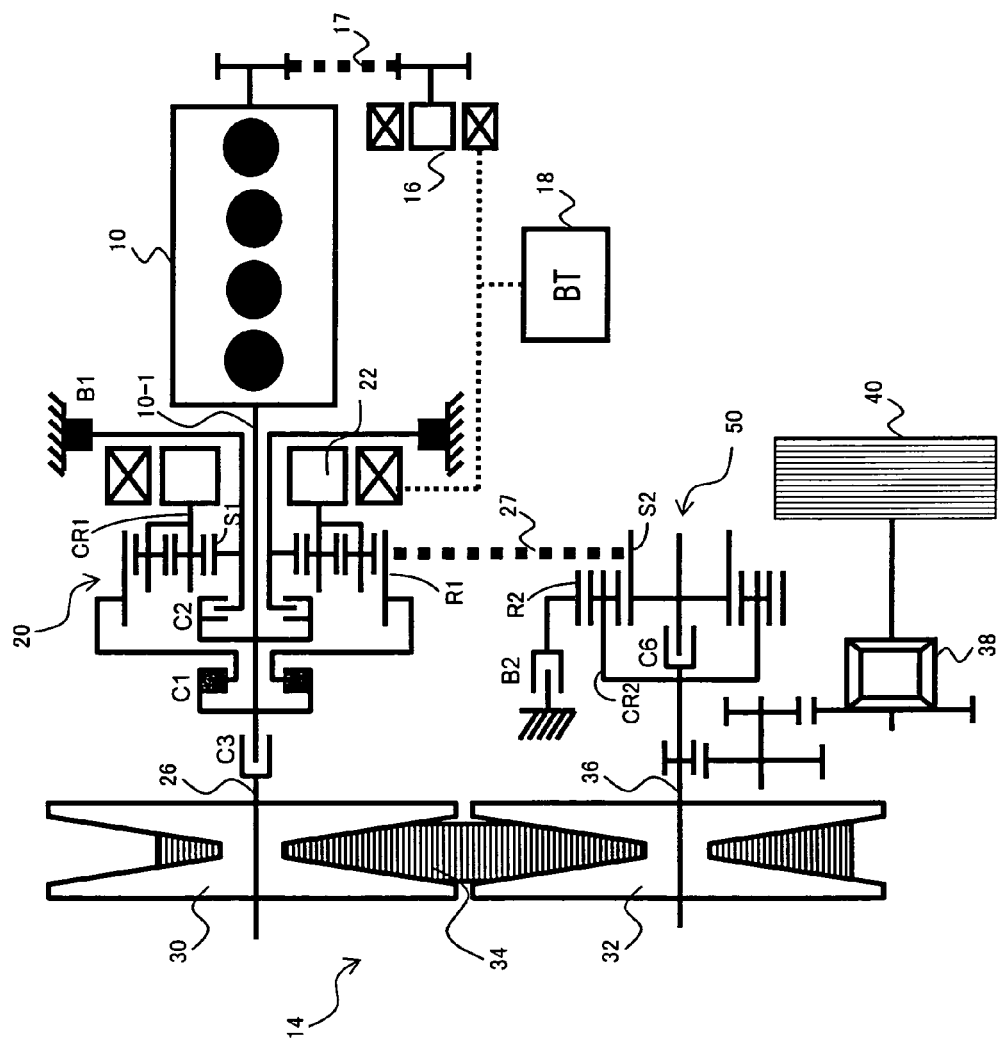
FIG. 72 is a diagram explaining a non-travel electricity generating operation according to the fourth embodiment.
Figure 73:
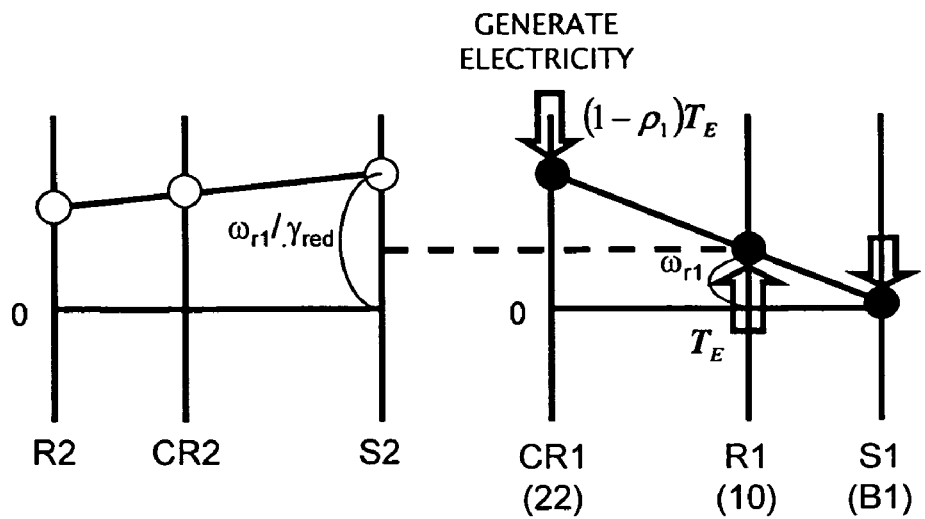
FIG. 73 is a lever diagram explaining a non-travel electricity generating operation according to the fourth embodiment.
Figure 74:
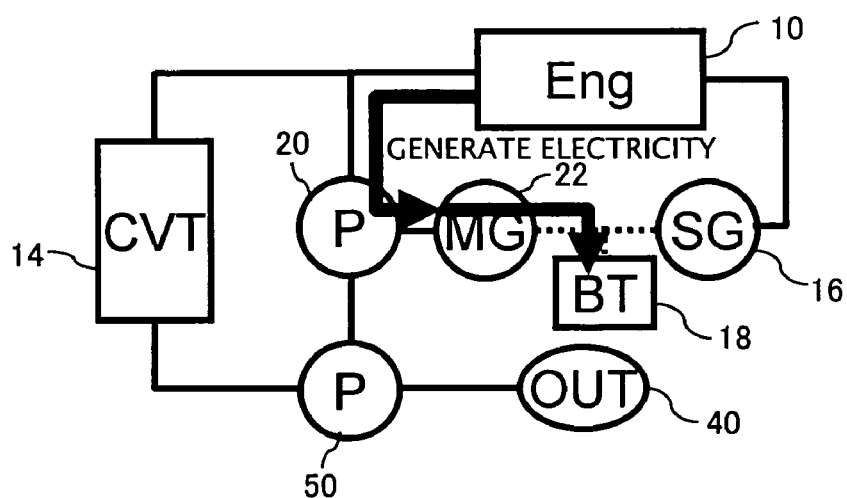
FIG. 74 is a diagram explaining a non-travel electricity generating operation according to the fourth embodiment.

According to the present embodiment, it is also possible to perform a non-travel electricity generating operation in which power of the engine 10 is used to cause the motor generator 22 to generate electricity while the vehicle is in a stopped state. When performing the non-travel electricity generating operation, the electronic control unit 42 performs control so as to release the clutches C2, C3, C6, and the brake B2 and engage the clutch C1 and the brake B1, as shown in FIG. 72. While in this state, the electronic control unit 42 performs torque control of the motor generator 22 as shown by an arrow in the lever diagram of FIG. 73 so as to apply the torque $T_{mg}$ in the reverse rotational direction (lower direction in FIG. 73) to the carrier CR1. As a result, regenerating operation by the motor generator 22 is performed, and, as shown in FIG. 74, power of the engine 10 is transmitted to the motor generator 22 via the planetary gear mechanism 20 so as to be converted into electric power generated by the motor generator 22.

Figure 75:
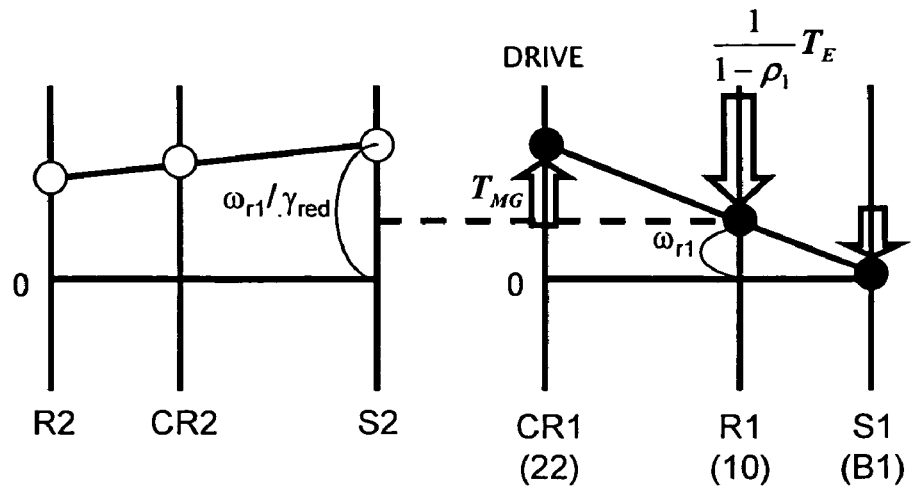
FIG. 75 is a lever diagram explaining an engine start operation according to the fourth embodiment.
Figure 76:
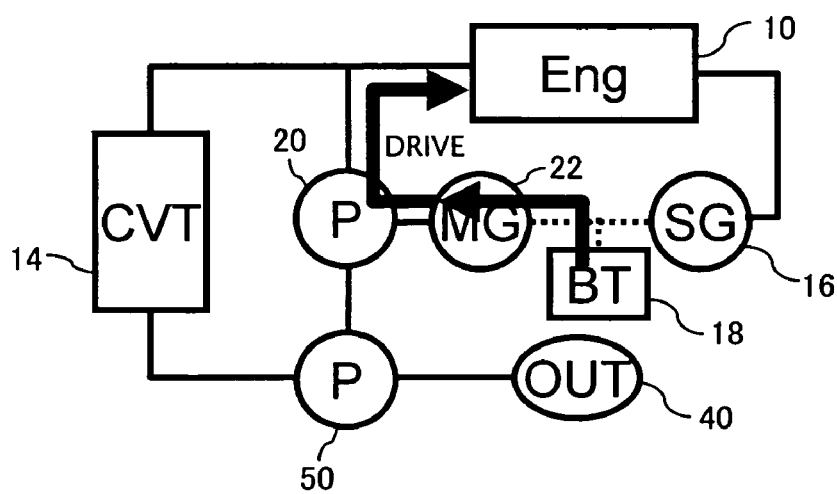
FIG. 76 is a diagram explaining an engine start operation according to the fourth embodiment.

According to the present embodiment, it is also possible to perform an engine start operation in which the engine 10 in a shutdown state is started by means of power of the motor generator 22. When performing this engine start operation, the electronic control unit 42 performs control so as to release the clutches C2, C3, C6, and the brake B2 and engage the clutch C1 and the brake B1, as shown in FIG. 72. While in this state, the electronic control unit 42 performs torque control of the motor generator 22 as shown by an arrow in the lever diagram of FIG. 75 so as to apply the torque $T_{mg}$ in the forward rotational direction (upper direction in FIG. 75) to the carrier CR1. As a result, powering operation by the motor generator 22 is performed, and, as shown in FIG. 76, power of the motor generator 22 is transmitted to the engine 10 while being subjected to change (reduction) of speed by the planetary gear mechanism 20, thereby achieving cranking of the engine 10.

The engaged/released states of the clutches C1, C2, C3, C6, and the brakes B1, B2 in the above-described respective operations of the present embodiment can be summarized as shown in Table 4 below. In Table 4, "O" denotes the engaged state, while blank denotes the released state.

TABLE 4

|  | C1 | C2 | C3 | C6 | B1 | B2 |
|---|---|---|---|---|---|---|
| power distribution control |  | O | O | O |  |  |
| power distribution control (second example) |  | O | O |  | O |  |
| constant gear ratio transmission control | O | O |  |  |  | O |
| constant gear ratio transmission control (second example) | O | O |  | O |  |  |
| EV travel control |  |  |  |  | O | O |
| EV travel control (second example) |  |  |  | O | O |  |
| power assist control |  |  | O |  | O | O |
| power assist control (second example) |  |  | O | O | O |  |
| power assist control (third example) | O |  | O |  | O |  |
| move-off operation |  | O |  |  |  | O |
| reverse launch operation |  |  |  |  | O | O |
| reverse launch operation (second example) |  |  |  | O | O |  |
| non-travel electricity generating operation | O |  |  |  | O |  |
| engine start operation | O |  |  |  | O |  |

According to the present embodiment described above, similarly to in the first to third embodiments, power distribution between the power conveyed to the speed variator 14 and the power conveyed to the planetary gear mechanism 20 can be actively controlled by adjusting the torque of the motor generator 22. Further, a system according to the present embodiment can provide the function of a hybrid power output system while reducing dependency on the electric system.

Further, according to the present embodiment, the gear ratio of the planetary gear mechanism 50 can be changed by switching between engagement of either one of the clutch C6 or the brake B2. For example, during a move-off operation, by engaging the brake B2, the power conveyed from the ring gear R1 to the sun gear S2 can be transmitted to the driven wheel 40 while reducing speed, such that the torque 40 of the driven wheel 40 can be increased for the move-off operation. Furthermore, by selecting which of the clutch C6 or the brake B2 to engage, it is possible to select the gear ratio employed when performing constant gear ratio transmission control.

Figure 77:
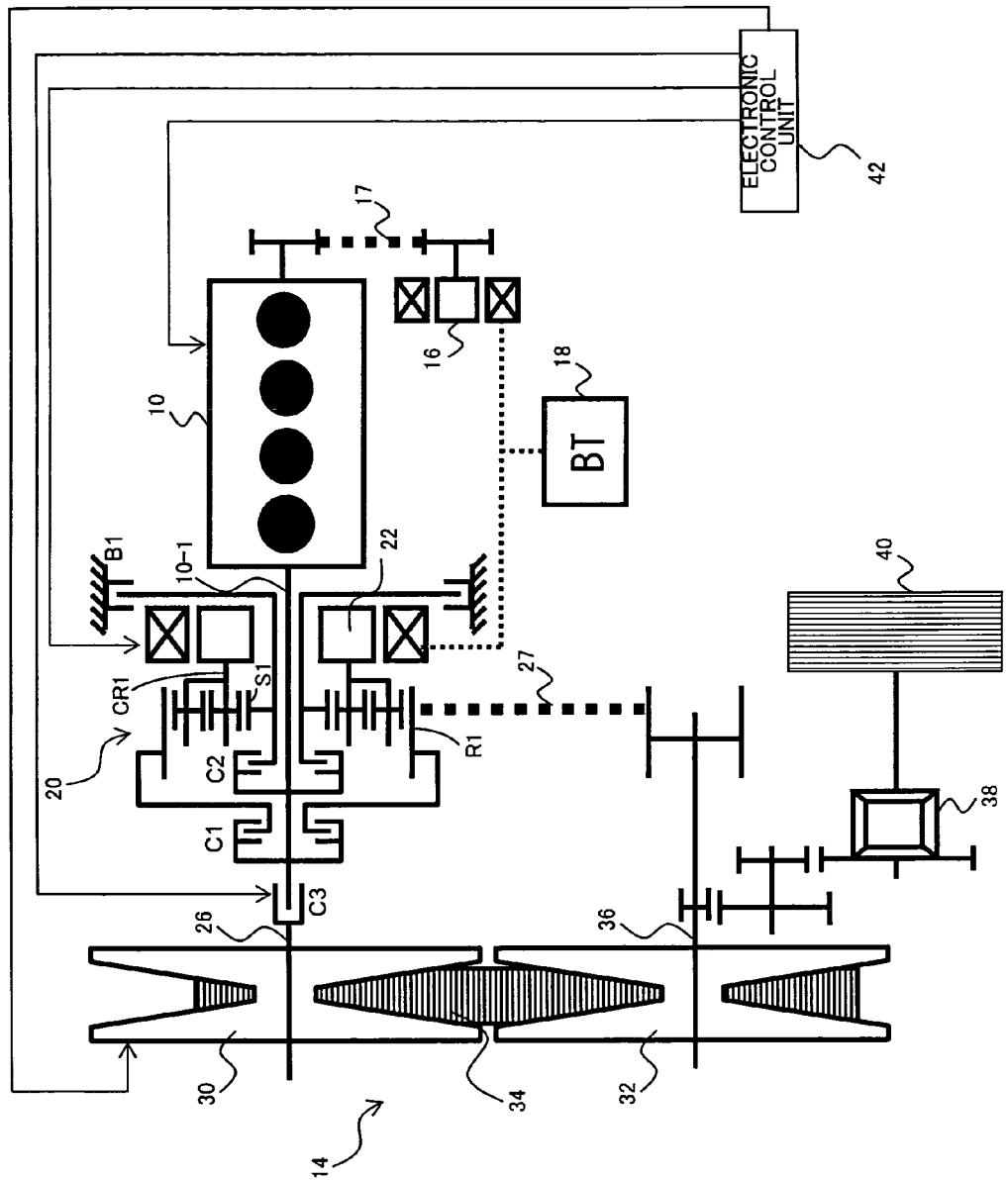
FIG. 77 is a diagram showing another general configuration of a power output system according to the fourth embodiment.

Another example configuration of the present embodiment is shown in FIG. 77. In the configuration of FIG. 77, as compared to in the system of FIG. 51, the planetary gear mechanism 50, the clutch C6, and the brake B2 are eliminated, and the planetary gear mechanism 20 (the ring gear R1) is coupled to the output shaft 36 of the speed variator 14 via the transmission device 27. This arrangement provides a second power transmission path by which power from the engine 10 can be transmitted to the driven wheel 40 via the clutch C2, the planetary gear mechanism 20, and the transmission device 27, and a third power transmission path by which power from the engine 10 can be transmitted to the driven wheel 40 via the clutch C1 and the transmission device 27 at a predetermined gear ratio. Other structures of the configuration of FIG. 77 are identical to those of the system of FIG. 51.

The engaged/released states of the clutches C1, C2, C3, and the brake B1 in respective operations of the example configuration shown in FIG. 77 can be summarized as-shown in Table 5 below. In Table 5, "O" denotes the engaged state, while blank denotes the released state. According to the configuration shown in FIG. 77, the number of transmission devices provided in parallel to the speed variator 14 can be reduced as compared to in the third embodiment. Controls of the motor generator 22 and the like performed other than the engaging/releasing control of the clutches C1, C2, C3, and the brake B1 are identical to those of the system of FIG. 51.

TABLE 5

|  | C1 | C2 | C3 | B1 |
|---|---|---|---|---|
| power distribution control |  | O | O |  |
| constant gear ratio transmission control | O | O |  |  |
| EV travel control |  |  |  | O |
| power assist control |  |  | O | O |
| move-off operation |  |  | O |  |
| reverse launch operation |  |  |  | O |

Fifth Embodiment

Figure 78:
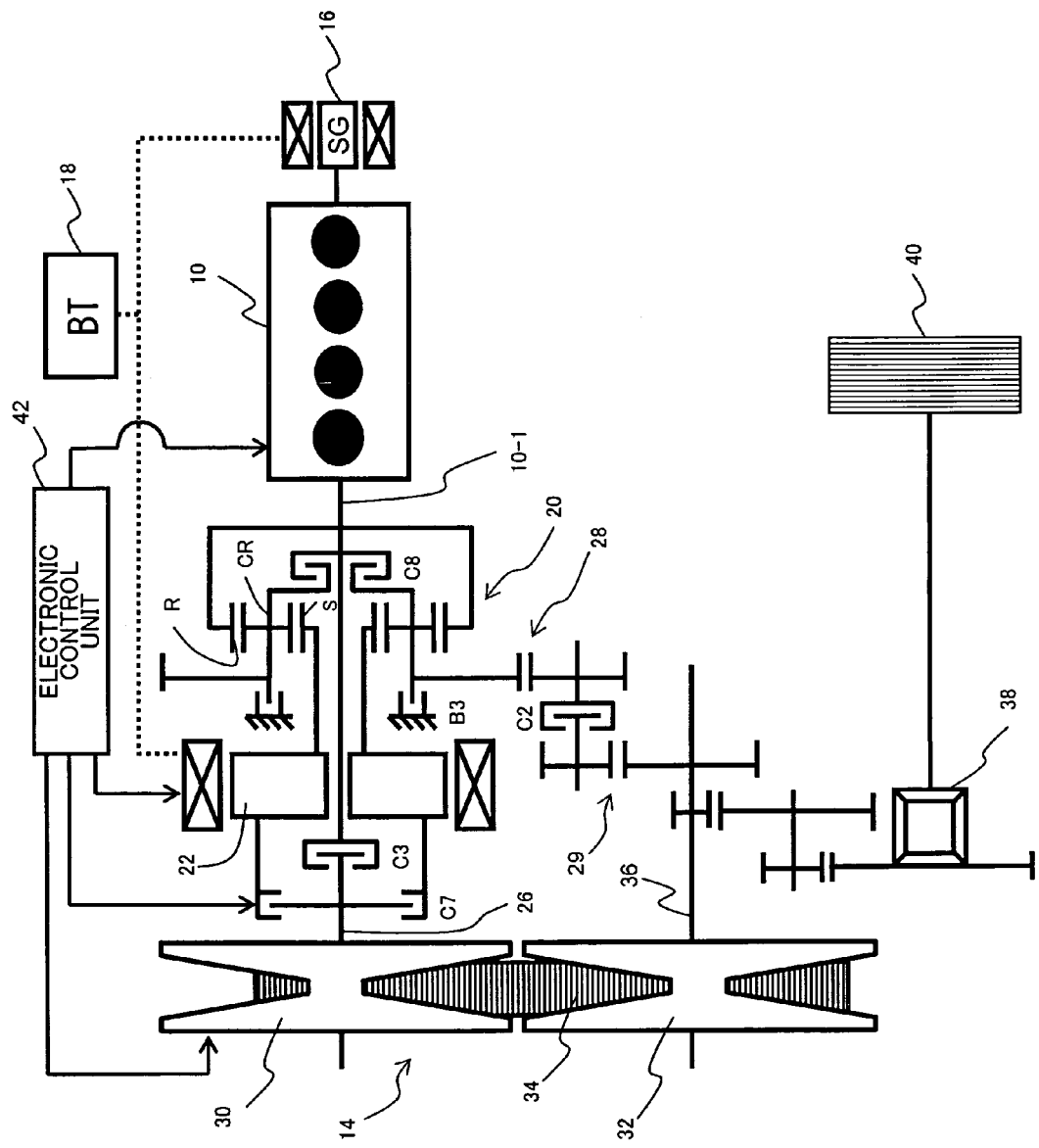
FIG. 78 is a diagram showing a general configuration of a power output system according to the fifth embodiment.

FIG. 78 is a diagram showing a general configuration of a power output system according to a fifth embodiment of the present invention. In contrast to the first embodiment, the output shaft 10-1 of the engine 10 is coupled to the ring gear R of the planetary gear mechanism 20 in the present embodiment, such that torque from the engine 10 is conveyed to the ring gear R. Further, by engaging or releasing the clutch C2, it is possible to couple or decouple between the carrier CR of the planetary gear mechanism 20 and the driven wheel 40 (the output shaft 36 of the speed variator 14). By means of this clutch C2, the coupling between the engine 10 and the driven wheel 40 via the planetary gear mechanism 20 can be effected or released. Similarly to the first embodiment, the present embodiment includes the first power transmission path by which power from the engine 10 can be transmitted to the driven wheel 40 via the clutch C3 and the speed variator 14, and a second power transmission path by which power from the engine 10 can be transmitted to the driven wheel 40 via the planetary gear mechanism 20 and the clutch C2.

Furthermore, in the present embodiment, clutches C7, C8 and brake B3 are provided. In each of the clutches C7, C8 and brake B3, the switching between the engaged state and the released (disengaged) state can be achieved by employing hydraulic or electromagnetic force, for example. The locking force of each of the clutches C7, C8 and brake B3 can be controlled by adjusting the hydraulic or electromagnetic force supplied to each of the clutches C7, C8 and brake B3.

By engaging or releasing the clutch C7, it is possible to couple or decouple between the sun gear S of the planetary gear mechanism 20 (i.e., the motor generator 22) and the input shaft 26 of the speed variator 14. By means of the clutch C7, the coupling between the sun gear S (motor generator 22) and the driven wheel 40 via the speed variator 14 can be effected or released. By engaging or releasing the clutch C8, it is possible to couple or decouple between the carrier CR and the ring gear R of the planetary gear mechanism 20. By means of the clutch C8, the sun gear S, carrier CR, and the ring gear R of the planetary gear mechanism 20 can be rotated as one piece in conjunction with the engine 10 and the motor generator 22. In other words, the clutch C8 is capable of switching the planetary gear mechanism 20 into a direct coupling state. The electronic control unit 42 can perform a control to release the coupling between the carrier CR and the driven wheel 40 via the clutch C2, switch the planetary gear mechanism 20 into the direct coupling state by engaging the clutch C8, and couple the sun gear S and the driven wheel 40 via the speed variator 14 by engaging the clutch C7, such that torque from the engine 10 can be transmitted to the driven wheel 40 while changing speed by the speed variator 14.

By engaging or releasing the brake B3, it is possible to constrain or allow rotation of the carrier CR. The planetary gear mechanism 20 is configured such that, when rotation of the carrier CR is constrained by engaging the brake B3, torque conveyed from the engine 10 to the ring gear R can be transmitted to the sun gear S while inverting the rotational direction (torque direction). The electronic control unit 42 can perform a control to release the coupling between the carrier CR and the driven wheel 40 via the clutch C2, constrain rotation of the carrier CR by engaging the brake B3, and couple the sun gear S and the driven wheel 40 via the speed variator 14 by engaging the clutch C7, such that torque from the engine 10 can be transmitted by first inverting the rotational direction by the planetary gear mechanism 20 and then conveying to the driven wheel 40 via the speed variator 14. As such, in the present embodiment, the planetary gear mechanism 20 can be made to function as a forward/reverse switching mechanism. Other structures of the present embodiment are identical to those of the first embodiment.

Operations performed by the power output system according to the present embodiment are next described. It should be noted that operations concerning which explanation will not be repeated are identical to those of the first to fourth embodiments.

When power transmission between the engine 10 and the driven wheel 40 is to be performed via both the speed variator 14 and the planetary gear mechanism 20, the electronic control unit 42 performs control so as to release the clutches C7, C8 and the brake B3, and to engage the clutches C2, C3. While in this state, the electronic control unit 42 controls the torque of the motor generator 22, and can thereby actively control distribution of power between the power conveyed to the speed variator 14 and the power conveyed to the planetary gear mechanism 20 (i.e., can execute power distribution control), as in the first embodiment.

In the present embodiment, when the ratio (the gear ratio y of the speed variator 14) between the rotational speed $\omega_{eng}$ of the engine 10 and the rotational speed $\omega_{out}$ of the output shaft 36 is equal to a predetermined ratio, the electronic control unit 42 can engage the clutch C8 (to switch the planetary gear mechanism 20 to the direct coupling state) and the clutch C2, so as to couple the engine 10 and the driven wheel 40 via the planetary gear mechanism 20 in the direct coupling state. With this coupling, the electronic control unit 42 can execute constant gear ratio transmission control for transmitting power between the engine 10 and the driven wheel 40 via the planetary gear mechanism 20 at a predetermined gear ratio. During execution of the constant gear ratio transmission control, the electronic control unit 42 can assist drive of the vehicle using power of the motor generator by controlling the torque $T_{mg}$ of the motor generator 22. The gear ratio γ at which both the clutches C2 and C8 become engageable can be set for example by the gear ratios of transmission devices (counter gears 28, 29) provided between the planetary gear mechanism 20 (the carrier CR) and the output shaft 36 of the speed variator 14.

When carrying out a move-off operation in which the vehicle in a stopped state is driven forward (i.e., in which the driven wheel 40 in a stopped state is driven in the forward rotational direction), the electronic control unit 42 performs control so as to release the clutches C2, C3, C8 and the brake B3 and engage the clutch C7. In other words, the electronic control unit 42 performs control to couple the motor generator 22 to the input shaft 26 of the speed variator 14 and to couple the motor generator 22 to the driven wheel 40 via the speed variator 14. While in this state, the electronic control unit 42 performs a first forward drive control by which torque of the motor generator 22 is controlled to apply torque to the driven wheel 40 in the forward rotational direction, thereby causing the vehicle move-off operation in the forward direction. After performing this vehicle move-off operation, the electronic control unit 42 can execute EV travel control by controlling power transmitted between the motor generator 22 and the driven wheel 40, so as to achieve EV travel. According to the present embodiment, because power of the motor generator 22 can be transmitted to the driven wheel 40 while changing (reducing) speed using the speed variator 14, it is possible to increase torque of the driven wheel 40 during a move-off operation and when performing EV travel.

According to the present embodiment, when carrying out a move-off operation for driving the vehicle in the forward direction, not only the torque of the motor generator 22 but also the torque of the engine 10 may be employed. In this case, the electronic control unit 42 performs control so as to release the clutches C2, C3 and the brake B3 and engage the clutch C8 while the engine 10 is rotationally activated. In other words, the electronic control unit 42 performs control to release the coupling between the carrier CR and the driven wheel 40 via the clutch C2, and to switch the planetary gear mechanism 20 into the direct coupling state so as to cause the sun gear S, carrier CR, and the ring gear R to be rotated as one piece in conjunction with the engine 10 and the motor generator 22. While in this state, the electronic control unit 42 performs a second forward drive control in which the locking force of the clutch C7 is gradually increased so as to couple the sun gear S and the driven wheel 40 via the speed variator 14 such that torque of the engine 10 is transmitted to the driven wheel 40 via the speed variator 14, and in which torque of the motor generator 22 is controlled so as to apply torque to the driven wheel 40 in the forward rotational direction. In this manner, both the torque of the engine 10 and the torque of the motor generator 22 can be employed for causing the vehicle move-off operation in the forward direction. After performing this vehicle move-off operation, the electronic control unit 42 can execute power assist control by controlling power transmitted between the motor generator 22 and the driven wheel 40, so as to assist vehicle drive with power of the motor generator 22 while driving the vehicle by means of power of the engine 10. In this case, since power of both the engine 10 and the motor generator 22 can be transmitted to the driven wheel 40 while changing (reducing) speed using the speed variator 14, it is possible to increase torque of the driven wheel 40 during the move-off operation and when performing the assist operation.

Figure 79:
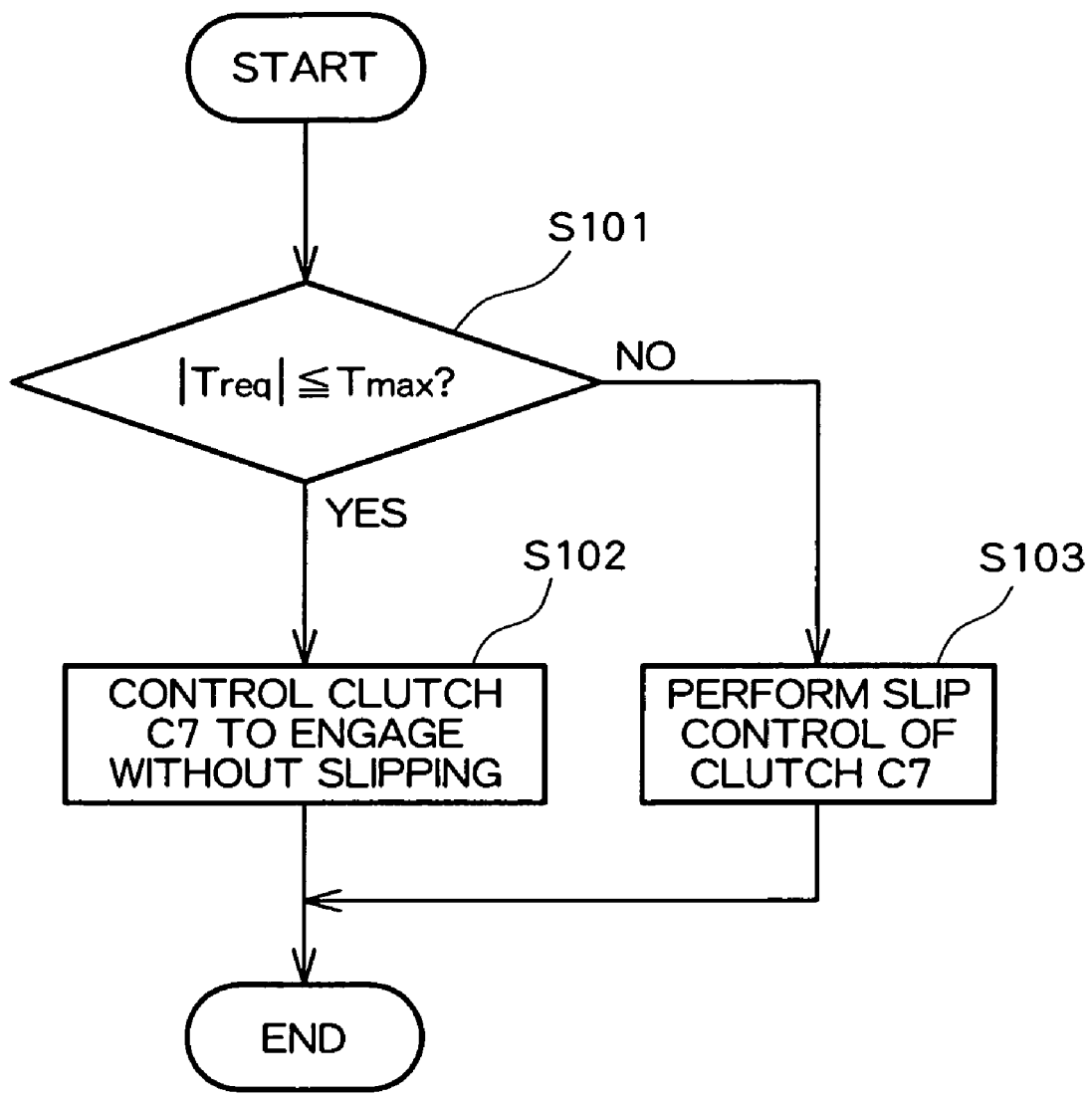
FIG. 79 is a flowchart explaining an example processing carried out when performing a moveoff operation.

A specific preferred example of a procedure performed by the electronic control unit 42 when carrying out a move-off operation is next described referring to the flowchart of FIG. 79. The steps in the flowchart of FIG. 79 are performed every time a move-off operation is carried out.

In step S101, the electronic control unit 42 determines whether or not the absolute value of the requested torque Treq at the input shaft 26 of the speed variator 14 (i.e., the desired input torque into the speed variator 14) is less than or equal to a set value Tmax (where Tmax>0). The requested torque Treq may be determined based on the throttle opening degree and vehicle velocity (or rotational speed of the driven wheel 40) detected by means of sensors not shown, for example. The set value Tmax may be set to the maximum value of torque that can be output by the motor generator 22, which can be determined based on the state of charge (SOC) of the battery 18, for example. When the absolute value of the requested torque Treq is less than or equal to the set value Tmax (i.e., when the determination result in step S101 is YES), the procedure proceeds to step S102. On the other hand, when the requested torque Treq is greater than the set value Tmax (i.e., when the determination result in step S101 is NO), the procedure proceeds to step S103.

In step S102, the electronic control unit 42 judges that it is possible to perform the move-off operation using torque of the motor generator 22 alone, and selects to execute the above-described first forward drive control to carry out the move-off operation. More specifically, the electronic control unit 42 performs control so as to release the clutches C2, C3, C8 and the brake B3. In addition, the electronic control unit 42 places the clutch C7 in the engaged state without allowing the clutch C7 to slip. While in this state, control of torque of the motor generator 22 is performed to apply torque to the driven wheel 40 in the forward rotational direction. As a result, the move-off operation is carried out using torque of the motor generator 22 alone, without using torque of the engine 10.

On the other hand, in step S103, the electronic control unit 42 judges that it is difficult to perform the move-off operation using torque of the motor generator 22 alone, and selects to execute the above-described second forward drive control to carry out the move-off operation. More specifically, the electronic control unit 42 performs control so as to release the clutches C2, C3 and the brake B3 and engage the clutch C8. While in this state, the electronic control unit 42 gradually increases the locking force of the clutch C7 while performing slip control of the clutch C7 such that torque of the engine 10 is transmitted to the driven wheel 40 via the speed generator 14, and controls torque of the motor generator 22 so as to apply torque to the driven wheel 40 in the forward rotational direction. As a result, the move-off operation is carried out using both the torque of the engine 10 and the torque of the motor generator 22. In this manner, when performing a move-off operation in the present embodiment, either one of the first or the second forward drive control can be selectively executed in accordance with the requested torque Treq at the input shaft 26 of the speed variator 14. In the flowchart of FIG. 79, instead of determining and employing the requested torque Treq at the input shaft 26 of the speed variator 14, requested torque at the driven wheel 40 may alternatively be determined and employed. The requested torque at the driven wheel 40 can be similarly determined based on the throttle opening degree and vehicle velocity, for example.

When carrying out a reverse move-off operation in which the vehicle in a stopped state is driven in reverse direction (i.e., in which the driven wheel 40 in a stopped state is driven in the reverse rotational direction), the electronic control unit 42 performs control so as to release the clutches C2, C3, C8 and the brake B3 and engage the clutch C7. While in this state, the electronic control unit 42 performs a first reverse drive control by which torque of the motor generator 22 is controlled to apply torque to the driven wheel 40 in the reverse rotational direction, thereby causing the vehicle move-off operation in the reverse direction. After performing this vehicle reverse move-off operation, the electronic control unit 42 can execute EV travel control by controlling power transmitted between the motor generator 22 and the driven wheel 40, so as to achieve EV travel. According to the present embodiment, because power of the motor generator 22 can be transmitted to the driven wheel 40 while changing (reducing)

speed using the speed variator 14, it is possible to increase torque of the driven wheel 40 during a reverse move-off operation and when performing EV travel.

According to the present embodiment, when carrying out a reverse move-off operation, not only the torque of the motor generator 22 but also the torque of the engine 10 may be employed. In this case, the electronic control unit 42 performs control so as to release the clutches C2, C3, and C8 and engage the brake B3 while the engine 10 is rotationally activated. In other words, the electronic control unit 42 performs control to release the coupling between the carrier CR and the driven wheel 40 via the clutch C2, and to constrain rotation of the carrier CR. While in this state, the electronic control unit 42 performs a second reverse drive control in which the locking force of the clutch C7 is gradually increased so as to couple the sun gear S and the driven wheel 40 via the speed variator 14 such that torque of the engine 10 is transmitted to the driven wheel 40 after the rotational direction (torque direction) is inverted by the planetary gear mechanism 20, and in which torque of the motor generator 22 is controlled so as to apply torque to the driven wheel 40 in the reverse rotational direction. In this manner, both the torque of the engine 10 and the torque of the motor generator 22 can be employed for causing the vehicle move-off operation in the reverse direction. After performing this vehicle reverse move-off operation, the electronic control unit 42 can execute power assist control by controlling power transmitted between the motor generator 22 and the driven wheel 40, so as to assist vehicle reverse travel with power of the motor generator 22 while performing vehicle reverse launch operation by means of power of the engine 10. In this case, because power of both the engine 10 and the motor generator 22 can be transmitted to the driven wheel 40 while changing (reducing) speed using the speed variator 14, it is possible to increase torque of the driven wheel 40 during the reverse move-off operation and when performing the assist operation. It should be noted that a reverse launch operation can be performed by means of power of the engine 10 alone when in a state in which the clutches C2, C3, C8 are released and the clutch C7 and brake B3 are engaged.

As described above, in the present embodiment, both the move-off operation and the reverse move-off operation can be carried out by engaging the clutch C7. In other words, according to the present embodiment, a configuration is provided wherein the clutch to be engaged is the same clutch in both a move-off operation and a reverse move-off operation. As such, the control method for engaging the clutch C7 can be standardized for both cases of performing a move-off operation and a reverse move-off operation. Accordingly, the procedure shown in the flowchart of FIG. 79 can be employed as a specific preferred example procedure performed by the electronic control unit 42 when carrying out a reverse move-off operation.

More specifically, when the absolute value of the requested torque Treq at the input shaft 26 of the speed variator 14 (i.e., the desired input torque into the speed variator 14) is less than or equal to the set value Tmax, the electronic control unit 42 selects to execute the above-described first reverse drive control. Specifically, the electronic control unit 42 performs control so as to release the clutches C2, C3, C8 and the brake B3. In addition, the electronic control unit 42 places the clutch C7 in the engaged state without allowing the clutch C7 to slip. While in this state, control of torque of the motor generator 22 is performed to apply torque to the driven wheel 40 in the reverse rotational direction. As a result, the reverse move-off operation is carried out using torque of the motor generator 22 alone, without using torque of the engine 10.

On the other hand, when the absolute value of the requested torque Treq at the input shaft 26 of the speed variator 14 is greater than the set value Tmax, the electronic control unit 42 selects to execute the above-described second reverse drive control. Specifically, the electronic control unit 42 performs control so as to release the clutches C2, C3, C8 and engage the brake B3. While in this state, the electronic control unit 42 gradually increases the locking force of the clutch C7 while performing slip control of the clutch C7 such that torque of the engine 10 is transmitted to the driven wheel 40 after the rotational direction is inverted by the planetary gear mechanism 20, and controls torque of the motor generator 22 so as to apply torque to the driven wheel 40 in the reverse rotational direction. As a result, the reverse move-off operation is carried out using both the torque of the engine 10 and the torque of the motor generator 22. In this manner, when performing the reverse move-off operation in the present embodiment, either one of the first or the second reverse drive control can be selectively executed in accordance with the requested torque Treq at the input shaft 26 of the speed variator 14. Instead of determining and employing the requested torque Treq at the input shaft 26 of the speed variator 14, requested torque at the driven wheel 40 may alternatively be determined and employed.

According to the present embodiment, a move-off operation employing both the torque of the motor generator 22 and the torque of the engine 10 can also be carried out by engaging the clutch C3. In this case, the electronic control unit 42 performs control so as to release the clutches C2, C8 and the brake B3 and engage the clutch C7 while the engine 10 is rotationally activated. While in this state, the electronic control unit 42 gradually increases the locking force of the clutch C3 to couple the engine 10 and the driven wheel 40 via the speed generator 14 such that torque of the engine 10 is transmitted to the driven wheel 40 via the speed generator 14, and controls torque of the motor generator 22 so as to apply torque to the driven wheel 40 in the forward rotational direction. As a result, a vehicle move-off operation in the forward direction can be carried out. After performing the vehicle move-off operation, the electronic control unit 42 can execute power assist control by controlling power transmitted between the motor generator 22 and the driven wheel 40, so as to assist vehicle drive with power of the motor generator 22 while driving the vehicle by means of power of the engine 10. In this case, similarly as in the above-described case, because power of both the engine 10 and the motor generator 22 can be transmitted to the driven wheel 40 while changing (reducing) speed using the speed variator 14, it is possible to increase torque of the driven wheel 40 during the move off operation and when performing the assist operation.

Further, according to the present embodiment, it is also possible to perform an engine start operation in which the engine 10 in a shutdown state is started by means of power of the motor generator 22. When performing this engine start operation, the electronic control unit 42 performs control so as to release the clutches C2, C3, C7, and the brake B3, and engage the clutch C8 so as to switch the planetary gear mechanism 20 into the direct coupling state. While in this state, the electronic control unit 42 causes powering operation of the motor generator 22 so as to transmit power of the motor generator 22 to the engine 10, thereby achieving cranking of the engine 10. As a result, the engine 10 can be started.

The engaged/released states of the clutches C2, C3, C7, C8, and the brake B3 in above-described respective operations of the present embodiment can be summarized as shown in Table 6 below. In Table 6, "O" denotes the engaged state, while blank denotes the released state. In addition, Δ→O denotes a state in which a clutch is gradually engaged while performing a slip control of the clutch.

TABLE 6

|  | C2 | C3 | C7 | C8 | B3 |
|---|---|---|---|---|---|
| power distribution control | ○ | ○ |  |  |  |
| constant gear ratio transmission control | ○ |  |  | ○ |  |
| move-off operation (using torque of the motor generator alone) |  |  | ○ |  |  |
| move-off operation (using torque of the motor generator and the engine) |  |  | Δ→○ | ○ |  |
| move-off operation (second example using torque of the motor generator and the engine) |  | Δ→○ | ○ |  |  |
| reverse move-off operation (using torque of the motor generator alone) |  |  |  | ○ |  |
| reverse move-off operation (using torque of the motor generator and the engine) |  |  | Δ→○ |  | ○ |
| engine start operation |  |  |  | ○ |  |

In order to increase torque of the driven wheel 40 during a reverse move-off operation and a reverse launch operation, it is preferable to provide a forward/reverse switching mechanism (planetary gear mechanism) capable of inverting torque direction, and to transmit the torque of the engine 10 to the driven wheel 40 via the speed variator (CVT) 14 after inverting the direction of the torque by means of the forward/reverse switching mechanism. However, if a forward/reverse switching mechanism is provided separately from the planetary gear mechanism 20 for adjusting power distribution between the first and the second power transmission paths, the system configuration becomes complex, resulting in degraded system mountability onto a vehicle. In contrast, according to the present embodiment, the planetary gear mechanism 20 for power distribution adjustment has the function of the forward/reverse switching mechanism. In other words, a mechanism for power distribution adjustment and a forward/reverse switching mechanism are integrated into one structure of planetary gear mechanism 20 according to the present embodiment. Accordingly, while achieving an increase in torque of the driven wheel 40 during a reverse move-off operation and a reverse launch operation, the present embodiment also accomplishes simplification of the system configuration and enhancement in the system mountability onto a vehicle.

Further, while torque of the motor generator 22 can be employed to perform a move-off operation in the forward direction and a reverse move-off operation in the reverse direction according to the-present embodiment, when the SOC of the battery 18 is low and when the absolute value of the requested torque Treq at the input shaft 26 of the speed variator 14 exceeds the value of torque that can be output by the motor generator 22, it is necessary to employ torque of the engine 10 in addition to the torque of the motor generator 22 for performing the move-off operation and the reverse move-off operation. According to the present embodiment, it is possible to employ torque of the engine 10 for carrying out the move-off operation and the reverse move-off operation by operating the clutch C7 (or the clutch C3) as a start clutch. Accordingly, while achieving an increase in torque of the driven wheel 40 during the move-off operation and the reverse move-off operation, the present embodiment also eliminates the need to provide a move-off device such as a torque converter. Further, because the clutch C7 can be employed as a start clutch during both the move-off operation and the reverse move-off operation, the same start clutch can be shared for the move-off operation and the reverse move-off operation, such that the control method for engaging the start clutch (clutch C7) can be standardized. As a result, control logic can be simplified, thereby enabling downsizing of the electronic control unit 42 and facilitating maintenance.

Furthermore, by engaging the clutch C8 in the present embodiment, the engine 10 can be started using power of the motor generator 22 having a large capacity for achieving drive of the vehicle. Because power of the motor generator 22 can be used to start the engine 10 under a condition such as cold weather in which starting of the engine 10 is difficult, the capacity of the starter generator 16 can be reduced according to the present embodiment.

Other example configurations of the present embodiment are described below.

Figure 80:
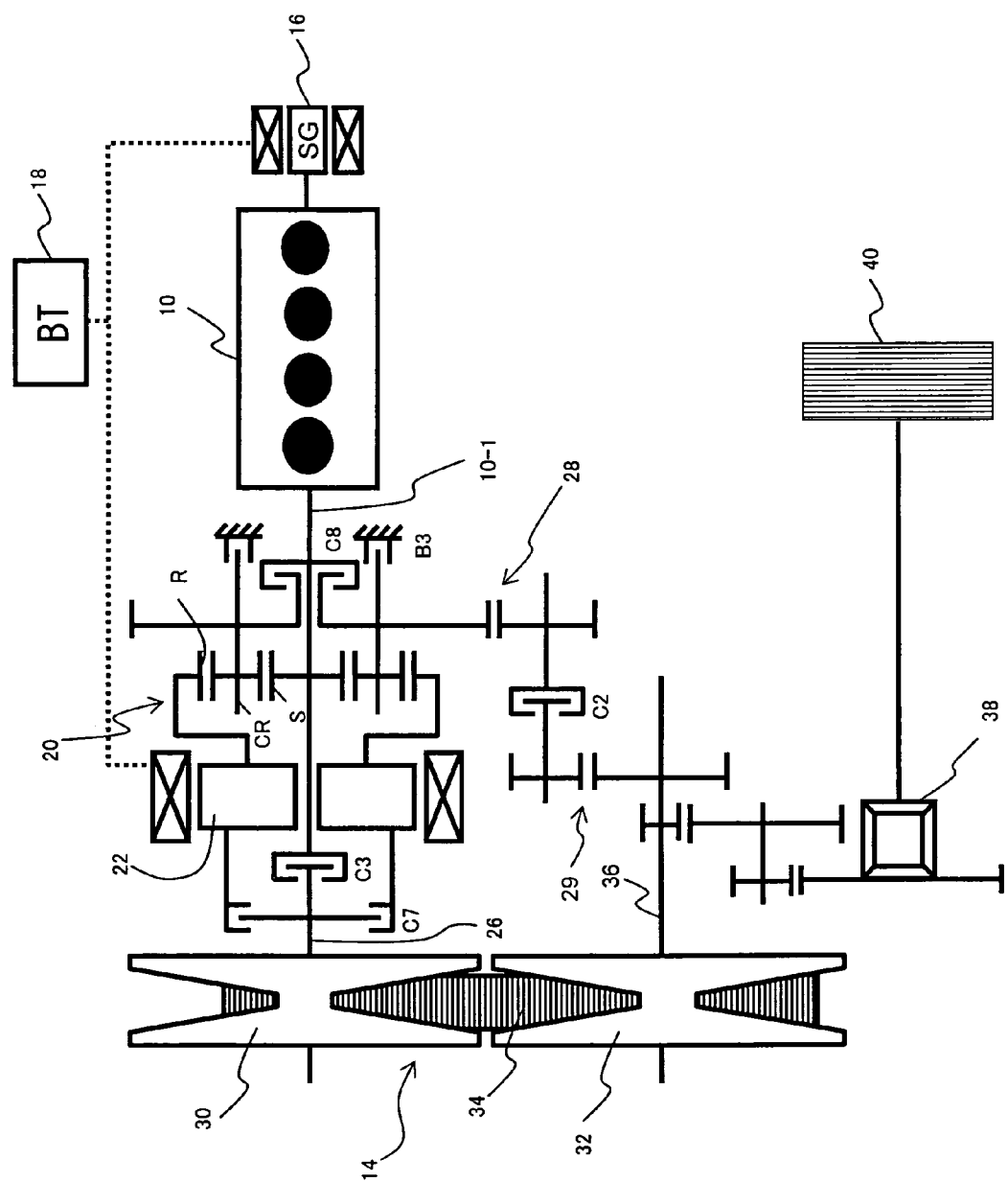
FIG. 80 is a diagram showing another general configuration of a power output system according to the fifth embodiment.

The example of FIG. 80 is configured such that, in contrast to the configuration shown in FIG. 78, the output shaft 10-1 of the engine 10 is coupled to the sun gear S of the planetary gear mechanism 20, and the motor generator 22 is coupled to the ring gear R of the planetary gear mechanism 20. By engaging or releasing the clutch C8, it is possible to couple or decouple between the carrier CR and the sun gear S of the planetary gear mechanism 20. The planetary gear mechanism 20 can be switched into the direct coupling state by engaging the clutch C8.

Figure 81:
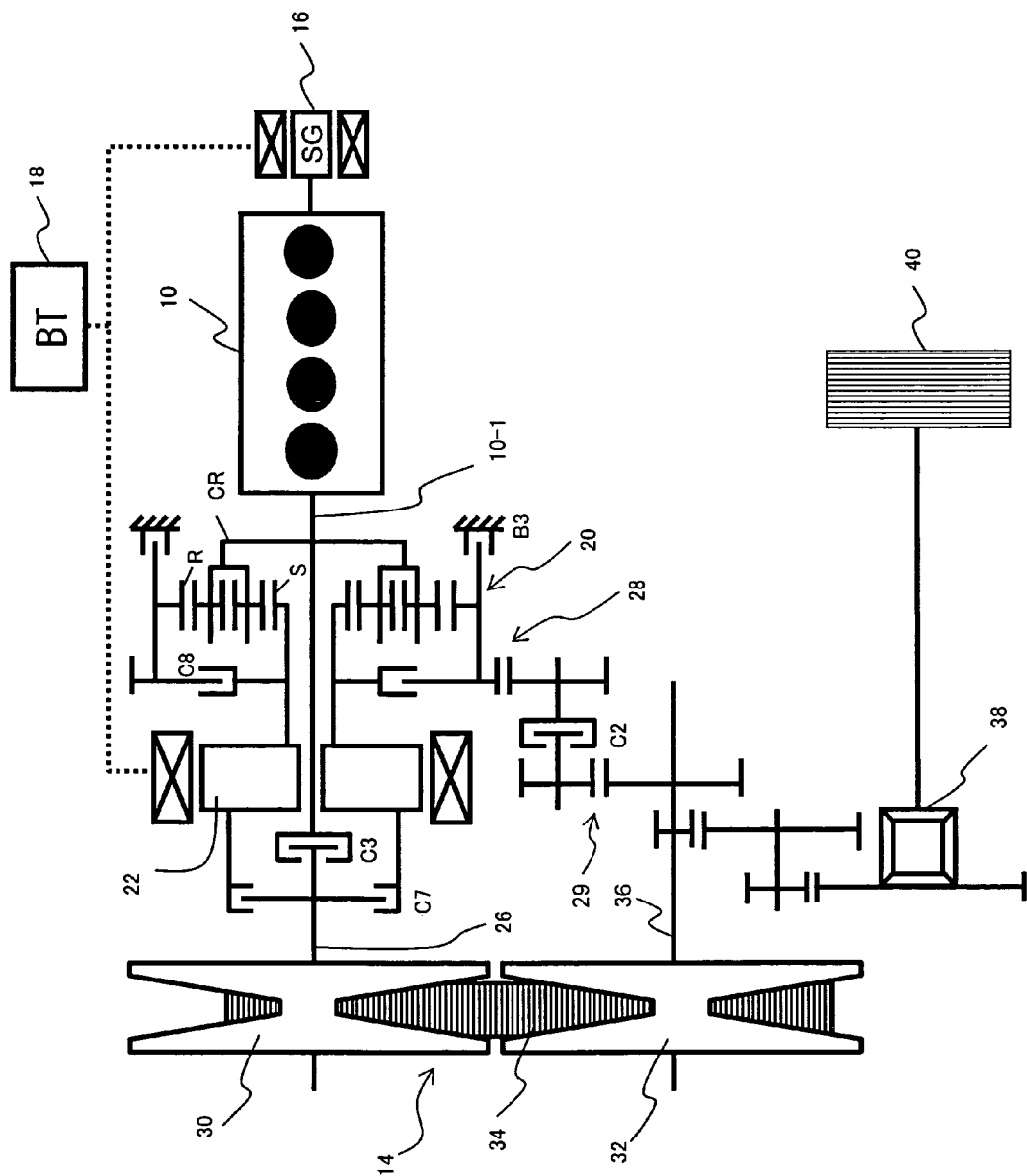
FIG. 81 is a diagram showing a further general configuration of a power output system according to the fifth embodiment.

The example of FIG. 81 is configured such that, in contrast to the configuration shown in FIG. 78, the planetary gear mechanism 20 is composed with a double-pinion planetary gearset, and the output shaft 10-1 of the engine 10 is coupled to the carrier CR of the planetary gear mechanism 20. By engaging or releasing the clutch C2, it is possible to couple or decouple between the ring gear R of the planetary gear mechanism 20 and the driven wheel 40. By engaging or releasing the clutch C8, it is possible to couple or decouple between the sun gear S and the ring gear R of the planetary gear mechanism 20. The planetary gear mechanism 20 can be switched into the direct coupling state by engaging the clutch C8. By engaging or releasing the brake B3, it is possible to constrain or allow rotation of the ring gear R.

Figure 82:
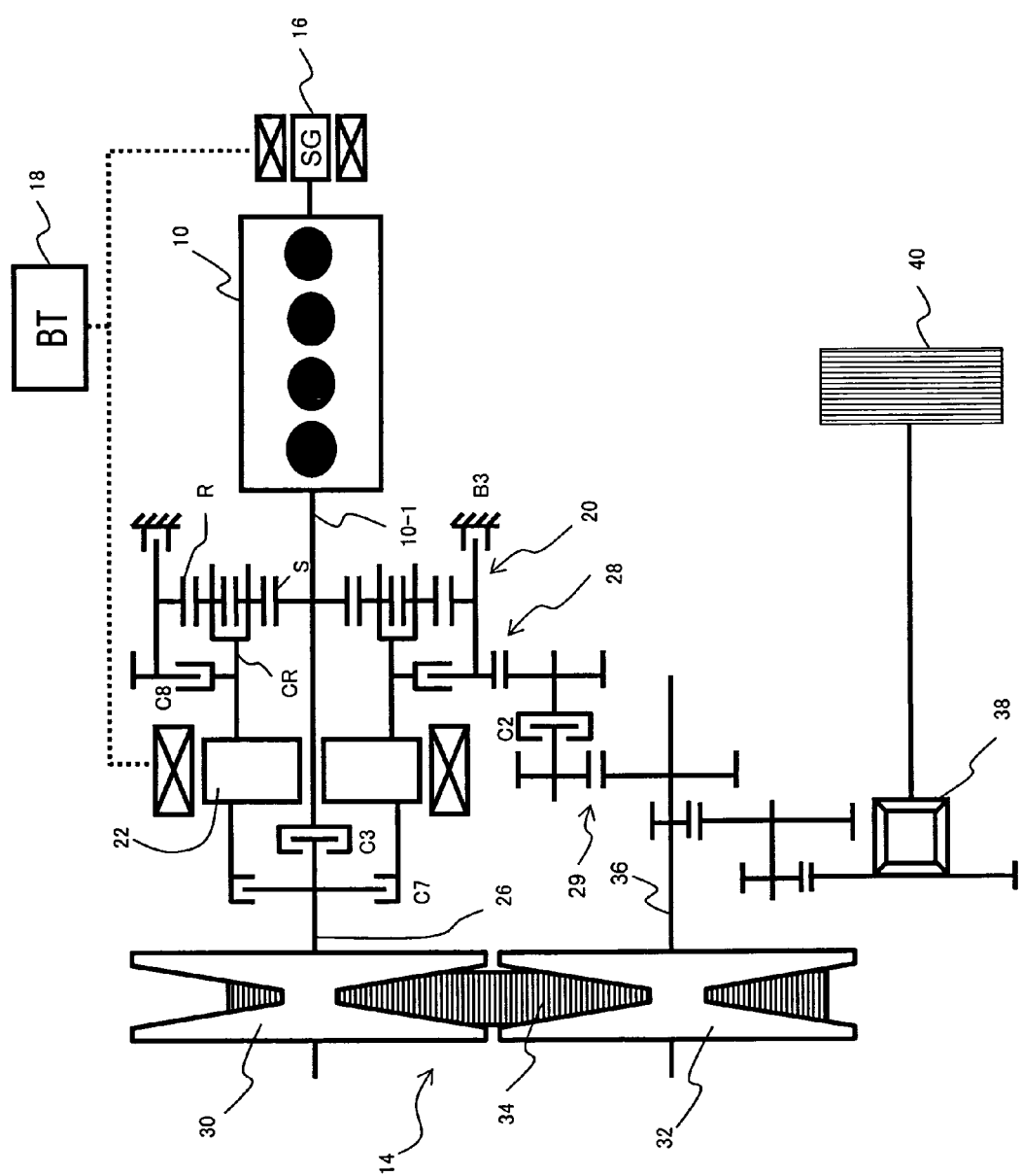
FIG. 82 is a diagram showing a still further general configuration of a power output system according to the fifth embodiment.

The example of FIG. 82 is configured such that, in contrast to the configuration shown in FIG. 81, the output shaft 10-1 of the engine 10 is coupled to the sun gear S of the planetary gear mechanism 20, and the motor generator 22 is coupled to the carrier CR of the planetary gear mechanism 20. By engaging or releasing the clutch C8, it is possible to couple or decouple between the carrier CR and the ring gear R of the planetary gear mechanism 20. The planetary gear mechanism 20 can be switched into the direct coupling state by engaging the clutch C8. It should be noted that operations of the example configurations shown in FIGS. 80-82 are identical to those of the system of FIG. 78.

Sixth Embodiment

Figure 83:
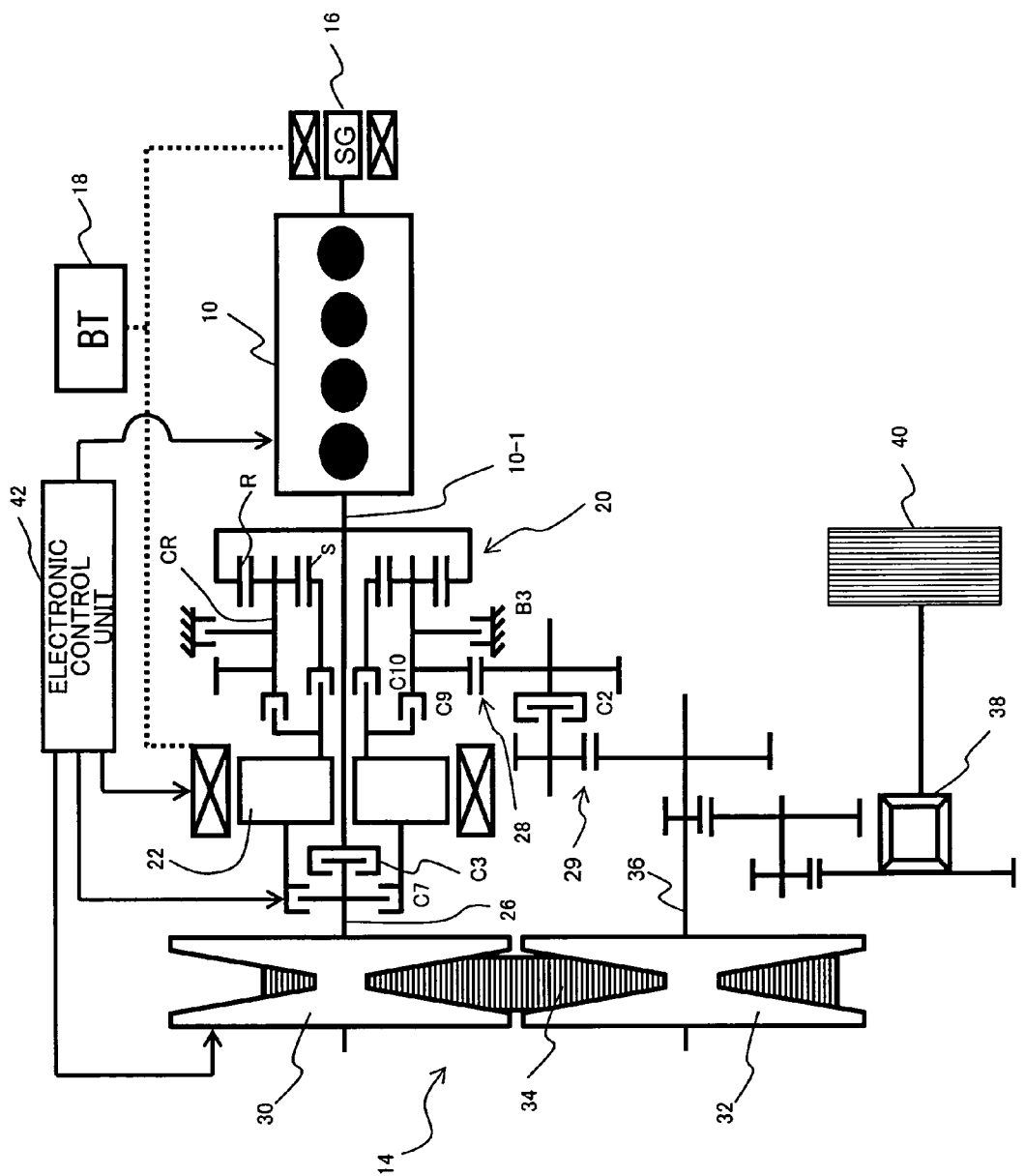
FIG. 83 is a diagram showing a general configuration of a power output system according to the sixth embodiment.

FIG. 83 is a diagram showing a general configuration of a power output system according to a sixth embodiment of the present invention. In contrast to the example configuration of the fifth embodiment shown in FIG. 78, the present embodiment includes clutches C9 and C10 in place of the clutch C8. By engaging or releasing (disengaging) the clutch C9, it is possible to couple or decouple between the motor generator 22 and the carrier CR of the planetary gear mechanism 20. Further, by engaging or releasing (disengaging) the clutch C10, it is possible to couple or decouple between the motor generator 22 and the sun gear S of the planetary gear mechanism 20. By engaging the clutch C10, torque of the motor generator 22 can be transmitted to the sun gear S. In each of the clutches C9 and C10, the switching between the engaged state and the released state can be achieved by employing hydraulic or electromagnetic force, for example. The locking force of each of the clutches C9 and C10 can be controlled by adjusting the hydraulic or electromagnetic force supplied to each of the clutches C9 and C10.

According to the present embodiment, by means of the clutches C2, C7, and C9, it is possible to selectively couple the motor generator 22 to the input shaft 26 (the input side) of the speed variator 14 or to the output shaft 36 (the output side) of the speed variator 14. More specifically, by engaging the clutch C7 and releasing the clutch C2, the state in which the motor generator 22 is coupled to the input shaft 26 of the speed variator 14 can be selected, so as to perform power transmission between the motor generator 22 and the driven wheel 40 via the speed variator. On the other hand, by engaging the clutches C2, C9 and releasing the clutch C7, the state in which the motor generator 22 is coupled to the output shaft 36 of the speed variator 14 can be selected, so as to perform power transmission between the motor generator 22 and the driven wheel 40 without employing the speed variator 14. Further, by engaging both the clutches C9, C10 in the present embodiment, it is possible to cause the sun gear S, carrier CR, and the ring gear R to be rotated as one piece in conjunction with the engine 10 and the motor generator 22 (i.e., to switch the planetary gear mechanism 20 into the direct coupling state). Other structures of the present embodiment are identical to those of the fifth embodiment.

Operations performed by the power output system according to the present embodiment are next described. It should be noted that operations concerning which explanation will not be repeated are identical to those of the first to fifth embodiments.

When power transmission between the engine 10 and the driven wheel 40 is to be performed via both the speed variator 14 and the planetary gear mechanism 20, the electronic control unit 42 performs control so as to release the clutches C7, C9 and the brake B3, and to engage the clutches C2, C3, C10. While in this state, the electronic control unit 42 controls the torque of the motor generator 22, and can thereby actively control distribution of power between the power conveyed to the speed variator 14 and the power conveyed to the planetary gear mechanism 20 (i.e., can execute power distribution control), as in the first embodiment.

In the present embodiment, when the ratio (the gear ratio γ of the speed variator 14) between the rotational speed $\omega_{eng}$ of the engine 10 and the rotational speed $\omega_{out}$ of the output shaft 36 is equal to a predetermined ratio, the electronic control unit 42 can engage the clutches C9, C10 (to switch the planetary gear mechanism 20 to the direct coupling state) and the clutch C2, so as to couple the engine 10 and the driven wheel 40 via the planetary gear mechanism 20 in the direct coupling state. With this coupling, the electronic control unit 42 can execute constant gear ratio transmission control for transmitting power between the engine 10 and the driven wheel 40 via the planetary gear mechanism 20 at a predetermined gear ratio.

According to the present embodiment, the electronic control unit 42 can execute input side power control for controlling power transmitted between the motor generator 22 and the driven wheel 40 via the speed variator 14 while in a state in which the motor generator 22 is coupled to the input shaft 26 of the speed variator 14. When executing the input side power control, the electronic control unit 42 engages the clutch C7 and releases the clutch C2, so as to select the state in which the motor generator 22 is coupled to the input shaft 26 of the speed variator 14. While in this state, it is possible to perform EV travel operation by releasing the clutches C3, C9, C10 and the brake B3, or assist vehicle drive with power of the motor generator 22 while driving the vehicle using power of the engine 10 by releasing the clutches C9, C10 and the brake B3 and engaging the clutch C3. Furthermore, in the present state, it is alternatively possible to assist vehicle drive with power of the motor generator 22 while driving the vehicle using power of the engine 10 by releasing the clutch C3 and the brake B3 and engaging the clutches C9, C10.

Further, according to the present embodiment, the electronic control unit 42 can execute output side power control for controlling power transmitted between the motor generator 22 and the driven wheel 40 without employing the speed variator 14 while in a state in which the motor generator 22 is coupled to the output shaft 36 of the speed variator 14. When performing the output side power control, the electronic control unit 42 engages the clutches C2, C9 and releases the clutch C7, so as to select the state in which the motor generator 22 is coupled to the output shaft 36 of the speed variator 14. While in this state, it is possible to perform EV travel operation by releasing the clutches C3, C10 and the brake B3, or assist vehicle drive with power of the motor generator 22 while driving the vehicle using power of the engine 10 by releasing the clutch C10 and the brake B3 and engaging the clutch C3.

As described above, according to the present embodiment, either one of the input side power control or the output side power control can be selectively executed. Specific preferred details according to which the electronic control unit 42 selects the input side power control or the output side power control are next described.

When the motor generator 22 is coupled to the input shaft 26 of the speed variator 14, power of the motor generator 22 can be transmitted to the driven wheel 40 while the speed is reduced (changed) by the speed variator 14, making it possible to increase torque of the driven wheel 40. As a result, the maximum torque of the motor generator 22 can be set to a small value, such that downsizing of the motor generator 22 can be achieved. Further, by controlling the gear ratio γ of the speed variator 14, it is possible to set the operation state (rotational speed $\omega_{mg}$ and torque $T_{mg}$) of the motor generator 22 so as to attain a high efficiency state of the motor generator 22. However, in this case, since power transmission is performed via the speed variator (CVT) 14, power transmission efficiency decreases by an amount of power loss generated in the speed variator 14. For example, when a portion of power of the driven wheel 40 is to be converted into generated electricity and recovered into the battery 18 by the regenerating operation of the motor generator 22, the regeneration efficiency decreases because power transmission from the driven wheel 40 to the motor generator 22 is performed via the speed variator 14.

On the other hand, when the motor generator 22 is coupled to the output shaft 36 of the speed variator 14, power transmission between the motor generator 22 and the driven wheel 40 can be performed without employing the speed variator 14, making it possible to enhance power transmission efficiency. For example, when a portion of power of the driven wheel 40 is to be recovered into the battery 18 by the regenerating operation of the motor generator 22, the regeneration efficiency can be increased because power transmission from the driven wheel 40 to the motor generator 22 is performed without employing the speed variator 14. However, because the gear ratio between the motor generator 22 and the driven wheel 40 is fixed in this case, it would be necessary to set the maximum torque of the motor generator 22 to a large value in order to increase the torque of the driven wheel 40, which may result in upsizing of the motor generator 22. Furthermore, the operation state of the motor generator 22 would tend to be deviated from a high efficiency state.

Accordingly, the electronic control unit 42 selects to execute the input side power control during the powering operation of the motor generator 22, that is, when transmitting power from the motor generator 22 to the driven wheel 40. On the other hand, the electronic control unit 42 selects to execute the output side power control during the regenerating operation of the motor generator 22, that is, when transmitting power from the driven wheel 40 to the motor generator 22. By selecting in this manner, torque of the driven wheel 40 can be increased during the powering operation of the motor generator 22, such that the maximum torque of the motor generator 22 can be set to a small value, enabling downsizing of the motor generator 22. In addition, regeneration efficiency during the regenerating operation of the motor generator 22 can be enhanced. It should be noted that the electronic control unit 42 may determine the direction of power transmission between the motor generator 22 and the driven wheel 40 based on, for example, at least one of the throttle opening degree, brake operation amount, and motor generator current, which may be detected by sensors not shown.

Moreover, the electronic control unit 42 may determine the requested torque Twr at the driven wheel 40 based on the throttle opening degree and vehicle velocity, for example, and select which of the input side power control or the output side power control to execute in accordance with the determined requested torque Twr at the driven wheel 40. More specifically, the electronic control unit 42 selects to execute the input side power control when the requested torque Twr at the driven wheel 40 is greater than a threshold value Tw0 (where Tw0>0, assuming that a positive value denotes forward rotation of the driven wheel 40). As a result, torque of the driven wheel 40 can be increased without upsizing the motor generator 22. On the other hand, the electronic control unit 42 selects to execute the output side power control when the requested torque Twr at the driven wheel 40 is less than or equal to the threshold value Tw0, thereby accomplishing an increase in power transmission efficiency when the requested torque Twr at the driven wheel 40 is small.

Still further, the electronic control unit 42 may estimate the efficiency ηin of the motor generator 22 attained by the input side power control and the efficiency ηout of the motor generator 22 attained by the output side power control, and select which of the input side power control or the output side power control to execute by comparing the estimated efficiency values ηin and ηout of the motor generator 22. Efficiency of the motor generator 22 can be calculated from the operation state (rotational speed $\omega_{mg}$ and torque $T_{mg}$) of the motor generator 22. Accordingly, the efficiency ηin of the motor generator 22 attained by the input side power control can be calculated based on, for example, the requested torque Twr of the driven wheel 40, the output shaft rotational speed $\omega_{out}$ of the speed variator 14 (or the vehicle velocity), and the gear ratio γ of the speed variator 14. Further, the efficiency ηout of the motor generator 22 attained by the output side power control can be calculated based on, for example, the requested torque Twr of the driven wheel 40 and the output shaft rotational speed $\omega_{out}$ of the speed variator 14.

More specifically, when the condition that the difference ηin-ηout between the estimated efficiency ηin of the motor generator 22 attained by the input side power control and the estimated efficiency ηout of the motor generator 22 attained by the output side power control is greater than or equal to a set value Δη is satisfied, the electronic control unit 42 selects to execute the input side power control. The set value Δη (Δη≧0) can be determined in consideration of the efficiency of the speed variator (CVT) 14, and may for example be determined based on the gear ratio γ of the speed variator 14. On the other hand, when the condition that the difference ηin-ηout is greater than or equal to a set value Δn is not satisfied, the electronic control unit 42 selects to execute the output side power control. In this manner, it is possible to select to execute either of the input side or the output side power control such that the efficiency of the motor generator 22 becomes high, thereby enhancing system efficiency.

According to the present embodiment, when carrying out a move-off operation in which the vehicle in a stopped state is driven forward, the electronic control unit 42 performs control so as to release the clutches C2, C3, C9, C10 and the brake B3 and engage the clutch C7, and controls torque of the motor generator 22 such that torque is applied to the driven wheel 40 in the forward rotational direction (i.e., the electronic control unit 42 performs the first forward drive control). As a result, the vehicle can be started in the forward direction using torque of the motor generator 22. Alternatively, when carrying out a move-off operation, the electronic control unit 42 may create a state in which the clutches C2, C3 and the brake B3 are released and the clutches C9, C10 are engaged, then gradually increase the locking force of the clutch C7 so as to transmit torque of the engine 10 to the driven wheel 40 via the speed variator 14, and control torque of the motor generator 22 such that torque is applied to the driven wheel 40 in the forward rotational direction (i.e., the electronic control unit 42 may perform the second forward drive control). As a result, both the torque of the engine 10 and the torque of the motor generator 22 can be employed for causing the vehicle move-off operation in the forward direction. It should be noted that the procedure described for the fifth embodiment can be used for selecting which of the first or the second forward drive control to execute when performing a move-off operation in the present embodiment.

According to the present embodiment, when carrying out a reverse move-off operation in which the vehicle in a stopped state is driven in the reverse direction, the electronic control unit 42 performs control so as to release the clutches C2, C3, C9, C10 and the brake B3 and engage the clutch C7, and controls torque of the motor generator 22 such that torque is applied to the driven wheel 40 in the reverse rotational direction (i.e., the electronic control unit 42 performs the first reverse drive control). As a result, the vehicle can be started in the reverse direction using torque of the motor generator 22. Alternatively, when carrying out a reverse move-off operation, the electronic control unit 42 may create a state in which the clutches C2, C3, C9 are released and the clutch C10 and the brake B3 are engaged, then gradually increase the locking force of the clutch C7 so as to transmit torque of the engine 10 to the driven wheel 40 after inverting the direction by the planetary gear mechanism 20, and control torque of the motor generator 22 such that torque is applied to the driven wheel 40 in the reverse rotational direction (i.e., the electronic control unit 42 may perform the second reverse drive control). As a result, both the torque of the engine 10 and the torque of the motor generator 22 can be employed for causing move-off operation of the vehicle in the reverse direction. As such, similarly to in the fifth embodiment, the planetary gear mechanism 20 for power distribution adjustment has the function of the forward/reverse switching mechanism in the present embodiment. Furthermore, according to the present embodiment, a configuration is provided wherein the clutch to be engaged is the same clutch in both a move-off operation and a reverse move-off operation, making it possible to standardize the control method for engaging the clutch C7. Accordingly, the procedure described for the fifth embodiment can be similarly used for selecting which of the first or the second reverse drive control to execute when performing a reverse move-off operation in the present embodiment.

According to the present embodiment, a move-off operation employing both the torque of the motor generator 22 and the torque of the engine 10 can also be carried out by engaging the clutch C3. In this case, the electronic control unit 42 creates a state in which the clutches C2, C9, C10 and the brake B3 are released and the clutch C7 is engaged, then gradually increases the locking force of the clutch C3 so as to transmit torque of the engine 10 to the driven wheel 40 via the speed generator 14, and controls torque of the motor generator 22 so as to apply torque to the driven wheel 40 in the forward rotational direction. Alternatively, in this case, the electronic control unit 42 may create a state in which the clutches C7, C10 and the brake B3 are released and the clutches C2, C9 are engaged, then gradually increase the locking force of the clutch C3 so as to transmit torque of the engine 10 to the driven wheel 40 via the speed generator 14, and control torque of the motor generator 22 so as to apply torque to the driven wheel 40 in the forward rotational direction.

Further, according to the present embodiment, when performing an engine start operation in which the engine 10 in a shutdown state is started by means of power of the motor generator 22, the electronic control unit 42 performs control so as to release the clutches C2, C3, C7 and the brake B3, and engage the clutches C9, C10 so as to switch the planetary gear mechanism 20 into the direct coupling state. While in this state, powering operation of the motor generator 22 is performed so as to transmit power of the motor generator 22 to the engine 10, thereby starting the engine 10.

The engaged/released states of the clutches C2, C3, C7, C9, C10, and the brake B3 in above-described respective operations of the present embodiment can be summarized as shown in Table 7 below. In Table 7, "O" denotes the engaged state, while blank denotes the released state. In addition, Δ→O denotes a state in which a clutch is gradually engaged while performing a slip control of the clutch. "(O)" denotes a state which may be either engaged or released.

TABLE 7

|  | C2 | C3 | C7 | C9 | C10 | B3 |
|---|---|---|---|---|---|---|
| power distribution control | O | O |  |  |  | O |
| constant gear ratio transmission control | O |  |  | O | O |  |
| input side power control |  | (O) | O |  |  |  |
| output side power control | O | (O) |  | O |  |  |
| move-off operation (using torque of the motor generator alone) |  |  | O |  |  |  |
| move-off operation (using torque of the motor generator and the engine) |  |  | Δ→O | O | O |  |
| move-off operation (second example using torque of the motor generator and the engine) |  | Δ→O | O |  |  |  |
| move-off operation (third example using torque of the motor generator and the engine) | O | Δ→O |  |  | O |  |
| reverse move-off operation (using torque of the motor generator alone) |  |  |  |  | O |  |

TABLE 7-continued

|  | C2 | C3 | C7 | C9 | C10 | B3 |
|---|---|---|---|---|---|---|
| reverse move-off operation (using torque of the motor generator and the engine) |  |  | Δ→O |  | O | O |
| engine start operation |  |  |  | O | O |  |

According to the present embodiment described above, operation control of the motor generator 22 can be accomplished in a further appropriate manner by selectively coupling the motor generator 22 to the input shaft 26 or the output shaft 36 of the speed variator 14. For example, by coupling the motor generator 22 to the input shaft 26 of the speed variator 14 during the powering operation of the motor generator 22, and by coupling the motor generator 22 to the output shaft 36 of the speed variator 14 during the regenerating operation of the motor generator 22, downsizing of the motor generator 22 can be achieved, and regeneration efficiency during the regenerating operation of the motor generator 22 can be enhanced. Further, by coupling the motor generator 22 to the input shaft 26 of the speed variator 14 when the requested torque Twr at the driven wheel 40 is greater than the threshold value Tw0, and by coupling the motor generator 22 to the output shaft 36 of the speed variator 14 when the requested torque Twr at the driven wheel 40 is less than or equal to the threshold value Tw0, downsizing of the motor generator 22 can be achieved, and it is possible to attain an increase in power transmission efficiency when the requested torque Twr at the driven wheel 40 is small. Moreover, when selectively coupling the motor generator 22 to either of the input shaft 26 or the output shaft 36, by selecting the shaft which would result in higher efficiency of the motor generator 22, system efficiency can be enhanced.

Other example configurations of the present embodiment are described below.

Figure 84:
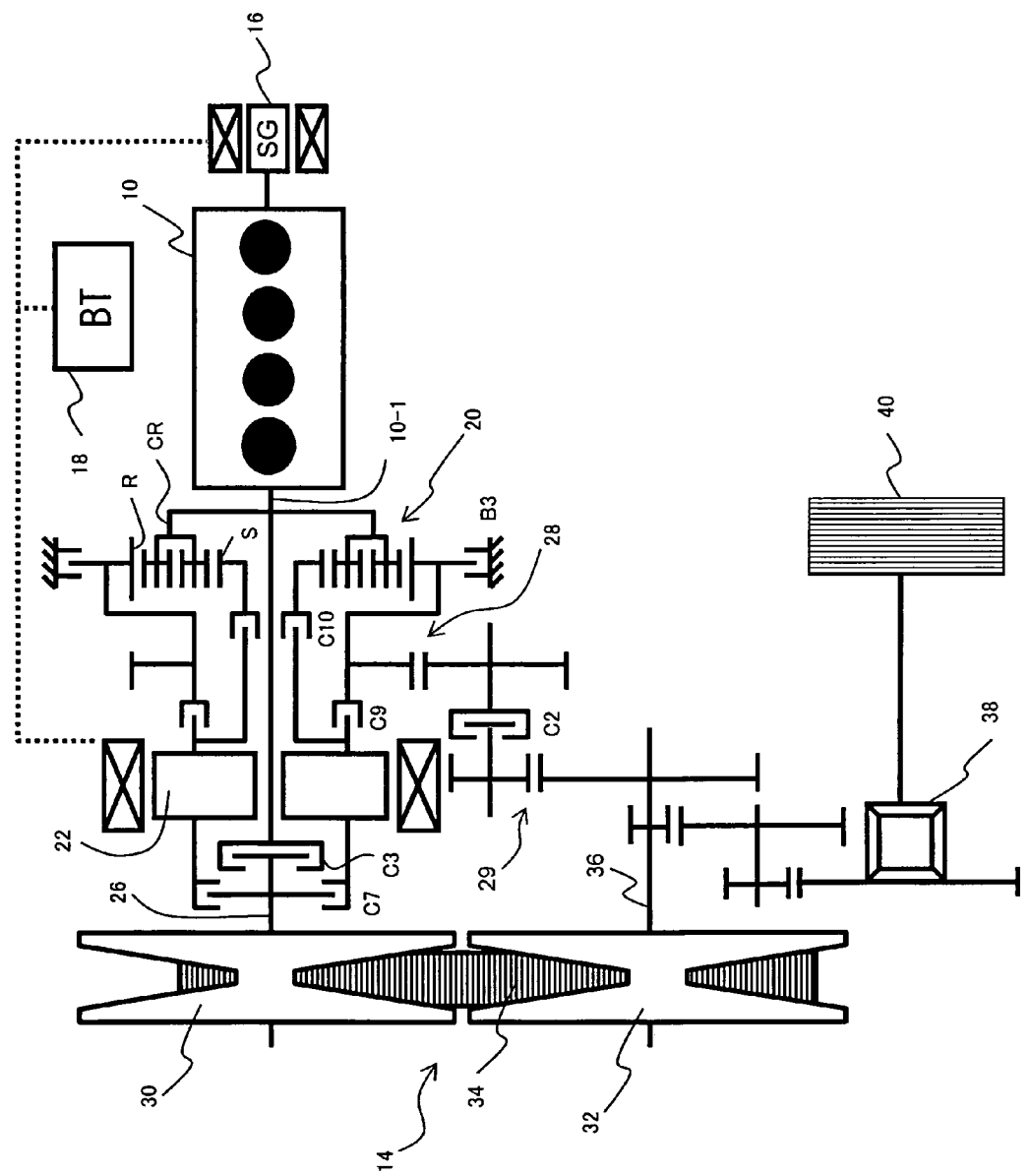
FIG. 84 is a diagram showing another general configuration of a power output system according to the sixth embodiment.

The example of FIG. 84 is configured such that, in contrast to the configuration shown in FIG. 83, the planetary gear mechanism 20 is composed with a double-pinion planetary gearset, and the output shaft 10-1 of the engine 10 is coupled to the carrier CR of the planetary gear mechanism 20. By engaging or releasing the clutch C2, it is possible to couple or decouple between the ring gear R of the planetary gear mechanism 20 and the driven wheel 40. By engaging or releasing the clutch C9, it is possible to couple or decouple between the motor generator 22 and the ring gear R of the planetary gear mechanism 20. By engaging or releasing the brake B3, it is possible to constrain or allow rotation of the ring gear R.

Figure 85:
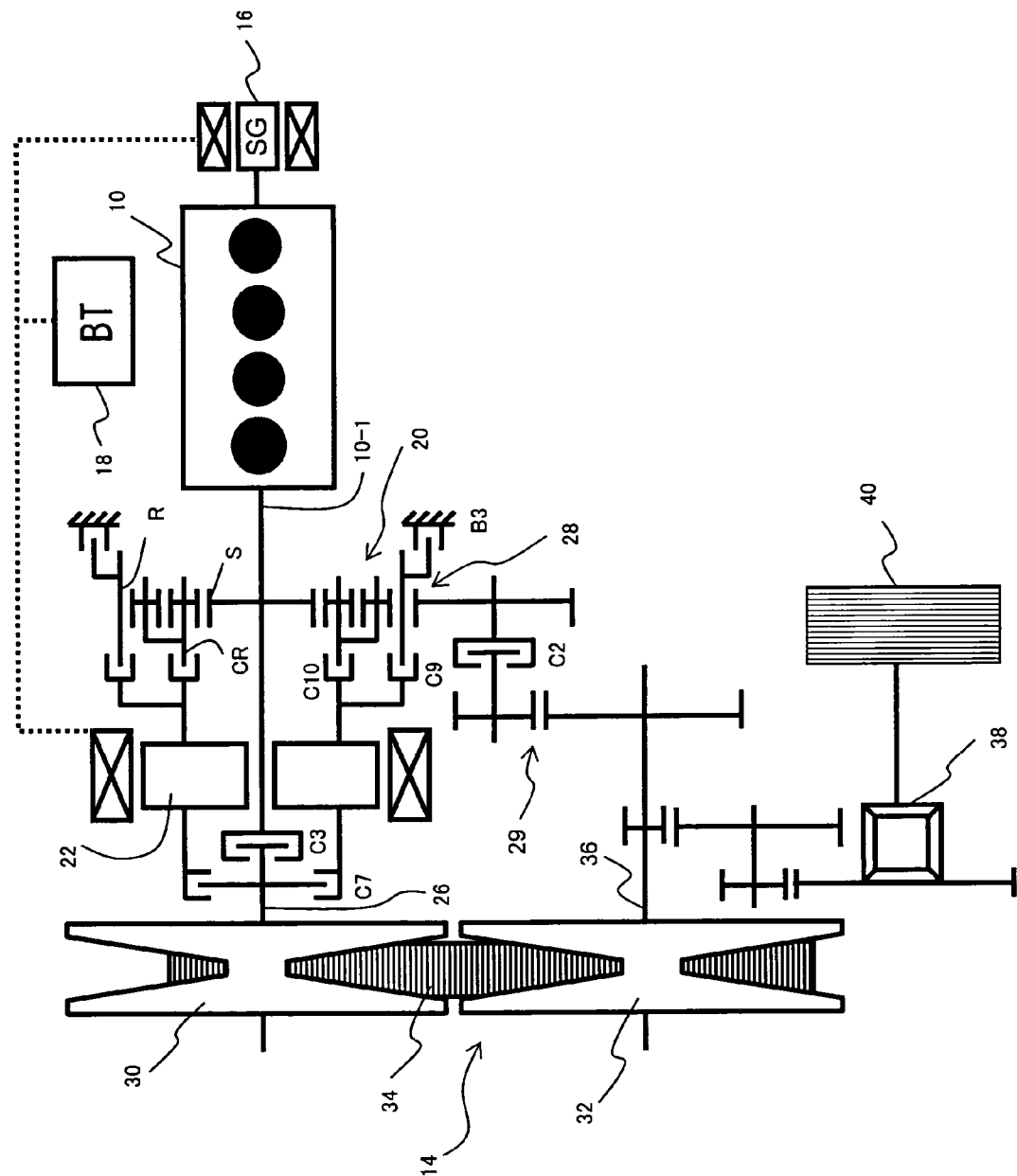
FIG. 85 is a diagram showing a further general configuration of a power output system according to the sixth embodiment.

The example of FIG. 85 is configured such that, in contrast to the configuration shown in FIG. 84, the output shaft 10-1 of the engine 10 is coupled to the sun gear S of the planetary gear mechanism 20. By engaging or releasing the clutch C10, it is possible to couple or decouple between the motor generator 22 and the carrier CR of the planetary gear mechanism 20. It should be noted that operations of the example configurations shown in FIGS. 84 and 85 are identical to those of the system of FIG. 83.

Seventh Embodiment

Figure 86:
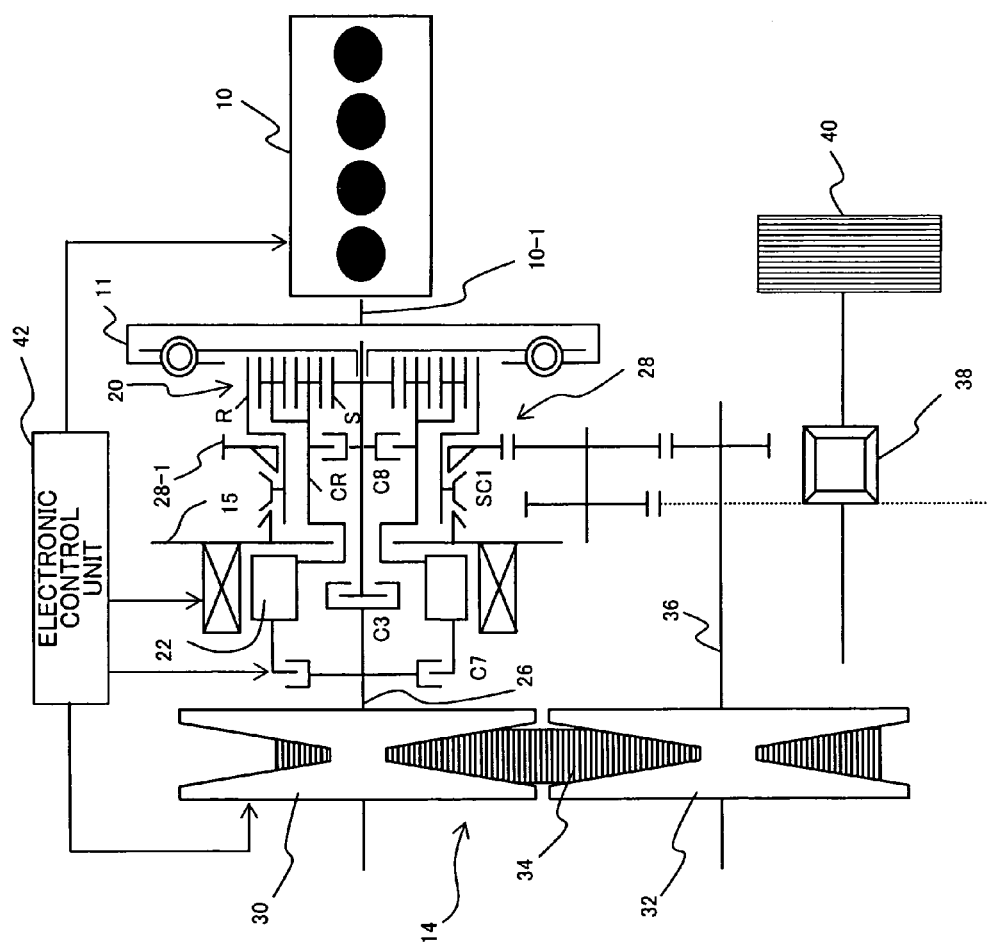
FIG. 86 is a diagram showing a general configuration of a power output system according to the seventh embodiment.

FIG. 86 is a diagram showing a general configuration of a power output system according to a seventh embodiment of the present invention. In contrast to the example configuration of the fifth embodiment shown in FIG. 82, the present embodiment includes a damper 11 on the output shaft 10-1 of the engine 10. By engaging or releasing the clutch C8, it is possible to couple or decouple between the sun gear S and the carrier CR of the planetary gear mechanism 20. By engaging the clutch C8, the planetary gear mechanism 20 can be switched into the direct coupling state. While the starter generator 16 and the battery 18 are not shown in FIG. 86, those structures are similarly provided in the present embodiment as in the fifth embodiment.

In the present embodiment, in place of the clutch C2 and the brake B3, there is provided a meshing clutch (meshing-type engaging mechanism) SC1 such as a jaw clutch (dog clutch) or a synchro clutch that achieves engagement by mating with teeth. The meshing clutch SC1 is capable of selectively switching among a first engaged state in which the ring gear R of the planetary gear mechanism 20 and the driven wheel 40 are coupled, a second engaged state in which rotation of the ring gear R is constrained, and a released (disengaged) state in which the ring gear R and the driven wheel 40 are decoupled while allowing rotation of the ring gear R.

Figure 87:
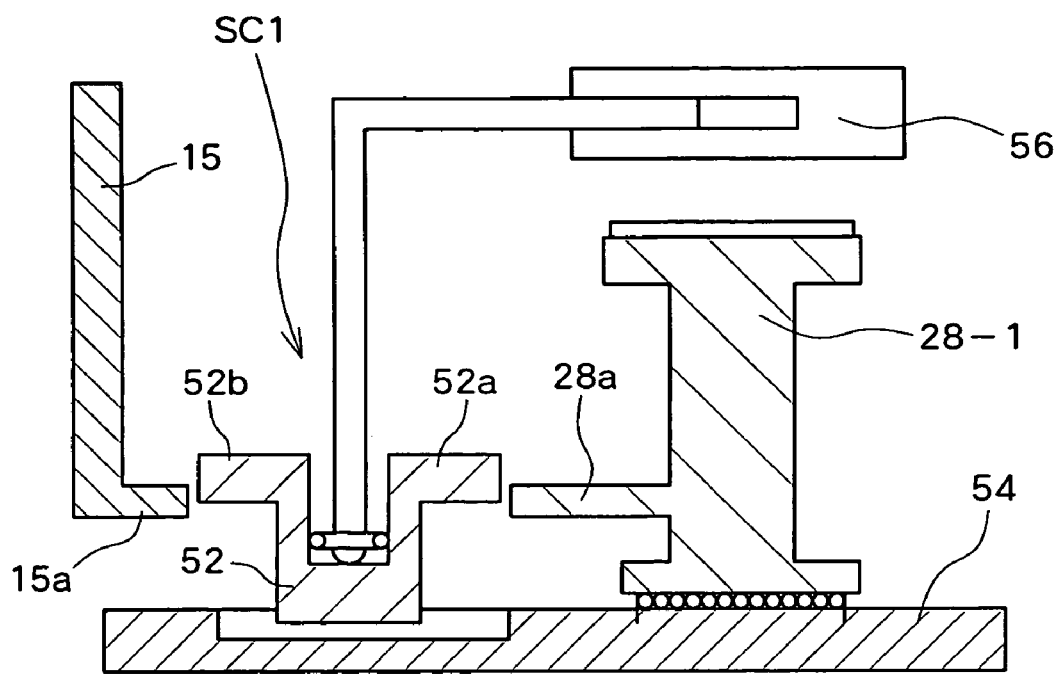
FIGS. 87-89 are diagrams showing an example structure of an meshing clutch used in the seventh embodiment.
Figure 87:
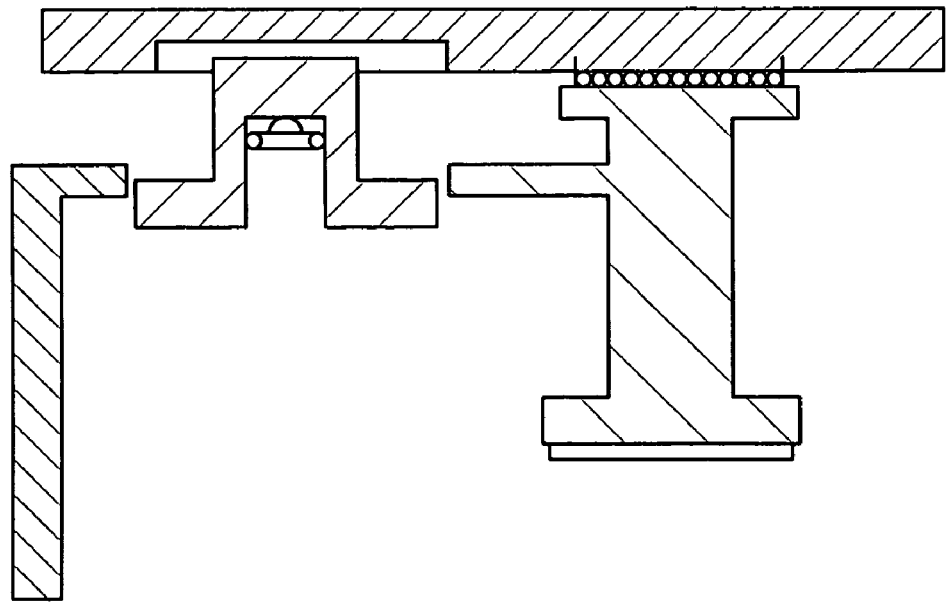
Figure 88:
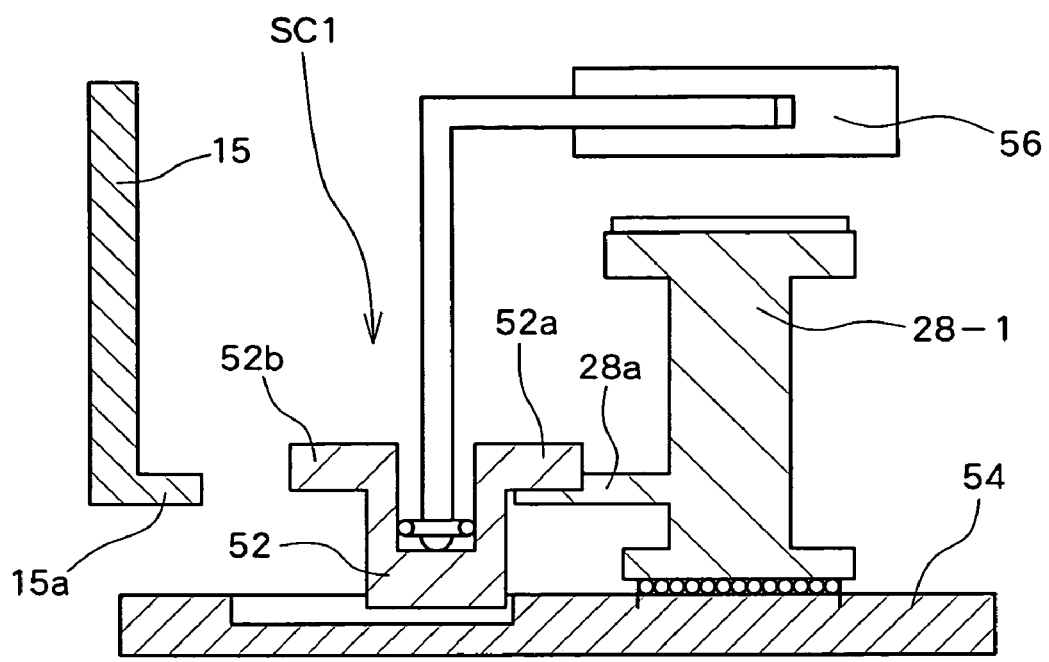
Figure 88:
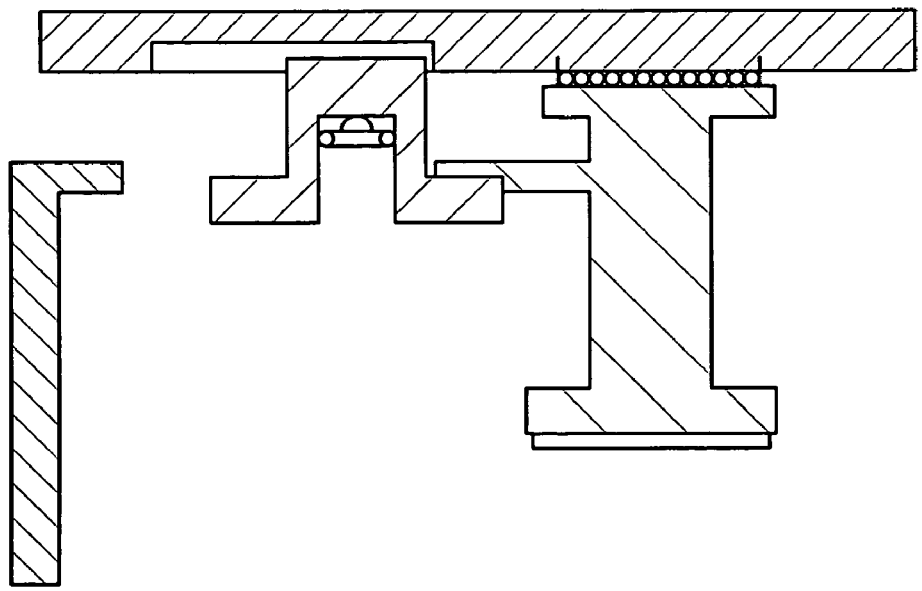
Figure 89:
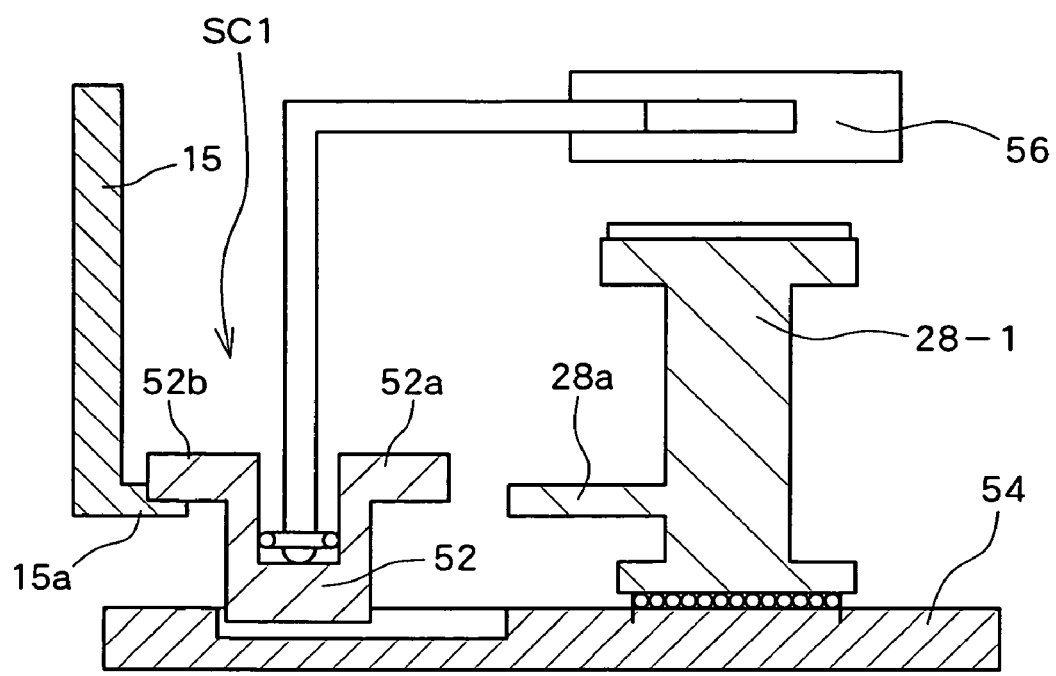
Figure 89:
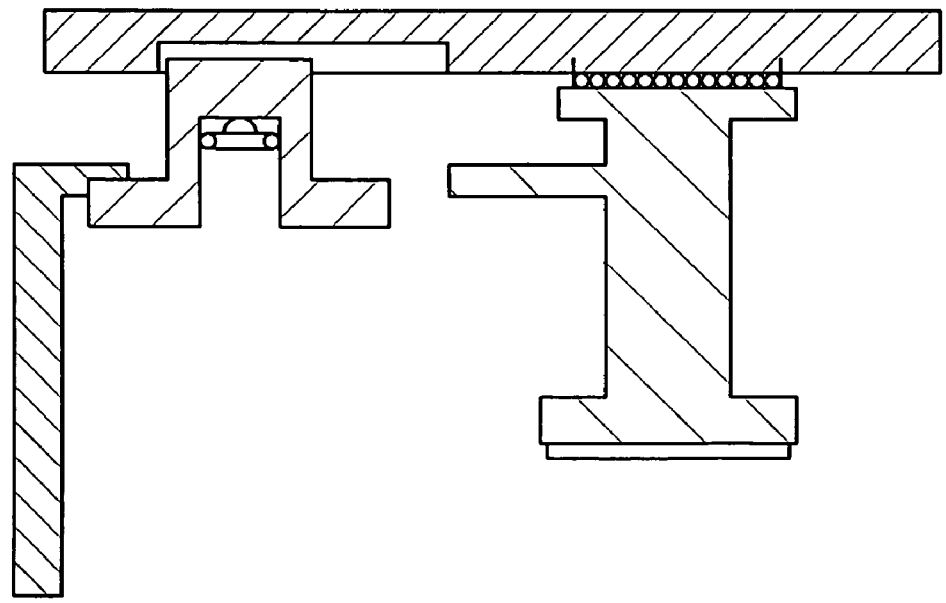

FIGS. 87-89 show an example configuration of the meshing clutch SC1. An input side gear 28-1 of counter gears 28 is supported so as to be rotatable with respect to a rotation shaft 54 coupled to the ring gear R. A sleeve (movable member) 52 is supported so as to be translationally movable along the axis direction of the rotation shaft 54 (i.e., the horizontal direction in FIGS. 87-89, hereinafter referred to as the "rotation shaft direction"). The sleeve 52 can be moved along the rotation shaft direction by performing a drive control of an actuator 56 by means of the electronic control unit 42. On both sides of the sleeve 52 in the rotation shaft direction, teeth 52a, 52b are provided opposing the input side gear 28-1 and a body 15, respectively. On the input side gear 28-1, a tooth 28a is provided facing the tooth 52a. By moving the sleeve 52 toward a first side along the rotation shaft direction (right side in the drawing) by means of the actuator 56, the tooth 52a of the sleeve 52 can be mated (mesh) with the tooth 28a of the input side gear 28-1. Further, on the body 15, a tooth 15a is provided facing the tooth 52b. By moving the sleeve 52 toward the other side along the rotation shaft direction (left side in the drawing) by means of the actuator 56, the tooth 52b of the sleeve 52 can be mated (mesh) with the tooth 15a of the body 15.

When, as shown in FIG. 87, the tooth 52a of the sleeve 52 is not mated with the tooth 28a of the input side gear 28-1 and the tooth 52b of the sleeve 52 is also not mated with the tooth 15a of the body 15, the ring gear R and the input side gear 28-1 (the driven wheel 40) are decoupled, and rotation of the ring gear R is allowed. In other words, the meshing clutch SC1 is in the released state. In this state, no drag loss is generated between the sleeve 52 and the input side gear 28-1 and between the sleeve 52 and the body 15. In contrast, when the sleeve 52 is moved to the first side along the rotation shaft direction by the drive of the actuator 56 such that the tooth 52a of the sleeve 52 is mated with the tooth 28a of the input side gear 28-1 as shown in FIG. 88, the ring gear R and the driven wheel 40 are coupled to one another. In other words, the meshing clutch SC1 is in the first engaged state. In this state, the tooth 52b of the sleeve 52 is not mated with the tooth 15a of the body 15, such that no drag loss is generated between the sleeve 52 and the body 15. Further, when the sleeve 52 is moved to the other side along the rotation shaft direction by the drive of the actuator 56 such that the tooth 52b of the sleeve 52 is mated with the tooth 15a of the body 15 as shown in FIG. 89, rotation of the ring gear R is constrained. In other words, the meshing clutch SC1 is in the second engaged state. In this state, the tooth 52a of the sleeve 52 is not mated with the tooth 28a of the input side gear 28-1, such that no drag loss is generated between the sleeve 52 and the input side gear 28-1.

By switching the meshing clutch SC1 between the first engaged state and the released state, it is possible to effect or disallow power transmission between the ring gear R of the planetary gear mechanism 20 and the driven wheel 40, thereby effecting or disallowing power transmission between the engine 10 and the driven wheel 40 via the planetary gear mechanism 20 and the transmission device 28. Further, by switching the meshing clutch SC1 between the second engaged state and the released state, it is possible to constrain or allow rotation of the ring gear R. As such, according to the present embodiment, the clutch C2 and the brake B3 of the fifth embodiment can be unified into one meshing clutch SC1. Other structures of the present embodiment are identical to those of the fifth embodiment.

Operations performed by the power output system according to the present embodiment are next described. It should be noted that operations concerning which explanation will not be repeated are identical to those of the first to fifth embodiments.

When power transmission between the engine 10 and the driven wheel 40 is to be performed via both the speed variator 14 and the planetary gear mechanism 20, the electronic control unit 42 performs control so as to release the clutches C7 and C8, engage the clutch C3, and place the synchro clutch (meshing clutch) SC1 in the first engaged state. While in this state, the electronic control unit 42 controls the torque of the motor generator 22, and can thereby actively control distribution of power between the power conveyed to the speed variator 14 and the power conveyed to the planetary gear mechanism 20 (i.e., can execute power distribution control), as in the first embodiment.

When the ratio (the gear ratio γ of the speed variator 14) between the rotational speed $\omega_{eng}$ of the engine 10 and the rotational speed $\omega_{out}$ of the output shaft 36 is equal to a predetermined ratio, the electronic control unit 42 can engage the clutch CB and switch the synchro clutch SC1 to the first engaged state, so as to couple the engine 10 and the driven wheel 40 via the planetary gear mechanism 20 in the direct coupling state. With this coupling, the electronic control unit 42 can execute constant gear ratio transmission control for transmitting power between the engine 10 and the driven wheel 40 via the planetary gear mechanism 20 at a predetermined gear ratio.

When carrying out a move-off operation in which the vehicle in a stopped state is driven forward, the electronic control unit 42 performs control so as to release the clutches C3, C8 and the synchro clutch SC1 and engage the clutch C7, and controls torque of the motor generator 22 such that torque is applied to the driven wheel 40 in the forward rotational direction (i.e., the electronic control unit 42 performs the first forward drive control). As a result, the vehicle can be started in the forward direction using torque of the motor generator 22. After starting the vehicle in this manner, the vehicle can be driven by EV travel operation. Alternatively, when carrying out a move-off operation, the electronic control unit 42 may create a state in which the clutch C3 and the synchro clutch SC1 are released and the clutches C8 are engaged, then gradually increase the locking force of the clutch C7 so as to transmit torque of the engine 10 to the driven wheel 40 via the speed variator 14, and control torque of the motor generator 22 such that torque is applied to the driven wheel 40 in the forward rotational direction (i.e., the electronic control unit 42 may perform the second forward drive control). As a result, both the torque of the engine 10 and the torque of the motor generator 22 can be employed for causing move-off of the vehicle in the forward direction. After starting the vehicle in this manner, it is possible to assist vehicle drive with power of the motor generator 22 while driving the vehicle by means of power of the engine 10. It should be noted that the procedure described for the fifth embodiment can be used for selecting which of the first or the second forward drive control to execute when performing a move-off operation in the present embodiment.

According to the present embodiment, when carrying out a reverse move-off operation in which the vehicle in a stopped state is driven in the reverse direction, the electronic control unit 42 performs control so as to release the clutches C3, C8 and the synchro clutch SC1 and engage the clutch C7, and controls torque of the motor generator 22 such that torque is applied to the driven wheel 40 in the reverse rotational direction (i.e., the electronic control unit 42 performs the first reverse drive control). As a result, the vehicle can be started in the reverse direction using torque of the motor generator 22. After performing this vehicle reverse move-off operation, reverse travel by EV travel operation can be performed. Alternatively, when carrying out a reverse move-off operation, the electronic control unit 42 may create a state in which the clutches C3, C8 are released and the synchro clutch SC1 is placed in the second engaged state, then gradually increase the locking force of the clutch C7 so as to transmit torque of the engine 10 to the driven wheel 40 after inverting the direction by the planetary gear mechanism 20, and control torque of the motor generator 22 such that torque is applied to the driven wheel 40 in the reverse rotational direction (i.e., the electronic control unit 42 may perform the second reverse drive control). As a result, both the torque of the engine 10 and the torque of the motor generator 22 can be employed for causing move-off of the vehicle in the reverse direction. After performing this vehicle reverse move-off operation, it is possible to assist reverse travel with power of the motor generator 22 while performing reverse launch operation by means of power of the engine 10. As such, similarly to in the fifth and sixth embodiments, the planetary gear mechanism 20 for power distribution adjustment has the function of the forward/reverse switching mechanism in the present embodiment. Furthermore, according to the present embodiment, a configuration is provided wherein the clutch to be engaged is the same clutch in both a move-off operation and a reverse move-off operation, making it possible to standardize the control method for engaging the clutch C7. Accordingly, the procedure described for the fifth embodiment can be similarly used for selecting which of the first or the second reverse drive control to execute when performing a reverse move-off operation in the present embodiment.

According to the present embodiment, a move-off operation employing both the torque of the motor generator 22 and the torque of the engine 10 can also be carried out by engaging the clutch C3. In this case, the electronic control unit 42 creates a state in which the clutches C8 and the synchro clutch SC1 are released and the clutch C7 is engaged, then gradually increases the locking force of the clutch C3 so as to transmit torque of the engine 10 to the driven wheel 40 via the speed generator 14, and controls torque of the motor generator 22 so as to apply torque to the driven wheel 40 in the forward rotational direction.

Further, according to the present embodiment, when performing an engine start operation in which the engine 10 in a shutdown state is started by means of power of the motor generator 22, the electronic control unit 42 performs control so as to release the clutches C3, C7 and the synchro clutch SC1, and engage the clutch C8 so as to switch the planetary gear mechanism 20 into the direct coupling state. While in this state, powering operation of the motor generator 22 is performed so as to transmit power of the motor generator 22 to the engine 10, thereby starting the engine 10.

The engaged/released states of the clutches C3, C7, C8, and the synchro clutch SC1 in the above-described respective operations of the present embodiment can be summarized as shown in Table 8 below. In Table 8, "O" denotes the engaged state, while blank denotes the released state. In addition, Δ→O denotes a state in which a clutch is gradually engaged while performing a slip control of the clutch. Further, "1" denotes the first engaged state of the synchro clutch SC1, while "2" denotes the second engaged state of the synchro clutch SC1.

TABLE 8

|  | C3 | C7 | C8 | SC1 |
|---|---|---|---|---|
| power distribution control | O |  |  | 1 |
| constant gear ratio transmission control |  |  | O | 1 |
| move-off operation (using torque of the motor generator alone) |  | O |  |  |
| move-off operation (using torque of the motor generator and the engine) |  | Δ→O | O |  |
| move-off operation (second example using torque of the motor generator and the engine) | Δ→O |  | O |  |
| reverse move-off operation (using torque of the motor generator alone) |  |  | O |  |
| reverse move-off operation (using torque of the motor generator and the engine) |  | Δ→O |  | 2 |
| engine start operation |  |  | O |  |

In the previously described fifth embodiment, when the clutch C2 is composed with a frictional clutch such as a multiplate wet clutch, drag loss of the clutch C2 is generated when the clutch C2 is released during EV travel operation, reverse launch operation, and the like. Similarly, when the brake B3 is composed with a frictional brake such as a multiplate wet brake, drag loss of the brake B3 is generated when the brake B3 is released during execution of power distribution control, constant gear ratio transmission control, and the like. By contrast, according to the present embodiment, generation of such drag losses are avoided by employing the meshing clutch (synchro clutch) SC1 in place of the clutch C2 and the brake B3, thereby enabling to further enhance power transmission efficiency. Moreover, the number of transmission devices (counter gears) provided between the planetary gear mechanism 20 and the driven wheel 40 for transmitting power therebetween can be reduced. In addition, by unifying the clutch C2 and the brake B3 into one synchro clutch SC1, the total number of clutches can be reduced as compared to in the fifth embodiment. Accordingly, system downsizing can be achieved.

In each of the above-described first to seventh embodiments, in place of the motor generator 22 which function as an electric motor (prime mover) and an electric generator (driven machinery), it is possible to alternatively employ a hydraulic pump motor which functions as a hydraulic motor (prime mover) and a hydraulic pump (driven machinery). In this case, an accumulator for accumulating energy of the hydraulic fluid used by the hydraulic pump motor to generate power is provided. When the hydraulic pump motor functions as a hydraulic motor (prime mover), the hydraulic pump motor generates power from the energy of the hydraulic fluid accumulated in the accumulator, and outputs the generated power to the planetary gear mechanism 20. On the other hand, when the hydraulic pump motor functions as a hydraulic pump (driven machinery), the hydraulic pump motor generates energy of the hydraulic fluid from the power conveyed from the planetary gear mechanism 20, and accumulates the generated energy in the accumulator. The hydraulic pump motor may be of a variable capacity type, and the electronic control unit 42 may control torque of the hydraulic pump motor by adjusting the capacity of the hydraulic pump motor.

While embodiments for practicing the present invention were described above, the present invention is not limited by these embodiments, and it is apparent that various other embodiments can be implemented without deviating from the scope of the present invention.

What is claimed is:

1. A power transmission system, comprising:
   a first power transmitting section capable of transmitting power from an engine to a load via a speed variator while changing speed;
   a second power transmitting section capable of transmitting power from the engine to the load via a gearing mechanism provided in parallel to the speed variator;
   a prime mover that generates torque which can be controlled; and
   a control unit that controls torque of the prime mover;
   wherein the gearing mechanism is a mechanism capable of performing a torque combining operation in which torque from the engine and torque from the prime mover are combined in a state such that their torque ratio equals a first predetermined ratio, and the combined torque is transmitted to the load; and
   when power transmission between the engine and the load is performed via both the speed variator and the gearing mechanism, the control unit performs power distribution control for controlling distribution of power conveyed to the speed variator and power conveyed to the gearing mechanism by adjusting torque of the prime mover.

2. A power transmission system as defined in claim 1, wherein
   the first power transmitting section includes a first coupling switch mechanism capable of effecting and releasing coupling of the engine and the load via the speed variator;
   the second power transmitting section includes a second coupling switch mechanism capable of effecting and releasing coupling of the engine and the load via the gearing mechanism; and
   the control unit performs the power distribution control while in a state in which the engine and the load are coupled via the speed variator by means of the first coupling switch mechanism and the engine and the load are coupled via the gearing mechanism by means of the second coupling switch mechanism.

3. A power transmission system as defined in claim 2, wherein
   the gearing mechanism comprises: an input side rotating element that can transmit torque from the engine;
   a distribution-purpose rotating element that can transmit torque from the prime mover; and
   an output side rotating element that can combine torque conveyed to the input side rotating element and torque conveyed to the distribution-purpose rotating element in a state such that their torque ratio equals the first predetermined ratio, and transmit the combined torque to the load; and
   the gearing mechanism is a mechanism having two rotational degrees of freedom.

4. A power transmission system as defined in claim 3, wherein
   the second power transmitting section includes a first rotation constraining mechanism capable of constraining and allowing rotation of the input side rotating element; and
   the control unit performs prime mover power control in which power transmitted between the prime mover and the load is controlled, while in a state in which rotation of the input side rotating element is constrained by means of the first rotation constraining mechanism.

5. A power transmission system as defined in claim 3, wherein
   the second power transmitting section includes a first rotation constraining mechanism capable of constraining and allowing rotation of the input side rotating element;
   the second coupling switch mechanism is a mechanism capable of effecting and releasing coupling of the engine and the input side rotating element; and
   when power transmission between the engine and the load is performed in a state in which the engine and the load are coupled via the speed variator by means of the first coupling switch mechanism and coupling between the engine and the input side rotating element is released by the second coupling switch mechanism, the control unit performs power assist control in which power transmitted between the prime mover and the load is controlled, while in a state in which rotation of the input side rotating element is constrained by means of the first rotation constraining mechanism.

6. A power transmission system as defined in claim 3, wherein
   while in a state in which the engine and the load are coupled via the gearing mechanism by means of the second coupling switch mechanism and in which rotation of the distribution-purpose rotating element is in a direction opposite to rotation of the input side rotating element, the control unit performs power conversion control for converting power conveyed from the engine to the input side rotating element into power of the prime mover while also applying torque to the load, by controlling torque of the prime mover such that torque is applied to the distribution-purpose rotating element in a direction for stopping the rotation of the distribution-purpose rotating element.

7. A power transmission system as defined in claim 3, wherein
   the gearing mechanism comprises a planetary gear mechanism including, as rotating elements, a sun gear, a carrier, and a ring gear; and
   the input side rotating element, the distribution-purpose rotating element, and the output side rotating element are configured with the rotating elements of the planetary gear mechanism.

8. A power transmission system as defined in claim 3, further comprising:
   a third coupling switch mechanism capable of effecting and releasing coupling of the engine and the output side rotating element; and
   the control unit performs constant gear ratio transmission control for transmitting power between the engine and the load at a predetermined gear ratio, by coupling the engine and the output side rotating element by means of the third coupling switch mechanism.

9. A power transmission system as defined in claim 1, further comprising:
a third power transmitting section capable of transmitting power from the engine to the load via a transmission device provided in parallel to the speed variator at a predetermined gear ratio;
wherein the third power transmitting section includes a third coupling switch mechanism capable of effecting and releasing coupling of the engine and the load via the transmission device; and
the control unit performs constant gear ratio transmission control for transmitting power between the engine and the load via the transmission device at a predetermined gear ratio, by coupling the engine and the load via the transmission device by means of the third coupling switch mechanism.

10. A power transmission system as defined in claim 9, wherein torque transmission capacity of the speed variator can be controlled by the control unit; and
when performing the constant gear ratio transmission control, the control unit controls distribution of power conveyed to the speed variator and power conveyed to the transmission device by controlling the torque transmission capacity of the speed variator.

11. A power transmission system as defined in claim 10, wherein
the speed variator is a continuously variable transmission capable of performing power transmission between an input rotating member and an output rotating member via a speed-varying transmission member in a state in which the speed-varying transmission member is pressed against the input and output rotating members; and
when performing the constant gear ratio transmission control, the control unit controls distribution of power conveyed to the speed variator and power conveyed to the transmission device by adjusting the pressing force of the speed-varying transmission member against the input and output rotating members, which controls the torque transmission capacity of the speed variator.

12. A power transmission system as defined in claim 1, wherein
the gearing mechanism is a mechanism capable of selectively performing the torque combining operation and a torque distributing operation in which torque from the engine is divided and transmitted to the load and the prime mover in a state such that their torque ratio equals a second predetermined ratio; and
when power transmission between the engine and the load is performed via both the speed variator and the gearing mechanism, and when it is possible for the gearing mechanism to perform the torque combining operation or the torque distributing operation, the control unit performs the power distribution control.

13. A power transmission system as defined in claim 12, wherein the gearing mechanism comprises:
an input side rotating element that can transmit torque from the engine;
first and second distribution-purpose rotating elements that can transmit torque from the prime mover; and
an output side rotating element that can transmit torque to the load;
the gearing mechanism is a mechanism having two rotational degrees of freedom;
the second power transmitting section includes a coupling mechanism for switching a state of coupling of the prime mover with respect to the first and the second distribution-purpose rotating elements;
when the prime mover is coupled to the first distribution-purpose rotating element by means of the coupling mechanism, the output side rotating element can combine torque conveyed to the input side rotating element and torque conveyed to the first distribution-purpose rotating element in a state such that their torque ratio equals the first predetermined ratio, and transmit the combined torque to the load; and
when the prime mover is coupled to the second distribution-purpose rotating element by means of the coupling mechanism, the input side rotating element can distribute torque conveyed from the engine to the output side rotating element and the second distribution -purpose rotating element in a state such that their torque ratio equals the second predetermined ratio.

14. A power transmission system as defined in claim 13, wherein
the control unit performs constant gear ratio transmission control for transmitting power between the engine and the load via the gearing mechanism at a predetermined gear ratio, by coupling the prime mover to both the first and the second distribution-purpose rotating elements by means of the coupling mechanism.

15. A power transmission system as defined in claim 13, wherein
the gearing mechanism comprises a planetary gear mechanism which includes a plurality of planetary gearsets each including, as rotating elements, a sun gear, a carrier, and a ring gear, any of the rotating elements within one planetary gearset being coupled or shared with any of the rotating elements within another planetary gearset such that the planetary gear mechanism is configured to have two rotational degrees of freedom; and
the input side rotating element, the first and the second distribution-purpose rotating elements, and the output side rotating element are configured with the rotating elements of the planetary gear mechanism.

16. A power transmission system as defined in claim 12, further comprising:
an energy accumulation device that accumulates energy used by the prime mover to generate power;
wherein when performing the power distribution control, the control unit selects which of the torque combining operation or the torque distributing operation to execute based on a state of energy accumulation in the energy accumulation device.

17. A power transmission system as defined in claim 3, further comprising:
a fourth coupling switch mechanism capable of effecting and releasing coupling of the distribution-purpose rotating element and the load via the speed variator;
wherein the second power transmitting section includes a second rotation constraining mechanism capable of constraining and allowing rotation of the output side rotating element;
the second coupling switch mechanism is a mechanism capable of effecting and releasing coupling of the output side rotating element and the load;
the gearing mechanism is a mechanism which is, when rotation of the output side rotating element is constrained by the second rotation constraining mechanism, capable of transmitting torque that is conveyed from the engine to the input side rotating element to the distribution-purpose rotating element while inverting the torque direction; and the control unit can transmit torque from the engine to the load while inverting the torque direction, by releasing the coupling between the output side rotating element and the load by means of the second coupling switch mechanism, constraining rotation of the output side rotating element by means of the second rotation constraining mechanism, and coupling between the distribution-purpose rotating element and the load via the speed variator by means of the fourth coupling switch mechanism.

18. A power transmission system as defined in claim 17, wherein
the second power transmitting section includes a direct coupling mechanism capable of switching the gearing mechanism into a direct coupling state in which the input side rotating element, the distribution-purpose rotating element, and the output side rotating element can be rotated as one piece; and
the control unit can transmit torque from the engine to the load by releasing the coupling between the output side rotating element and the load by means of the second coupling switch mechanism, switching the gearing mechanism into the direct coupling state by means of the direct coupling mechanism, and coupling between the distribution-purpose rotating element and the load via the speed variator by means of the fourth coupling switch mechanism.

19. A power transmission system as defined in claim 18, wherein
when the load in a stopped state is to be driven in reverse direction, the control unit selectively executes either of:
a first reverse drive control by which the distribution-purpose rotating element and the load are coupled via the speed variator by means of the fourth coupling switch mechanism, and torque of the prime mover is controlled to apply torque to the load in the reverse direction; and
a second reverse drive control by which the coupling between the output side rotating element and the load by means of the second coupling switch mechanism is released, rotation of the output side rotating element is constrained-by means of the second rotation constraining mechanism, the distribution-purpose rotating element and the load are coupled via the speed variator by means of the fourth coupling switch mechanism such that torque from the engine is transmitted to the load after the torque direction is inverted by the gearing mechanism, and torque of the prime mover is controlled to apply torque to the load in the reverse direction.

20. A power transmission system as defined in claim 19, wherein
when the load in a stopped state is to be driven in forward direction, the control unit selectively executes either of:
a first forward drive control by which the distribution-purpose rotating element and the load are coupled via the speed variator by means of the fourth coupling switch mechanism, and torque of the prime mover is controlled to apply torque to the load in the forward direction; and
a second forward drive control by which the coupling between the output side rotating element and the load by means of the second coupling switch mechanism is released, the gearing mechanism is switched into the direct coupling state by means of the direct coupling mechanism, the distribution-purpose rotating element and the load are coupled via the speed variator by means of the fourth coupling switch mechanism such that torque from the engine is transmitted to the load, and torque of the prime mover is controlled to apply torque to the load in the forward direction.

21. A power transmission system as defined in claim 20, wherein,
when the load in a stopped state is to be driven in reverse direction, the control unit determines requested input torque into the speed variator or requested torque at the load;
the control unit selects to execute the first reverse drive control when the absolute value of the determined requested torque is less than or equal to a set value; and
the control unit selects to execute the second reverse drive control when the absolute value of the determined requested torque is greater than the set value.

22. A power transmission system as defined in claim 21, wherein,
when the load in a stopped state is to be driven in forward direction, the control unit determines requested input torque into the speed variator or requested torque at the load; the
control unit selects to execute the first forward drive control when the absolute value of the determined requested torque is less than or equal to the set value; and
the control unit selects to execute the second forward drive control when the absolute value of the determined requested torque is greater than the set value.

23. A power transmission system as defined in claim 18, wherein
the control unit executes engine start control for starting the engine by switching the gearing mechanism into the direct coupling state by means of the direct coupling mechanism to thereby transmit power of the prime mover to the engine.

24. A power transmission system as defined in claim 1, further comprising:
a switching mechanism for selectively coupling the prime mover to either an input side or an output side of the speed variator; and
the control unit can selectively execute either of input side power control by which power transmitted between the prime mover and the load is controlled while in a state in which the prime mover is coupled to the input side of the speed variator by means of the switching mechanism, or output side power control by which power transmitted between the prime mover and the load is controlled while in a state in which the prime mover is coupled to the output side of the speed variator by means of the switching mechanism.

25. A power transmission system as defined in claim 24, wherein
the control unit selects to execute the input side power control when power transmission is to be performed from the prime mover to the load; and
the control unit selects to execute the output side power control when power transmission is to be performed from the load to the prime mover.

26. A power transmission system as defined in claim 24, wherein
the control unit selects which of the input side power control or the output side power control to execute based on requested torque at the load.

27. A power transmission system as defined in claim 24, wherein
the control unit estimates efficiency of the prime mover attained by the input side power control and efficiency of the prime mover attained by the output side power, and selects which of the input side power control or the output side power control to execute based on the estimated efficiency values of the prime mover.

28. A power transmission system as defined in claim 1, wherein when performing the power distribution control, the control unit controls distribution of power conveyed to the speed variator and power conveyed to the gearing mechanism by adjusting torque of the prime mover based on torque of the engine.

29. A power transmission system as defined in claim 28, wherein when performing the power distribution control, the control unit increases torque of the prime mover in response to a reduction in torque of the engine, to thereby increase power distribution to the gearing mechanism.

30. A power transmission system as defined in claim 1, wherein when performing the power distribution control, the control unit controls distribution of power conveyed to the speed variator and power conveyed to the gearing mechanism by adjusting torque of the prime mover such that torque conveyed to the speed variator does not exceed a predetermined value.

31. A power transmission system as defined in claim 1, wherein the speed variator is a continuously variable transmission in which its gear ratio is changed by varying a contacting radius ratio of a speed-varying transmission member with respect to input and output rotating members;

when performing the power distribution control, the control unit controls distribution of power conveyed to the speed variator and power conveyed to the gearing mechanism by adjusting torque of the prime mover based on the contacting radius ratio of the speed-varying transmission member with respect to the input and output rotating members.

32. A power transmission system as defined in claim 31, wherein when performing the power distribution control, the control unit increases torque of the prime mover as a value of the contacting radius ratio of the speed-varying transmission member with respect to the input and output rotating members deviates from one, to thereby increase power distribution to the gearing mechanism.

33. A power transmission system as defined in claim 31, wherein when performing the power distribution control, the control unit controls distribution of power conveyed to the speed variator and power conveyed to the gearing mechanism by adjusting torque of the prime mover based on the gear ratio of the speed variator, which is a factor reflecting the contacting radius ratio of the speed-varying transmission member with respect to the input and output rotating members.

34. A power transmission system as defined in claim 2, wherein when driving the load in a stopped state, the control unit controls torque of the prime mover while in a state in which coupling of the engine and the load via the speed variator by means of the first coupling switch mechanism is released and the engine and the load are coupled via the gearing mechanism by means of the second coupling switch mechanism.

35. A power transmission system as defined in claim 1, wherein the prime mover is an electric motor or a hydraulic motor.

36. A power transmission system as defined in claim 1, wherein the prime mover operates also as a driven machinery; and wherein the gearing mechanism is a mechanism capable of performing a torque combining operation in which torque from the engine is divided and transmitted to the load and the driven machinery in a state such that their torque ratio equals a second predetermined ratio; and when the power transmission between the engine and the load is preformed via both the speed variator and the gearing mechanism, the control unit performs power distribution control; for controlling distribution of power conveyed to the speed variator and power conveyed to the gearing mechanism by adjusting the torque of the driven machinery.

37. A power transmission system as defined in claim 36, wherein the driven machinery is an electric generator or pump.

38. A power transmission system, comprising:

a first power transmitting section capable of transmitting power from an engine to a load via a speed variator while changing speed, the speed variator having a torque transmission capacity which can be controlled;

a second power transmitting section capable of transmitting power from the engine to the load via a gearing mechanism provided in parallel to the speed variator, wherein the gearing mechanism has a predetermined gear ratio; and a control unit that controls the torque transmission capacity of the speed variator;

wherein when power transmission between the engine and the load is performed via both the speed variator and the gearing mechanism, the control unit performs power distribution control for controlling distribution of power conveyed to the speed variator and power conveyed to the gearing mechanism by adjusting torque transmission capacity of the speed variator while the speed variator is at a constant gear ratio.

39. A power transmission system as defined in claim 36, wherein the speed variator is a continuously variable transmission capable of performing power transmission between an input rotating member and an output rotating member via a speed-varying transmission member in a state in which the speed-varying transmission member is pressed against the input and output rotating members; and the control unit performs the power distribution control by adjusting the pressing force of the speed-varying transmission member against the input and output rotating members, which controls the torque transmission capacity of the speed variator.

* * * * *

UNITED STATES PATENT AND TRADEMARK OFFICE
CERTIFICATE OF CORRECTION

PATENT NO. : 7,637,836 B2
APPLICATION NO. : 11/411123
DATED : December 29, 2009
INVENTOR(S) : Takao Watanabe et al.

It is certified that error appears in the above-identified patent and that said Letters Patent is hereby corrected as shown below:

Column 19, line 2, delete "Pin" and insert --$P_{in}$--;

Column 28, line 41, delete "$\omega_{hd\ rl}$" and insert --$\omega rl$--;

Column 44, line 3, delete "($\Delta\eta \geqq 0$)" and insert --($\Delta\eta \geq 0$)--;

Column 48, line 39, delete "CB" and insert --C8--.

Signed and Sealed this

Eighth Day of June, 2010

David J. Kappos
*Director of the United States Patent and Trademark Office*